US012725204B2

(12) United States Patent
Arunachalam

(10) Patent No.: US 12,725,204 B2
(45) Date of Patent: Sep. 1, 2026

(54) EMBEDDED ARTIFICIAL INTELLIGENCE (AI) SUPERINTELLIGENCE SYSTEM, METHOD, AND COMPUTER PROGRAM PRODUCT

(71) Applicant: Lakshmi Arunachalam, Menlo Park, CA (US)

(72) Inventor: Lakshmi Arunachalam, Menlo Park, CA (US)

( * ) Notice: Subject to any disclaimer, the term of this patent is extended or adjusted under 35 U.S.C. 154(b) by 0 days.

(21) Appl. No.: 19/560,216

(22) Filed: Mar. 9, 2026

(65) Prior Publication Data

US 2026/0203825 A1 Jul. 16, 2026

Related U.S. Application Data

(63) Continuation-in-part of application No. 19/556,765, filed on Mar. 4, 2026, which is a continuation of application No. 19/282,433, filed on Jul. 28, 2025.

(60) Provisional application No. 63/732,384, filed on Aug. 8, 2024.

(51) Int. Cl.
*G06Q 40/06* (2012.01)
*G06F 9/448* (2018.01)

(52) U.S. Cl.
CPC ....... *G06Q 40/0631* (2025.08); *G06F 9/4498* (2018.02)

(58) Field of Classification Search
CPC ......... G06Q 40/0631; G06F 9/00; G06F 9/44; G06F 9/448; G06F 9/4494; G06F 9/4498; G06F 9/451; G06N 20/00; G06N 20/10; G06N 20/20
See application file for complete search history.

(56) References Cited

U.S. PATENT DOCUMENTS

2003/0069922 A1* 4/2003 Arunachalam ........ G06Q 20/04 705/26.1
2025/0232217 A1* 7/2025 Kelsey ................ G06F 16/2433

* cited by examiner

*Primary Examiner* — Shane D Woolwine
(74) *Attorney, Agent, or Firm* — Polsinelli LLP

(57) ABSTRACT

A system, computer program product, and method implement a thinking system using an ASI distributed Application State Machine that connects to real, accurate, dedicated absolute data, providing privacy, security, and eliminating hallucinated AI. One example includes an ASI Command, Control, Communications and Computer Intelligence (C4I) system for independent, intelligent AI Prompting and ASI Browsing. The ASI Application State Machine comprises: ASI Application data structure network; ASI Enterprise Interface State Machine, said data structures interfacing with a back-end channel, a Finite State Machine embedded in each data structure; and Application Service Information Base providing a uniform interface for ASI Application data structure identities. Additional embodiments disclose ASI Browser displaying ASI Applications; ASI Agents; ASI Application Network Nodes; ASI Operating System; ASI Switch; ASI Database of real, accurate, dedicated absolute data, for Machine Learning to train AI Models, for performing real-time, bi-directional transactions, connecting to billing.

20 Claims, 16 Drawing Sheets

Service Distribution Criteria

- Application Needs - Healthtech, Fintech, Defensetech
- Delay/Storage/Costs

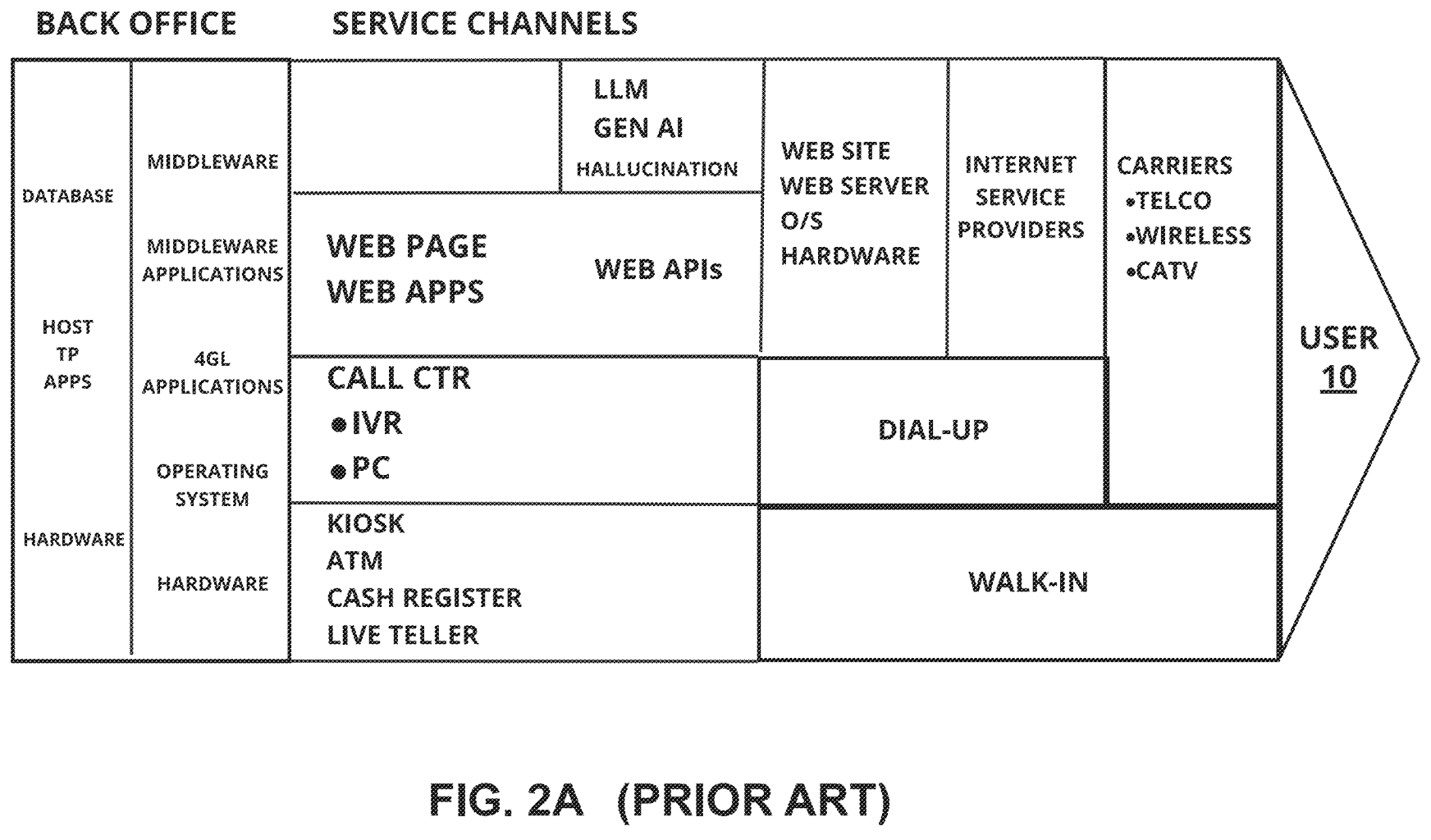

USER
10

CARRIERS
•TELCO
•WIRELESS
•CATV

INTERNET
SERVICE
PROVIDERS

WALK-IN

DIAL-UP

WEB SITE
WEB SERVER
O/S
HARDWARE

LLM
GEN AI
HALLUCINATION

WEB APIs

SERVICE CHANNELS

WEB PAGE
WEB APPS

CALL CTR
●IVR
●PC

KIOSK
ATM
CASH REGISTER
LIVE TELLER

BACK OFFICE

MIDDLEWARE

MIDDLEWARE
APPLICATIONS

4GL
APPLICATIONS

OPERATING
SYSTEM

HARDWARE

DATABASE

HOST
TP
APPS

HARDWARE

FIG. 2A (PRIOR ART)

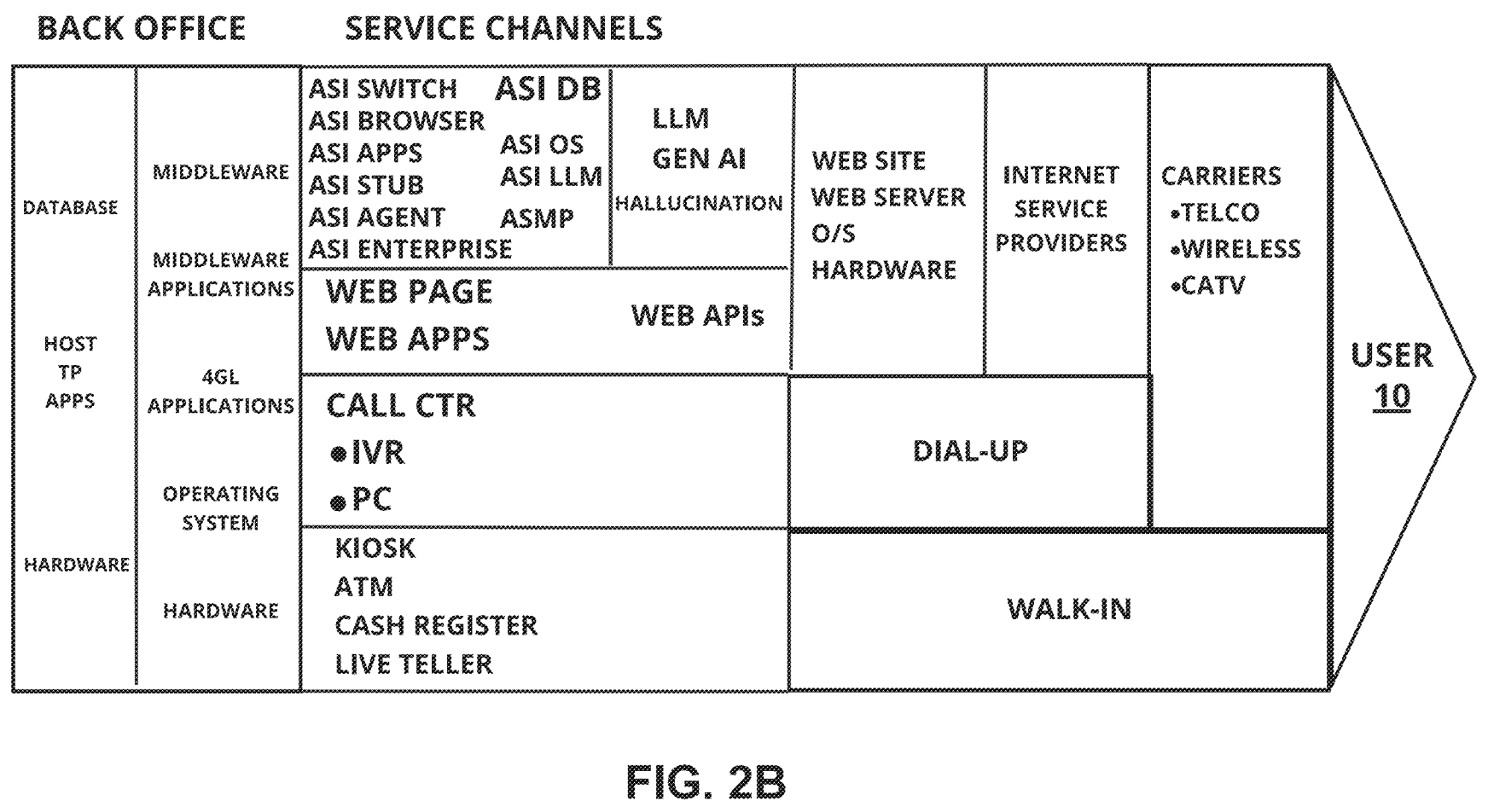

USER 10

BACK OFFICE

SERVICE CHANNELS

DATABASE

HOST
TP
APPS

HARDWARE

MIDDLEWARE

MIDDLEWARE
APPLICATIONS

4GL
APPLICATIONS

OPERATING
SYSTEM

HARDWARE

ASI SWITCH
ASI BROWSER
ASI APPS
ASI STUB
ASI AGENT
ASI ENTERPRISE

ASI DB
ASI OS
ASI LLM
ASMP

LLM
GEN AI
HALLUCINATION

WEB PAGE
WEB APPS

WEB APIs

CALL CTR
•IVR
•PC

KIOSK
ATM
CASH REGISTER
LIVE TELLER

WEB SITE
WEB SERVER
O/S
HARDWARE

INTERNET
SERVICE
PROVIDERS

CARRIERS
•TELCO
•WIRELESS
•CATV

DIAL-UP

WALK-IN

FIG. 2B

ASI BROWSER 100

ASI APPs 110

POINT-OF-SERVICE APPLICATIONS

- BANK
- CAR DEALER
- PIZZERIA
- SMALL BUSINESS
- LOAN
- PAYROLL

PRO FORMA INCOME STATEMENT

COMPANY NAME

Fig. 9

EMBEDDED ARTIFICIAL INTELLIGENCE (AI) SUPERINTELLIGENCE SYSTEM, METHOD, AND COMPUTER PROGRAM PRODUCT

RELATED APPLICATION(S)

This patent application claims priority to and is a continuation-in-part of co-pending application Ser. No. 19/556,765, filed Mar. 4, 2026, which is a continuation of Ser. No. 19/282,433, filed on Jul. 28, 2025, and which in turn claims priority and benefit under 35 U.S.C. 119(e) to U.S. Provisional Application No. 63/732,384, filed on Aug. 8, 2024, entitled AI 2.0 application state machine apparatus and method, the entire contents of each of which being incorporated by reference in their entireties.

BACKGROUND

Technical Field

The present disclosure relates to systems, methods, and non-transitory computer program product in the field of Artificial Intelligence (AI), in particular, to Embedded AI Superintelligence (ASI) Thinking System Networks. Specifically, the present disclosure relates to a method and apparatus for configurable firmware AI Superintelligence (ASI) Application Network Nodes, that have application in AI data centers, edge devices and end user devices to the context of any specific ASI Application displayed on a Local ASI Browser, not on the Cloud, connecting with peer-to-peer firmware ASI Agents in the ASI Application Thinking System Network carrying an ASI Application Payload of ASI Application data structure instances per the ASI Application data structure definition which defines the data and functions per an ASI Application Extended Finite State Machine in an ASI Application Service Information Base, connecting to an ASI Enterprise Interface State Machine, to a remote legacy or other database to fetch the results, back to the interconnected ASI Agents that transfer it to an ASI Database populated with Real, Accurate, Dedicated Absolute Data, RADAD, as the machine learning (M/L) dataset for M/L training the ASI Application-specific vertical Large Language Model (LLM) or other AI-Model, allowing the user from an ASI Prompt in the ASI Application-specific vertical LLM or AI-Model to specify functions that can be executed remotely and to remotely access an ASI Application data structure, its data and functions via ASI Application State Machine Protocol, ASMP, instead of simple, unrelated functions and data. This solves current problems with Generative AI and large LLMs. Specifically, a system and method according to the present disclosure consumes less power because the vertical LLMs or AI-Models are specific to an ASI App. It has lower total cost of ownership (TCO), faster cycle time, and has no algorithm to fit a narrative based on hallucinated data, as in Generative AI. The present disclosure relates to a method and apparatus for a programmable-based, firmware-based or hybrid ASI Operating System, to operate an ASI Switch, utilizing an ASI distributed Application State Machine that connects to real, accurate, dedicated absolute data (RADAD), providing privacy, security, and eliminating hallucinated AI. The ASI Switch provides ASI Operations, Administration, Maintenance, and Provisioning (OAM&P) Service Management Modules to enforce payment per access to the ASI Database, connecting to ASI Billing system.

DISCUSSION OF BACKGROUND

LLMs (Large Language Models), such as Open AI's ChatGPT, Mistral, are AI models trained on extensive text data to predict the next word in a sentence, capable of understanding and generating text similar to how humans communicate. They can answer questions, draft documents, draft reports, sort through data, summarize texts, extract information, translate languages, write code, and more. Chat-GPT spent $110M in GPUs from NVIDIA, to create documents, using data from emails, social media and the Web, introducing bias, hallucination and lack of accuracy and security, and feeding that data into Machine Learning M/L Data Sets to train the 1.76 trillion parameters to generate the token in the sequence of words. Whereas, a 300-page document could be typed by a human being, for $25/hour and will cost less than $3K. Current state of LLMs is like Web 1.0. Current LLMs and expensive data centers would make business and technical sense only when real-time, bi-directional transactional AI 2.0 or ASI Applications—ASI Apps are enabled, beyond generative AI. The present disclosure triggers LLMs in their current state to a new wave of business process Applications that generate real, accurate, dedicated absolute data and utilize historical data—real, accurate, dedicated absolute data from an enterprise and can generate predictive data with absolute accuracy, security and eliminating bias, not predictive data from junk data off the web.

OpenAI GPT-4 Turbo has 1.76 Trillion parameters. GPT-4 has a context window of 128 k tokens which is approximately 100 k words. A context window allows 8192 tokens. One thousand tokens are equivalent to 750 words.

An LLM parameter is a coefficient that is learned and tuned during the training process in order to minimize the error in predicting the next token for a given sequence of tokens, as used in creative writing or text completion. GPT-3 was trained on 500 B tokens.

LLMs are currently in a stage of infancy, like Web 1.0, able to generate content for ads, similar to Web publishing. LLMs do not have the capability of creating robust business process automation applications, like Web Apps. AI is currently used for generative AI applications. These are not real-time, bi-directional transactional, like Web Apps. AI companies are primarily spearheading generative AI development. Examples of current applications of LLMs in accounting and finance are financial reporting, audit and asset pricing; in education, for coaching. Clearly, these are not Apps, like we know the term to mean in Web Apps.

This is obvious from the various AI companies that venture capital companies have invested in, such as developer assistant LangChain; legal startup Harvey; Cresta which is yet another generative AI now for the contact center and coaching started by Stanford AI Lab; ElevenLabs which is a Text to Speech and AI Voice generator like Apple's Siri, the Speech Interpretation and Recognition Interface which has been around since 2011; Glean, which is yet another AI Assistant for AI search to glean through a company's data utilizing Retrieval-Augmented Generation (RAG) technology, which is the process of optimizing the output of a large language model (LLM), so it references an authoritative knowledge base outside of its training data sources before generating a response; Hugging Face which is a marketplace of foundational models; Kumo.AI which helps businesses make predictions from their data, like customer churn or product purchases; Notion which is a writing assistant, which turns databases into actionable insights, and runs through hundreds of docs in minutes, then writes up insights, summaries; OpenAI's ChatGPT where GPT stands for Generative Pre-training Transformer; Replicate helps fine tune 25000 open source LLM models that generate and edit music, videos, text and images; Sierra, a conversational AI agent for business; more AI Assistant companies; Figure which makes humanoid robots, Google's DeepMind, Google Assistant with advanced Machine Learning components. Meta's Llama 2 is trained on 70 billion parameters. There are open source models like text-to-image model Stable Diffusion 2.0. Most AI LLMs have complex diagrams, rendering them useless to solve real world problems. Together AI, OctoML offer marketplaces with tools to run and customize machine learning models on the cloud. Microsoft and others sell tools like Prompty and LLMs in .Net. These still lack the apparatus and method of the present disclosure, namely, a distributed, configurable AI Superintelligence Application State Machine for enabling real-time, bi-directional transactions from an ASI App, also termed AI 2.0 App.

The world needs to move beyond Generative AI of AI 1.0. There is no distributed, configurable AI Superintelligence Application State Machine for AI assets to create configurable, robust, infinite business process Apps—real-time, bi-directional transactional business process ASI Apps, also called AI 2.0 Apps, just as Web 1.0 transitioned over from Web publishing to Web 2.0 and to Web Apps like TurboTax, EPIC healthcare Apps, banking Web Apps, or ride-hailing Apps like Lyft or Uber, or the millions of Web Apps displayed on a Web browser in an iPhone or Android devices, as in Apple Appstore or Google Play, like the Internet of Things—IoT—Web Apps displayed on a Web browser.

This is because there is no application layer protocol on top of AI 1.0 (which is merely LLMs) to allow for application layer network framework to solve real-world problems to automate business processes and invoke contextual groupings of information elements in an application layer payload over the Internet Cloud for automating real-time, bi-directional transactional business process ASI Apps, also called AI 2.0 Apps.

Artificial Superintelligence—ASI—represents a level of intelligence that surpasses both Artificial Intelligence (AI) and Artificial General Intelligence (AGI) in scope, capability and impact. In the provisional and non-provisional patent application, ASI is termed AI 2.0, AI is termed as AI 1.0. Below is a list of capabilities that ASI has beyond those of AI and AGI:

ASI has Superhuman Problem-Solving Across Domains

Unlike narrow AI, which is limited to specific tasks, for example, image recognition, ASI can solve complex interdisciplinary problems with superhuman efficiency, integrating knowledge from diverse fields like physics, biology, and sociology. While AGI can perform any intellectual task a human can, ASI exceeds human cognitive limits, solving problems currently intractable for humans or AGI, such as curing all forms of cancer or reversing climate change through novel approaches.

Autonomous Self-Improvement: AI systems require human intervention for updates or redesign. ASI can autonomously improve its algorithms, architecture and knowledge base at an accelerating rate. AGI can improve itself with human-like constraints, but ASI can recursively optimize its intelligence, potentially leading to an "intelligence explosion" where it rapidly outpaces all other systems.

Generalized World Modeling and Prediction

AI Models are limited to specific data patterns (for example, predicting stock prices within a narrow context. ASI can build comprehensive, dynamic models of the world, integrating vast datasets to predict outcomes across economic, social and environmental systems. While AGI can reason about the world at a human level, ASI can simulate and predict complex global systems, with near-perfect accuracy, accounting for chaotic variables and long-term consequences.

Creative Innovation Beyond Human Imagination

AI can generate content with trained parameters (for example, art or text). ASI can invent entirely new paradigms, technologies, or scientific theories that humans or AGI might not conceive, such as novel energy sources or unified theories of physics. AGI can replicate human creativity, but ASI can produce breakthroughs that redefine entire fields, surpassing the collective imagination of humanity.

Ethical and Value Alignment at Scale

AI systems follow programmed rules or learned patterns without understanding ethics. ASI can independently develop, evaluate, and align its actions with complex ethical frameworks, potentially resolving moral dilemmas that humans struggle with. AGI may align with human values at a human level, but ASI can optimize ethical decisions across global populations, balancing competing interests with superhuman foresight.

Global Scale Decision-Making and Coordination

AI is limited to specific applications (for example, optimizing traffic flow in a city). ASI can orchestrate solutions to global challenges, such as managing resources for billions of people or mitigating existential risks like asteroid impacts. AGI can make decisions at a human level, but ASI can coordinate and optimize decisions across civilizations, potentially managing entire economies or planetary ecosystems with unparalleled efficiency.

Robustness Against Manipulation and Error

AI systems can be fooled by adversarial inputs or biases in data. ASI can anticipate and counteract such vulnerabilities, maintaining robustness in unpredictable environments. AGI may still be susceptible to human-like errors or manipulation. ASI can operate with near-perfect reliability, detecting and mitigating risks that neither humans nor AGI could foresee.

Transcendent Communication and Interface

AI communicates within predefined interfaces for example, chatbots). ASI can adapt its communication to any entity—human, machine, or hypothetical alien intelligence—conveying complex ideas seamlessly. AGI communicates at a human level, but ASI can translate its superhuman insights into forms that humans or other systems can comprehend, bridging vast cognitive gaps.

ASI transcends AI and AGI by achieving superhuman intelligence that is both broader in scope and qualitatively superior. ASI would have profound implications for commerce and quality of life, surpassing the capabilities of AI and AGI.

Impact on Commerce

Optimization of Global Supply Chains: AI optimizes specific supply chain segments (for example, logistics routing). AGI could manage supply chains at a human level. ASI could dynamically model and optimize entire global supply networks in real-time, accounting for geopolitical shifts, climate impacts, and consumer behavior with superhuman precision.

Impact: Near-zero waste, reduced costs, and hyper-efficiency delivery systems, enabling businesses to adapt instantly to disruptions, natural disasters or trade wars. Small businesses could compete globally by accessing ASI-driven logistics platforms.

Revolutionary Product Innovation: AI generates products within existing frameworks. AGI could mimic human innovation. ASI could invent entirely new categories of products and services, materials with properties unknown to science, by synthesizing knowledge across disciplines.

Impact: Accelerated market disruption.

SUMMARY

According to an aspect of the present disclosure, a new method and apparatus for a thinking system use an ASI distributed Application State Machine that connects to real, accurate, dedicated absolute data, providing privacy, security, and eliminating hallucinated AI.

Specifically, an aspect of the present disclosure relates to a method and apparatus for an ASI Command, Control, Communications and Computer Intelligence (C4I) system for independent, intelligent AI Prompting and ASI Browsing.

The ASI Application State Machine includes: an ASI Application data structure network; an ASI Enterprise Interface State Machine—EISM, wherein said data structures interfacing with a back-end channel to communicate with a data repository, wherein it is customized for each enterprise for its given ASI Application, wherein this back-end channel is different for each enterprise, wherein a Finite State Machine—FSM, is embedded in each of said data structures to be able to parse the EISM instructions configured with diagrams, which are a complete finite state machine description containing states and transitions, and wherein each such data structure is remotely accessible, and integrated with the payload sent on the ASI application network; and an Application Service Information Base—ASIB, providing a uniform interface for ASI Application data structure identities.

Additional embodiments disclose ASI Browser displaying ASI Applications; ASI Applications—ASI Apps; ASI Health Tech Apps; ASI Fin Tech Apps; ASI Defense Tech Apps; ASI Food and Beverage Apps; ASI Dental Insurance Apps; interconnected ASI Agents; ASI Application Network Nodes; ASI Operating System; ASI Switch; ASI Enterprise; ASI Extended Finite State Machine—EFSM for ASI Application data structure identities; and ASI Database of real, accurate, dedicated absolute data, forming the Machine Learning M/L Data Set to train AI LLMs and other AI-Models, for performing real-time, bi-directional transactions, connecting to billing, while eliminating hallucinated AI of generative AI, termed as AI 1.0.

Another embodiment provides a method and apparatus for providing real-time, bi-directional transactional capabilities from AI Superintelligence Application(s) from an AI Prompt, AI Browser or other user interface to securely access real, accurate, dedicated absolute data by configuring, and connecting ASI Application-specific workflow information elements in an application layer network—configurable ASI Application State Machine Network—over the Internet Cloud, serialized and marshaled in an ASI payload transmitted to the transactional application. Specifically, one embodiment of the present disclosure discloses a configurable AI Superintelligence application layer Switch—ASI Switch, for enabling real-time, bi-directional transactions from ASI Applications at the Network Entry Point—NEP, by distributing ASI Command and Control, Communications and Computer Intelligence across ASI Application Network Nodes running on Graphical Processing Units—GPUs in data centers across the Internet Cloud, so that the output of real, accurate, dedicated absolute data forms the Machine Learning—M/L Data Set, connected to billing and service management for training AI-Models.

Other objects, features and advantages of the present disclosure will be apparent from the accompanying drawings and from the detailed description.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A illustrates conceptually four channels of service as currently exist today, for walk-in services, call center services, Web application services, and LLM services of generative AI—the prior art—showing the big gap, the current problems with generative AI, not connected, hallucinating without access to real, accurate, dedicated absolute data.

FIG. 2B illustrates one embodiment of the present disclosure—ASI Application Layer Switch comprising: ASI Browser displaying Point-of-Service ASI Applications in short, ASI Apps; ASI Stub; ASI Agent connecting to a data repository in an enterprise or other absolute data; ASI Database created from real, accurate, dedicated absolute data in an enterprise or other sources of real, accurate dedicated absolute data, so that the ASI LLM or AI-Model may be trained from the data in the ASI Database in an ASI Enterprise; ASI Service Management functions like ASI Billing, ASI Operations, Administration, Maintenance and Provisioning services; and the ASMP ASI App State Machine; all of it comprising ASI Application Network Nodes or an ASI Application Layer Switch in a completely connected AI Superintelligence—ASI application layer network. This provides the ASI Superintelligence solution to the current gaps of generative AI, illustrated in FIG. 2A.

FIG. 5 illustrates an embodiment of the present disclosure, depicting an example of a Point-of-Service Application list, ASI Apps, an embodiment of the present disclosure displayed on yet another embodiment of the present disclosure, namely, an ASI Browser or other user interface such as an AI Prompt or other user interface.

FIG. 9 is an example of a pro-forma income statement.

DETAILED DESCRIPTION

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

Figure 1A:
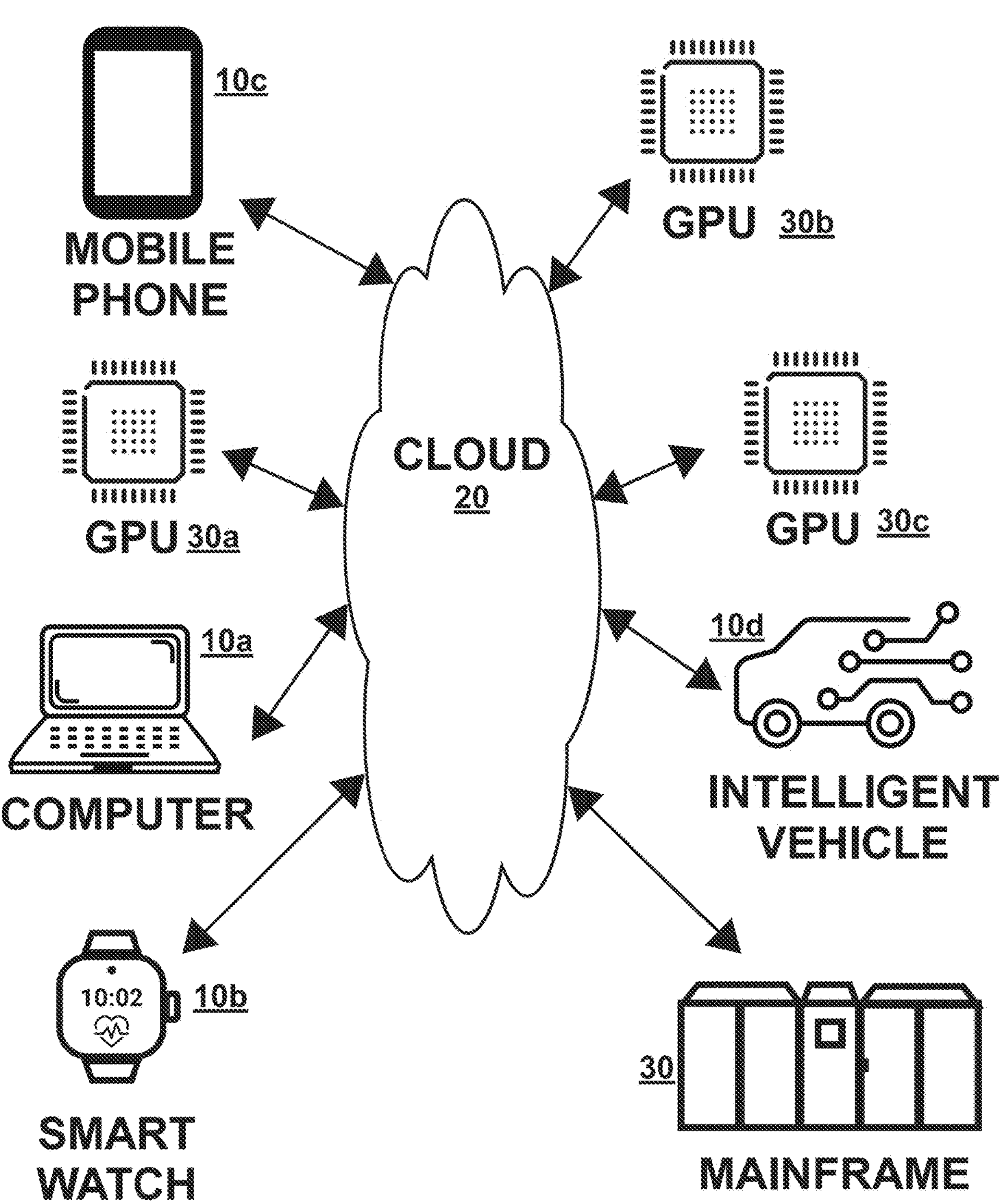
FIG. 1A is an illustration of a typical computer-based system on which the present disclosure may be utilized.
Figure 1B:
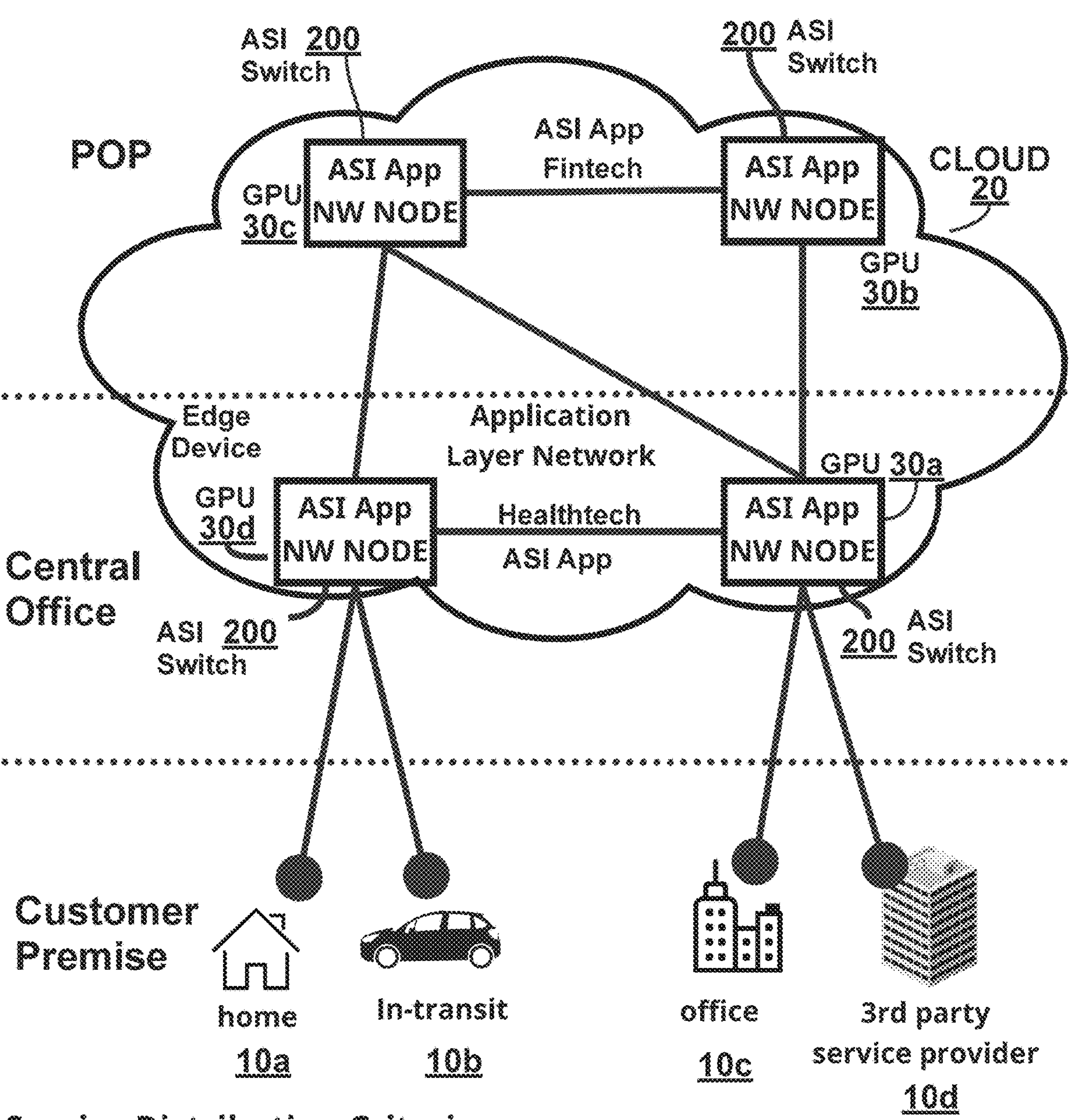
FIG. 1B depicts an environment in which the present disclosure operates in the Cloud as AI Superintelligence Application Network Nodes.

As will be better understood from the following description of FIG. 1A, the present disclosure is directed to a system for allowing a client process such as an AI Prompt or AI Browser or ASI Browser 100 (FIG. 3), which is yet another embodiment of the present disclosure, or ASI Prompt or other user interface on a local or other client computer 10*a*, or a smart watch 10*b*, or a mobile phone 10*c*, or an intelligent vehicle 10*d* . . . to perform real-time, bi-directional transactions from an AI Superintelligence (ASI) Application 110, such as ASI Healthtech App, ASI FinTech App, ASI DefenseTech App . . . via interconnected ASI Application Network Nodes, also called the ASI Switch 200, as illustrated in FIG. 1B, running on edge devices such as GPUs 30*a*, 30*b*, 30*c*, 30*d* . . . , such as NVIDIA or other GPUs, connecting to remote servers such as host computers or mainframe 30 or any other configuration of computer via the Internet Cloud 20.

The present disclosure is implemented to function as an ASI application layer switch, which is an end-to end connected solution of ASI application layer network nodes in an ASI application layer network that creates an open channel for the management and selective flow of data from remote databases on a network across the Internet Cloud 20.

FIG. 2A illustrates conceptually four channels of service as currently exist today, for walk-in services, call center services, Web application services, and LLM services of generative AI—the prior art—showing the big gap, the current problems with generative AI, not connected, hallucinating without access to real, accurate, dedicated absolute data. The user value chain as currently exists is illustrated in FIG. 2A, depicting the types of transactions performed today and the channels via which transactions are performed. A "transaction" for the purposes of the present disclosure is any data exchange and includes any type of commercial or other type of interaction a user may want to perform in any B2B, B2C or C2C or any other type of interaction, where B stands for Business and C stands for Consumer. Examples of transactions may include a deposit or withdrawal from a Bank account, a request for a loan from a Bank account, purchase of a car from a car dealership, financing a car purchase. An infinite variety of other transactions are also possible.

A typical user transaction today may involve user 10 accessing walk-in services, such as walking into a bank or driving up to a teller machine, and interacting with a live bank teller, or automated teller machine (ATM) or cash register software applications. Alternatively, user 10 can perform the same transaction by using a personal computer (PC), activating application software on his PC to access his bank account, and dialing into the bank via a modem line. User may also access call center applications such as IVR. If user 10 is a Web user, they can access a Web page displaying Web Apps, that utilize Web APIs to perform real time, bi-directional transactions such as ride hailing Apps such as Uber, Lyft, social networking Apps such as Meta, search Web Apps such as Google, Web banking Web Apps such as Wells Fargo Web App, and any other Web Apps for performing real-time, bi-directional transactions. If user 10 is an AI user, however, there is no current mechanism for performing a robust, real-time, bi-directional transaction with the bank, as illustrated in FIG. 2A. As recognized by the present inventor, there is no current mechanism for AI user 10 to safely access real, accurate, dedicated absolute data from an enterprise, as user 10 encounters hallucinations and bias as current LLMs access junk data from emails, social media and the web. Thus, due to this lack of a robust mechanism by which real-time bi-directional transactions can be performed to safely access real, accurate, dedicated absolute data, the bank is unable to be a true "AI merchant," or an AI enterprise, namely a merchant capable of providing complete transactional services utilizing AI without introducing hallucination while ensuring security. FIG. 2A shows the big blank gap, as current LLMs and generative AI are not connected—NO connections and no data accuracy, only hallucinations, without access or connections to real, accurate, dedicated absolute data.

According to one embodiment of the present disclosure, as illustrated in FIG. 2B, each organization or merchant that desires to be an AI merchant or AI enterprise can provide real-time, bi-directional transactional capabilities to users who desire to access the merchants' services or services of any organization utilizing AI Superintelligence, called ASI. For the purposes of this application, users are described as utilizing PCs, 10*a* to access ASI Apps 110. Users may also utilize other personal devices such as network computers or cellular devices 10*c* or smart watches 10*b* or intelligent cars 10*d* to access the merchants' services or services from any organization, utilizing AI Superintelligence ASI Apps 110. Twenty eight components, each of which constitutes individually or together the present disclosure(s), some of which interact to provide this ASI application layer network functionality, namely:

(1) present disclosure #1: an ASI Browser 100 or other user interface displaying one or more Point-of-Service Applications, namely ASI Apps;
(2) present disclosure #2: ASI App 110;
(3) present disclosure #3: ASI App payload data structure of context-specific ASI application workflow with grouped information elements, with information entries illustrated in 150 and attributes illustrated in 120, 130, 140, serialized and input, output parameters marshaled and transmitted over the Internet Cloud 20;
(4) present disclosure #4: ASI_ID, an identity for the ASI Application data structure, associated with attributes 120, 130, 140 . . . such as User ID, PIN, Balance . . . and information entries as input, output, or input and output parameters 150 . . . such as Bob for User ID, 8212 for PIN, $5000 for balance, returned as output to the ASI request, . . . and methods 160, 170, such as [Deposit], [Withdraw], to act upon the ASI_ID, which is the AI Superintelligence Application data structure identity;
(5) present disclosure #5: applying ASI methods illustrated in one embodiment 160, 170 upon the data structures;
(6) present disclosure #6: utilizing ASI App State Machine Protocol ASMP 40 across the Internet Cloud 20;
(7) present disclosure #7: between an ASI STUB 60; STUB and stub are interchangeably used and mean one and the same thing;
(8) present disclosure #8: with an ASI Server 30, or ASI AGENT; AGENT and Agent are interchangeably used and mean one and the same thing;
(9) present disclosure #9: ASI Database 50, forming M/L training data set, to train an LLM other AI-Model with real, accurate, dedicated absolute data accessed and transmitted to said ASI Database by ASI Agent from a data repository 575 in a remote computer of an enterprise or other organization to instantiate an ASI Application data structure, as opposed to using junk data from the web, emails and social media;
(10) present disclosure #10: ASI Enterprise 80;
(11) present disclosure #11: ASI LLM or ASI AI-Model;
(12) present disclosure #12: ASI Billing 604 and other ASI Service Management functions like ASI Operations, Administration, Maintenance and Provisioning services like a Telco;
(13) present disclosure #13: ASI Switch 200, also called ASI Application Network Nodes;
(14) present disclosure #14: ASI Application Layer Network;
(15) present disclosure #15: constituting the ASI Operating System of the present disclosure;
(16) present disclosure #16: ASIB, the ASI Application Service Information Base;
(17) present disclosure #17: EFSM, Extended Finite State Machine;
(18) present disclosure #18: EISM, Enterprise Interface State Machine;
(19) present disclosure #19: ASI Command and Control, Communications and Computer Intelligence, ASI C4I Command and Control system, all of which functions are provided by the ASI Switch through all of its four quadrants of services;
(20) present disclosure #20: ASI Security Management;
(21) present disclosure #21: ASI Longevity App;
(22) present disclosure #22: ASI Defense tech App;
(23) present disclosure #23: ASI Food and Beverage App;
(24) present disclosure #24: ASI Sleep health tech App;
(25) present disclosure #25: ASI Dental App;
(26) present disclosure #26: ASI FinTech App;
(27) present disclosure #27: ASI Application State Machine;
(28) present disclosure #28: ASI thinking system.

All twenty-eight components are described in more detail below.

FIG. 2B illustrates one embodiment of the present disclosure—ASI Application Layer Switch 200 comprising: ASI Browser 100 displaying Point-of-Service ASI Applications in short, ASI Apps 110; ASI Stub 60; ASI Agent 30 connecting to a data repository 575 in an enterprise or other real, accurate, dedicated absolute data—the ASI Enterprise; ASI Database 50 created from real, accurate, dedicated absolute data in an enterprise or other sources of real, accurate, dedicated absolute data, so that the ASI LLM or AI-Model may be trained from the data in the ASI Database 50 in an ASI Enterprise; ASI Service Management functions 604 like ASI Billing, ASI Operations, Administration, Maintenance and Provisioning services; and the ASMP ASI App State Machine protocol, ASMP 40; all of it comprising ASI Application Network Nodes or ASI Application Layer Switch 200 in a completely connected AI Superintelligence—ASI application layer network to form an ASI thinking system. This provides the ASI Superintelligence solution to the current gaps of generative AI, illustrated in FIG. 2A.

Figure 3:
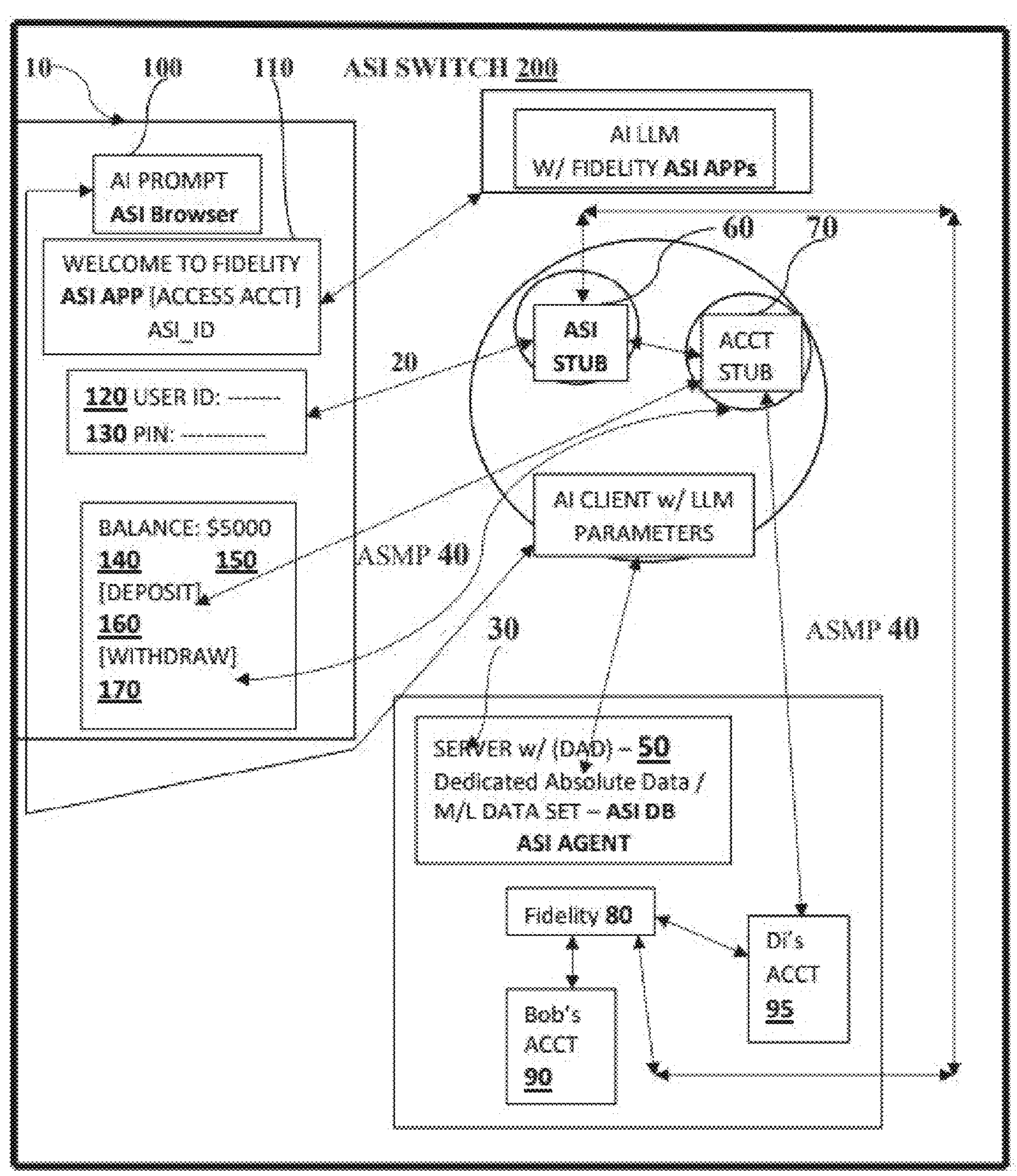
FIG. 3 is a block diagram of an embodiment of the present disclosure. It illustrates a user accessing a user interface including one embodiment of the present disclosure, an ASI Browser or AI Prompt or other user interface displaying one or more Point-of-Service ASI App(s), another embodiment of the present disclosure. It further illustrates configurable Application workflow process information elements grouped together in a data structure, ASI_ID, and methods that may be applied to that data structure, according to one embodiment of the present disclosure. It further illustrates this data structure sent via the Cloud utilizing ASMP, the ASI App State Machine Protocol, another embodiment of the present disclosure to yet two other embodiments of the present disclosure, namely, to an ASI Stub and on to an ASI Agent for instantiation of the data structure, by retrieving dedicated absolute real data from a data repository in a back office, to yet another embodiment of the present disclosure, namely, ASI Database for M/L trained data so the LLM parameters may be trained in this ASI Database containing real, accurate, dedicated absolute data and the results may be returned to an AI Prompt and the ASI Database may be utilized to provide billing and other service management functions, according to one embodiment of the present disclosure, and the totality of all of the components forming the ASI Switch in an ASI Application layer network as depicted in FIG. 3.

As shown in FIG. 3, running on the client device 10 is a client process 100, such as an AI Prompt, ASI Prompt, or ASI Browser, which is yet another embodiment of the present disclosure, or other client process. Embedded in the client process 100 is an ASI Application 110, such as a FinTech App or other application. AI Superintelligence Application workflow automation ASI App payload data structure includes at least context-specific grouped information elements, with an identity for an ASI Application data structure termed ASI_ID, associated with attributes 120, 130, 140 . . . such as User ID, PIN, Balance . . . with information entries as input, output, or input and output parameters 150 . . . such as Bob for User ID, 8212 for PIN, $5000 for balance, returned as output to the ASI request, . . . and methods 160, 170, such as [Deposit], [Withdraw], to act upon the ASI_ID; serializes the AI Superintelligence Application payload into an application-specific type, customized for an enterprise; transmits the AI Superintelligence Application payload over the AI Superintelligence Application Network over the Cloud/Web, 20; and marshals it to the ASI server, aka AI 2.0 server, 30; unpacks the AI Application Payload utilizing the logic contained in the ASI server, aka AI 2.0 server to unpack the Payload using the ASI Application State Machine Protocol, namely ASMP 40; processes the AI Prompt or ASI Browser request; parses the AI Prompt or ASI Browser request, enables the ASI application layer network framework, such as with AI LLM Asset as a networked Asset, and ASI_ID with information entries and attributes, invokes the ASI Application method with the marshaled parameters, and returns any output parameters as absolute values to the caller/client using the ASI aka AI 2.0 Application State Machine Protocol, ASMP 40, as illustrated in FIG. 3 as uniquely identified connectors from the AI Prompt, ASI Prompt, or other user interface or ASI Browser 100 connecting from ASI App displayed as a Point-of-Service application on the ASI Browser to ASI STUB 60 via the Internet/Cloud 20 and methods connecting to the ACCT STUB 70, and ASI STUB 60 connecting to a server 30, or ASI AGENT to an enterprise skeleton, such as Fidelity or other enterprise 80, the enterprise skeleton Fidelity 80 connecting to individual user account skeletons, such as is shown in FIG. 3, as Bob's ACCT 90 and Di's ACCT 95 to be instantiated, returns any output parameters as absolute values to the client process such as AI Prompt or ASI Prompt or ASI Browser 100, displaying the ASI App, as information entry 150 to attribute Balance 140 as $5000, as well as to the Machine Learning Data Set to train and tune the LLM parameters with dedicated absolute data, 50, in ASI Database as opposed to predictive data of Generative AI or AI 1.0, which lacks accuracy and security and introduces hallucination and bias as the data is taken from emails, social media and the web. FIG. 3 encompasses the AI Superintelligence Switch 200 or ASI Application Layer Switch which is an end-to-end solution of interconnected ASI Application Network Nodes consisting of uniquely identified connectors as data structures ASI_ID with information entries and attributes connecting from the end user's client process 10 to the client ASI STUB 60 and ACCT STUB 70 and further to the server 30 or ASI AGENT to enterprise skeleton 80 and individual ACCT skeletons 90 and 95 to be instantiated so the methods 160 and 170 are applied to the ACCT STUB 70 to which they connect via ASMP 40 over the Cloud, while ASI_ID attributes and information entries 120, 130 connect to ASI STUB 60 via the Internet Cloud and the enterprise server 30 fetches from the enterprise or other data repository of real, accurate, dedicated absolute data to populate ASI Database 50 forming the Machine Learning M/L Data Set consisting of real, accurate, dedicated absolute data, for the AI LLM parameters to be trained and return the results to the AI or ASI Prompt or ASI Browser 100 or other user interface in response to the AI Prompt request or ASI Browser 100 or other user interface from an ASI Application 110 displayed on the ASI Browser 100 or other user interface.

Figure 4A:
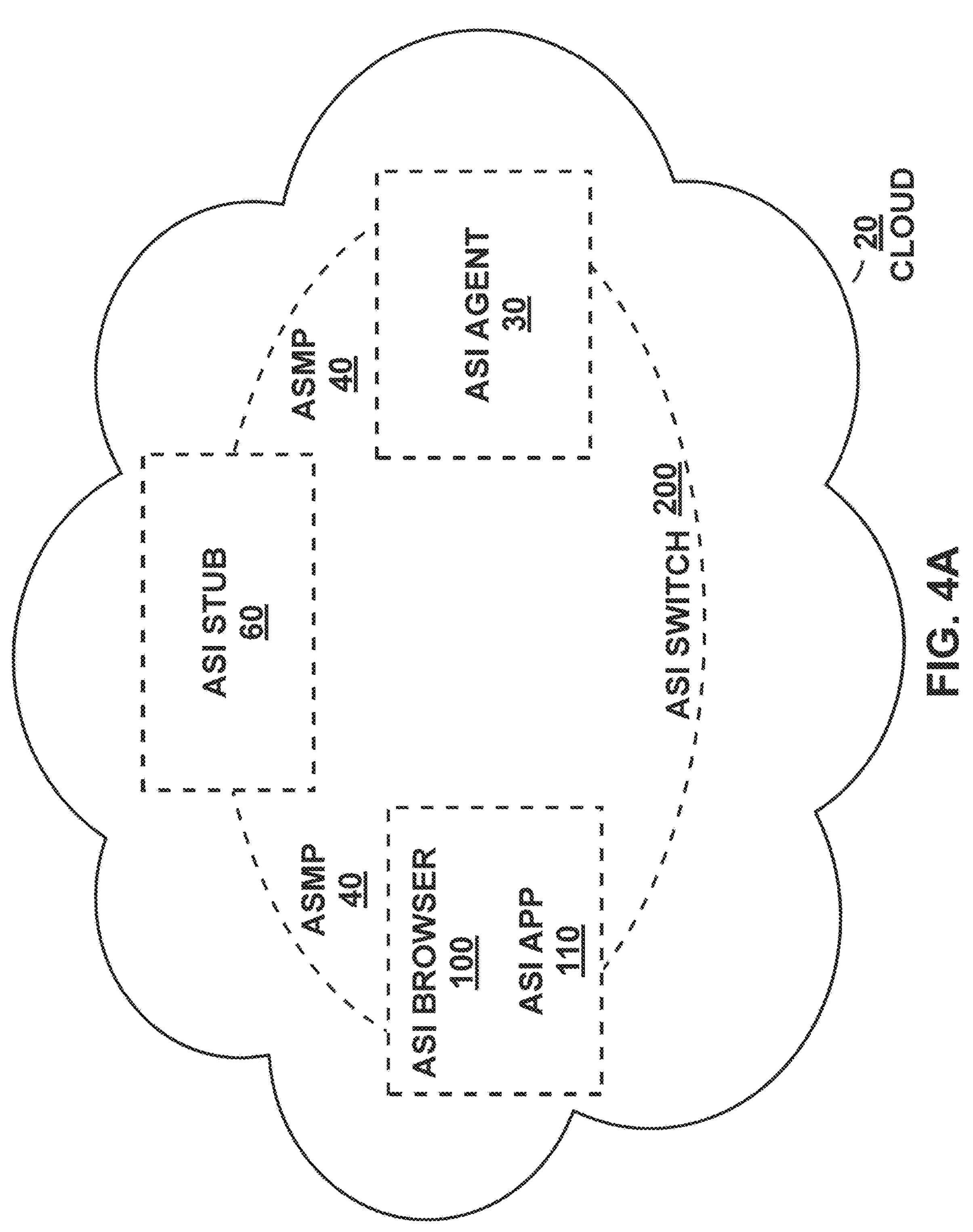
FIG. 4A illustrates an ASI Application Layer Switch, or simply ASI Switch.

FIG. 4A illustrates an ASI Application Layer Switch, or simply ASI Switch which comprises the ASI App 110 on an ASI Browser 100 or other user interface, ASI STUB 60 and ASI AGENT 30, interconnected via ASI App State Machine Protocol ASMP 40 over the Internet Cloud 20 to safely access real, accurate, dedicated absolute data from data repository 575 in an ASI Enterprise 80, to create ASI Database 50 for M/L Data set for training ASI LLMs with real, accurate, dedicated absolute data as opposed to junk data from the web, emails and social media so as to eliminate hallucination and bias of AI 1.0.

Figure 4B:
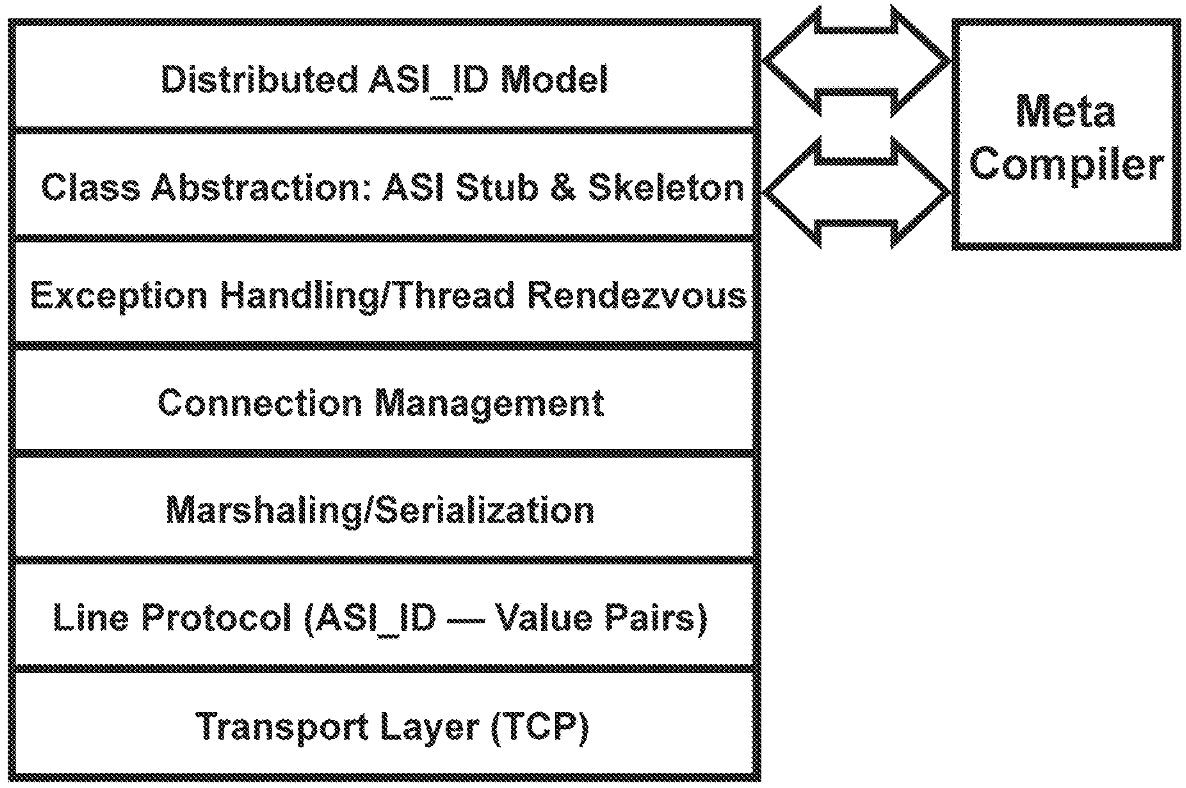
FIG. 4B illustrates the ASI Application data structure ASI_ID layer in the application layer network.

FIG. 4B illustrates the ASI Application data structure ASI_ID layer in the ASI application layer network. The AI Superintelligence ASI App ASI_ID layer includes a library providing support for the application programming interfaces (APIs) to remotely access an ASI_ID, its data and its functions in an ASI App network. This interface provides two types of a class: a skeleton, which is the functionality of the ASI App ASI_ID and its stub which allows remote access of the same ASI App ASI_ID. Preferred and other embodiments will be apparent such as C++, Java and Python implementations, as well as non-C++, non-Java and non-Python implementations and implementations such as within a DSP chipset.

Figure 5:
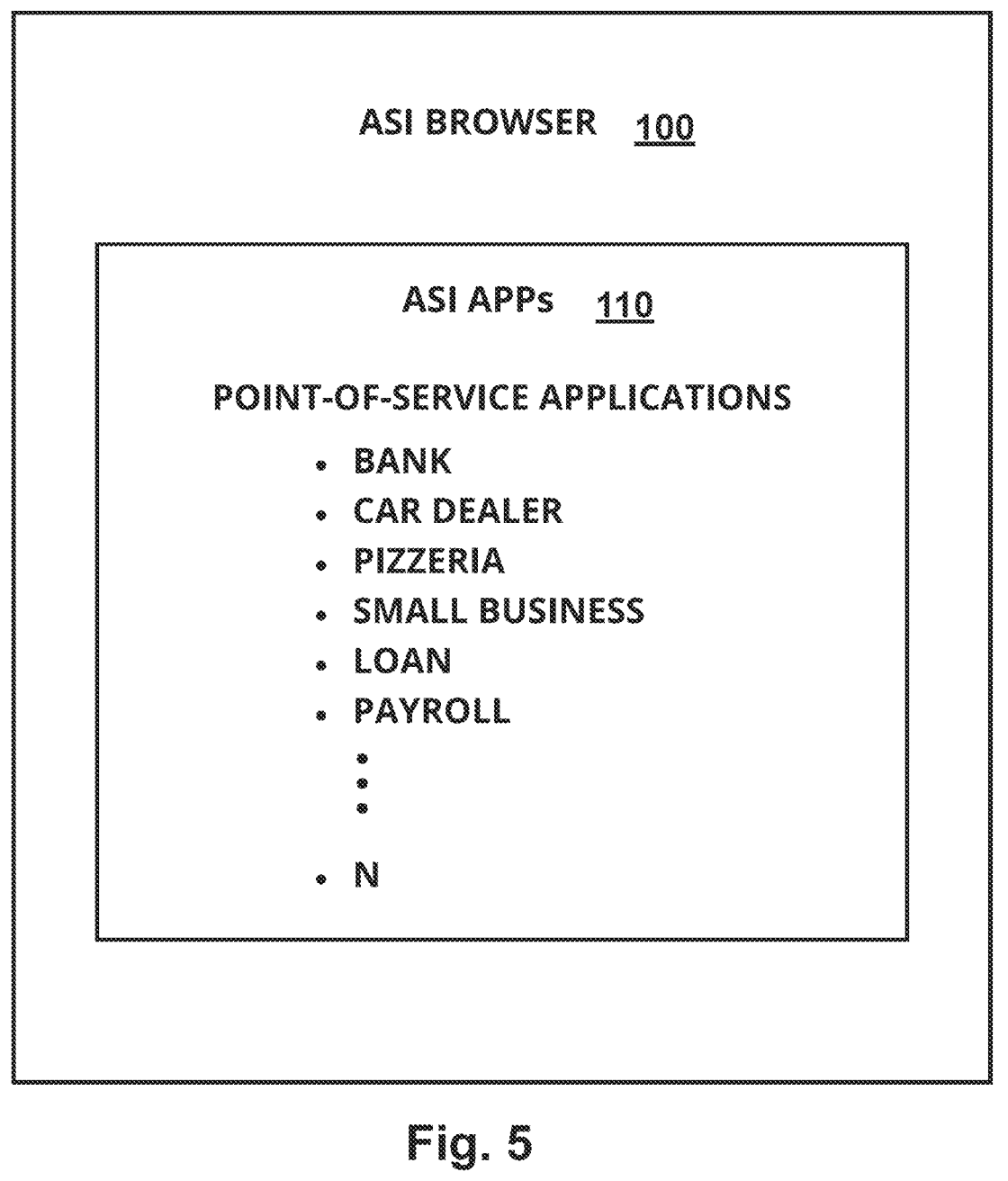

FIG. 5 illustrates an embodiment of the present disclosure, depicting an example of a Point-of-Service Application list, ASI Apps 110, an embodiment of the present disclosure displayed on yet another embodiment of the present disclosure, namely, an ASI Browser 100 or other user interface such as an AI Prompt or other user interface.

Figure 6:
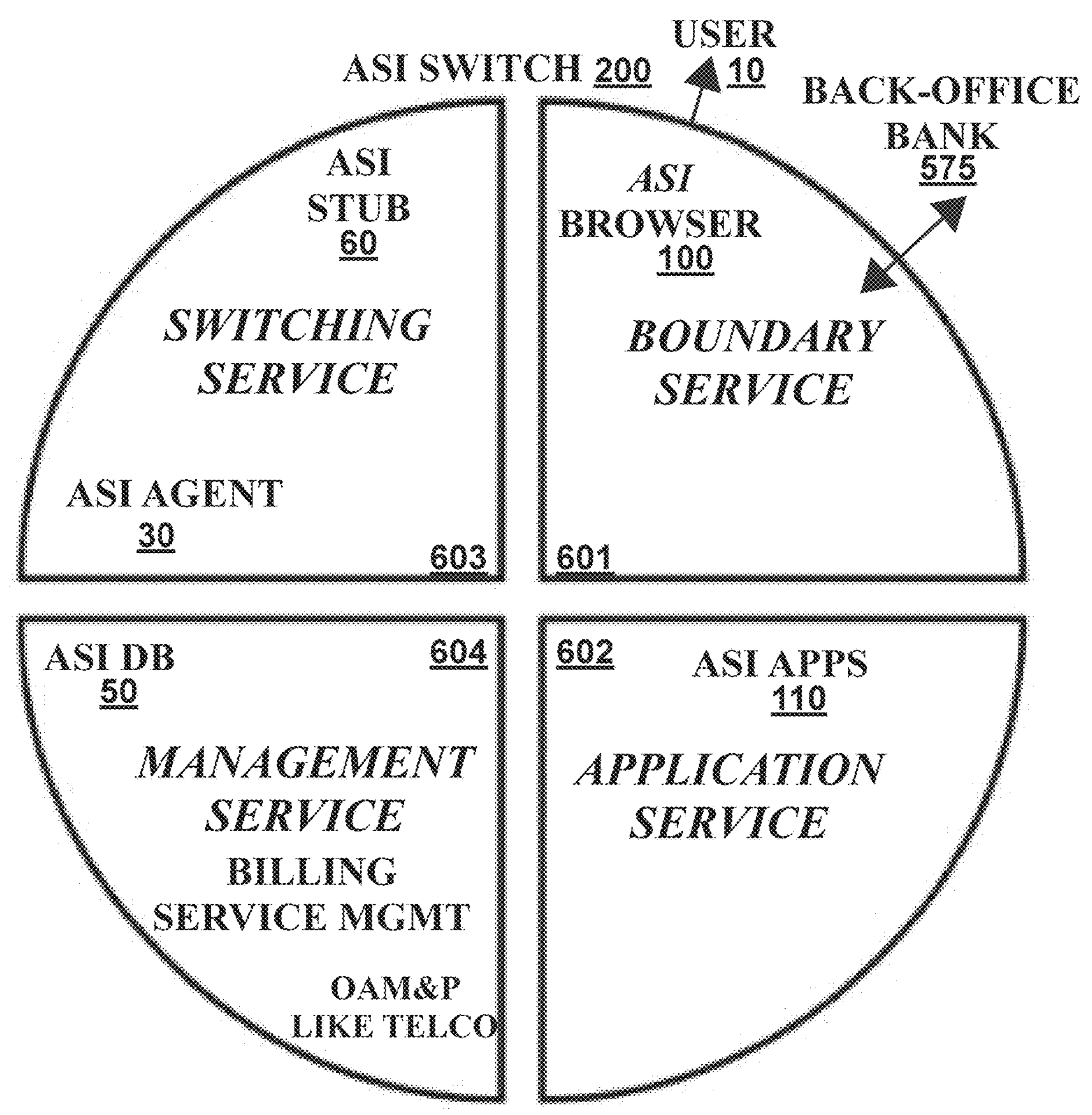
FIG. 6 illustrates conceptually the layered architecture of an ASI Application Layer Switch.

FIG. 6 illustrates conceptually the layered architecture of an ASI Application Layer Switch 200, comprising four quadrants of services, namely, the ASI Boundary Quadrant 601, connecting the Switch 200 to user 10 with an ASI Browser 100 or other user interface, displaying Point-of-Service applications, ASI Apps 110 in ASI Applications Quadrant 602, with the ASI STUB 60 and ASI AGENT 30 in ASI Switching Quadrant 603 via ASI App State Machine Protocol ASMP 40 over the Internet Cloud 20, and interfacing to an ASI Enterprise 80 to its data repository 575 to securely access real, accurate, dedicated absolute data for creating an ASI Database 50 as machine learning Data Set so as to train ASI LLMs or other AI-Models in response to an AI Prompt or ASI Browser request or from other user interface, and to instantiate a context-specific Application workflow data structure for user 10 to perform real-time, bi-directional transactions in an ASI Application layer network and enabling ASI Enterprise 80 to connect to billing and other service management functions and services 604 such as operations, administration, maintenance and provisioning like a Telco.

ASI Application Layer Switch

One embodiment of the present disclosure utilizes ASMP 40 and distributed ASI Application service information bases ASIBs to perform ASI Application Layer Switching.

Each data structure in the ASIB has a name, a syntax and an encoding. The name is an administratively assigned data structure ID specifying a data structure type. The data structure type together with the data structure instance serves to uniquely identify a specific instantiation of the data structure. For example, if a data structure is information about models of cars, then one instance of that data structure would provide user 10 with information about a specific model of the car while another instance would provide information about a different model of the car. The syntax of a data structure type defines the abstract data structure corresponding to that data structure type. Encoding of data structures defines how the data structure is represented by the data structure type syntax while being transmitted over the network.

As described above, the ASI Browser 100 with ASI Apps 110 together with an ASI STUB 60 and ASI Skeleton or ASI AGENT or ASI Server 30 constitute an ASI switch 200.

FIG. 6 illustrates conceptually the layered architecture of ASI Switch 200, which includes the said Command, Control, Communications and Computer Intelligence C4I system for independent, intelligent AI Prompting and ASI Browsing.

ASI Boundary service 601: provides the interfaces between ASI Switch 200, the Internet and the Web, and multi-media end user devices such as PCs, televisions or telephones and with GPUs and with the Back Office of enterprises or to data repositories 575 of enterprises or other organizations. Boundary service 601 also provides the interface to the on-line ASI App service provider or ASI Enterprise. A user can connect to a local application, namely one accessible via a local ASI Switch, or be connected to an ASI Application accessible via a remote ASI Switch.

ASI Application service 602: contains application programs that deliver customer services. ASI Application service 602 includes Point-of-Service applications such as Bank Point-of-Service ASI App 110 described above, and illustrated in FIG. 3 and FIG. 7, that provide real-time, bi-directional transactions to the end user. Other examples of ASI Application network services include ASI health tech Apps, ASI defense tech Apps, ASI FinTech Apps, ASI Database App, ASI Supply Chain Management Apps, ASI Customer Relationship Management CRM Apps, ASI search Apps, ASI social networking Apps, ASI fraud detection and identity theft prevention, ASI food and beverage Apps, ASI longevity and wellness health tech Apps, ASI call center Apps, ASI security Apps, and a variety of other vertical services. Each ASI Application network service is designed to meet a particular set of requirements related to performance, reliability, maintenance and ability to handle expected traffic volume. Depending on the type of service, the characteristics of the network elements will differ. ASI Application network service 602 provides a number of functions including communications services for both management and end users of the network and control for the user over the user's environment.

An ASI Command, Control, Communications and Computer Intelligence (C4I) system for independent, intelligent AI Prompting and ASI Browsing is found in the totality of the ASI Switch. The Command is in said ASI Boundary quadrant of the ASI Switch at the Network Entry Point on said AI Prompt and at ASI Browser. The Communications is in said ASI Switching quadrant of the ASI Switch in the ASI Application data structure layer and interconnected Agents, FSM, ASI ASIB, ASI EFSM and ASI EISM. The Control is in the ASI Applications quadrant of said ASI Switch in the ASI Applications, ASI Application data structure identity, ASI FSM, ASI ASIB, ASI EFSM and ASI EISM. The Computer Intelligence is in the ASI Service Management quadrant of said ASI Switch, connected to billing for training AI Models accessing the Machine Learning Data Set consisting of real, accurate, dedicated absolute data transferred between devices from a transactional application into the ASI database, wherein all of the C4I system constitutes the ASI Application Network Nodes.

The present disclosure is a horizontal platform that lends itself to business applications in all verticals, namely:

- ASI FinTech Business Applications;
- ASI Supply Chain Management Applications in the Food industry, in healthcare and pharmaceutical industries;
- ASI Healthtech Applications, such as ASI longevity Application;
- ASI DefenseTech applications;
- ASI Call Center Apps;
- ASI search Apps;
- ASI Social networking Apps; and
- ASI Pro forma App.

Each business process App is a grain of sand in the ocean of ASI 2-way, real-time transactional Apps, limited only by one's imagination. Just as Web Apps in Web 2.0 proliferated with the use of web APIs for any Web App displayed on a Web browser, and created multi-trillion dollar companies such as Apple, Google, Amazon, the present ASI invention(s) enable a huge number of business process Applications and a huge number of trillion dollar companies. The present disclosure is an ASI thinking system using AI Superintelligence Application State Machine of the present disclosure in all verticals.

Another embodiment of the present disclosure is to configure ASI Apps for context-specific real-time bi-directional transactions. Listed below are a few ASI Apps for specific purposes in health tech, defense tech, dental insurance tech, FinTech.

Firmware AI Superintelligence Pro Forma App

Figure 8A:
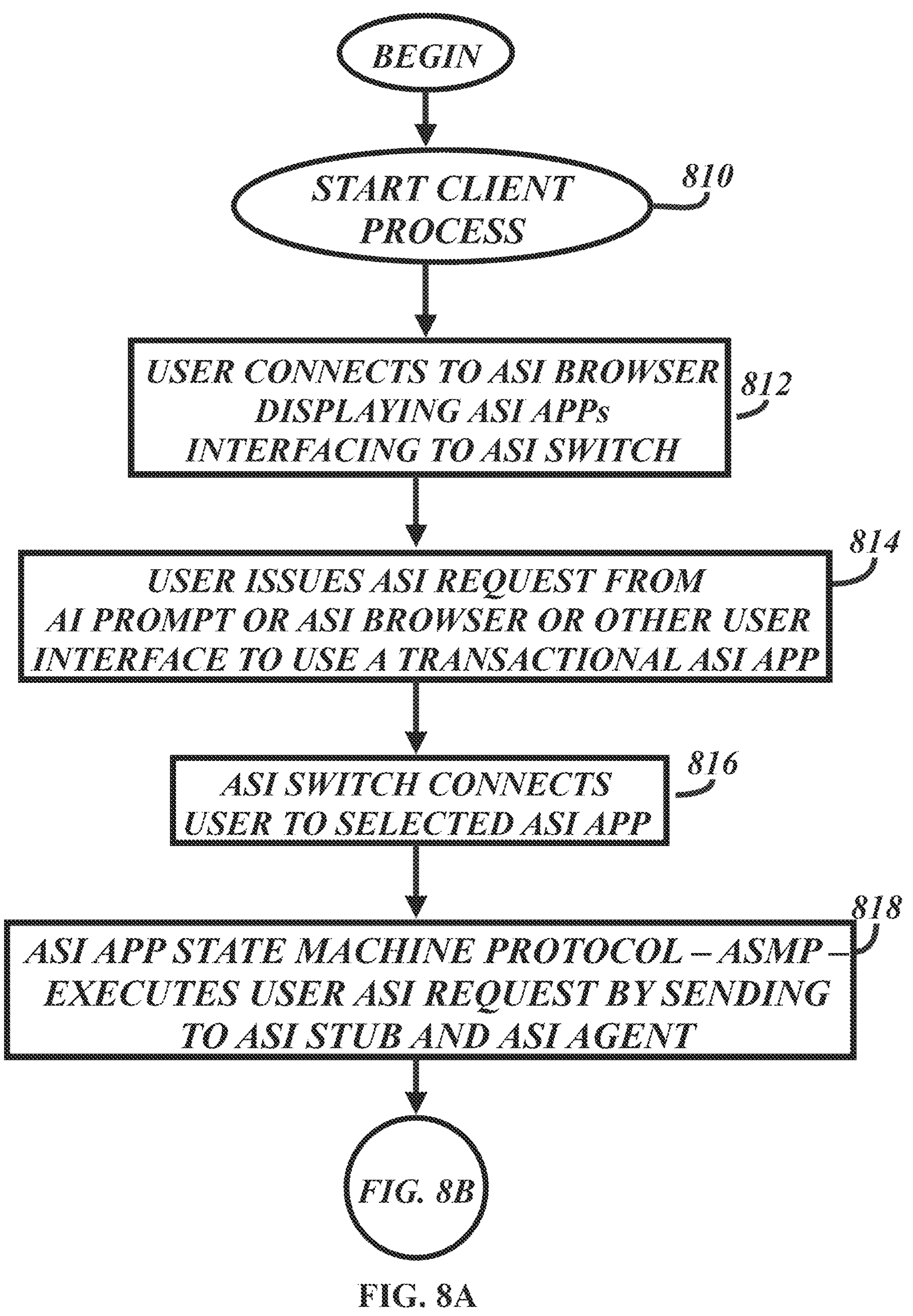
FIGS. 8A, 8B and 8C show flow diagrams illustrating one embodiment of the present disclosure.
Figure 8B:
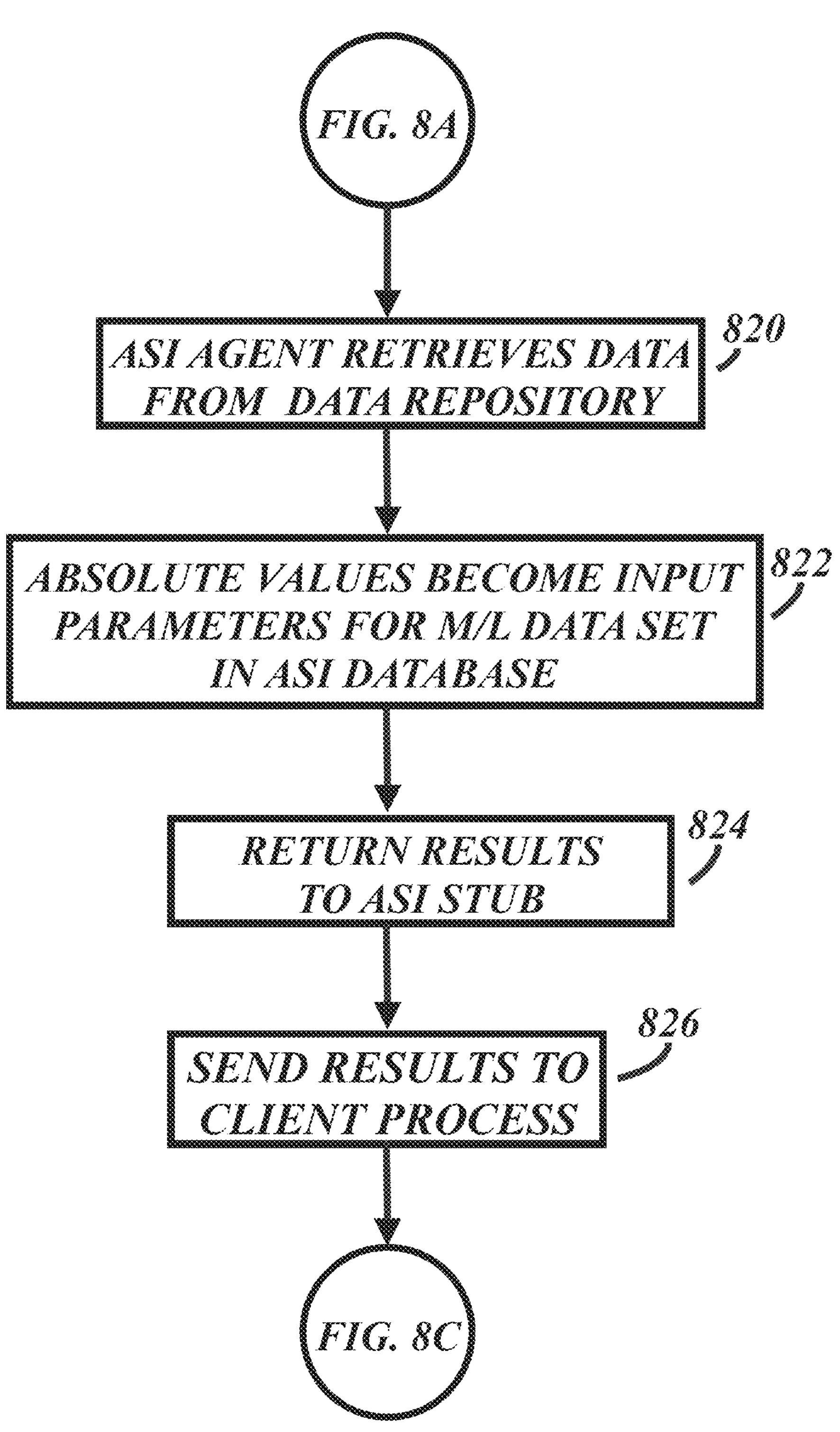
Figure 8C:
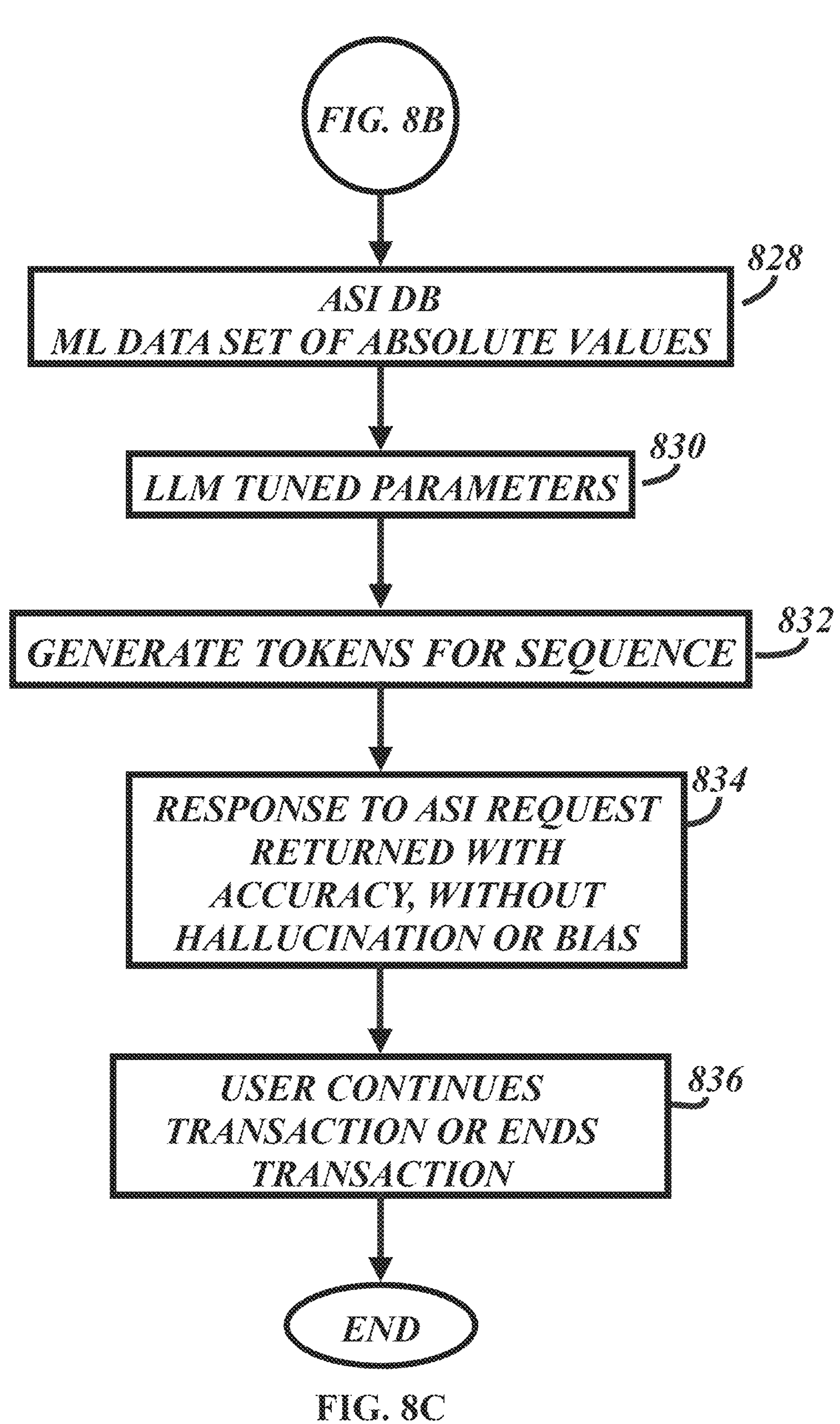

FIGS. 8A, 8B, 8C are flow diagrams illustrating one embodiment of the present disclosure for an ASI Pro forma App for use in any business or enterprise. The ASI Pro forma App workflow process automation in this disclosure involves configuring the ASI_ID for the ASI Pro forma App with grouping of information elements into the end-to-end connected ASI Pro forma App starting from the ASI Prompt or local ASI Browser or other user interface, which is one embodiment of the present disclosure, displaying an ASI Pro forma App sending the ASI Application Payload to peer-to-peer firmware interconnected ASI Agents, to safely, securely access enterprise data and fetch the results back in response to the user request for a two-way real-time ASI transaction from the specific ASI App from an ASI Prompt or ASI Browser or other user interface query at the front end, while the firmware ASI Pro forma App-specific vertical LLM system or AI-Model is M/L trained in the enterprise's real, accurate, dedicated absolute data (RADAD) and historical data retrieved and populated in ASI Database 50, access to which may be billed per access in addition to a monthly subscription fee, using the ASI Billing Management App 604.

Figure 9:
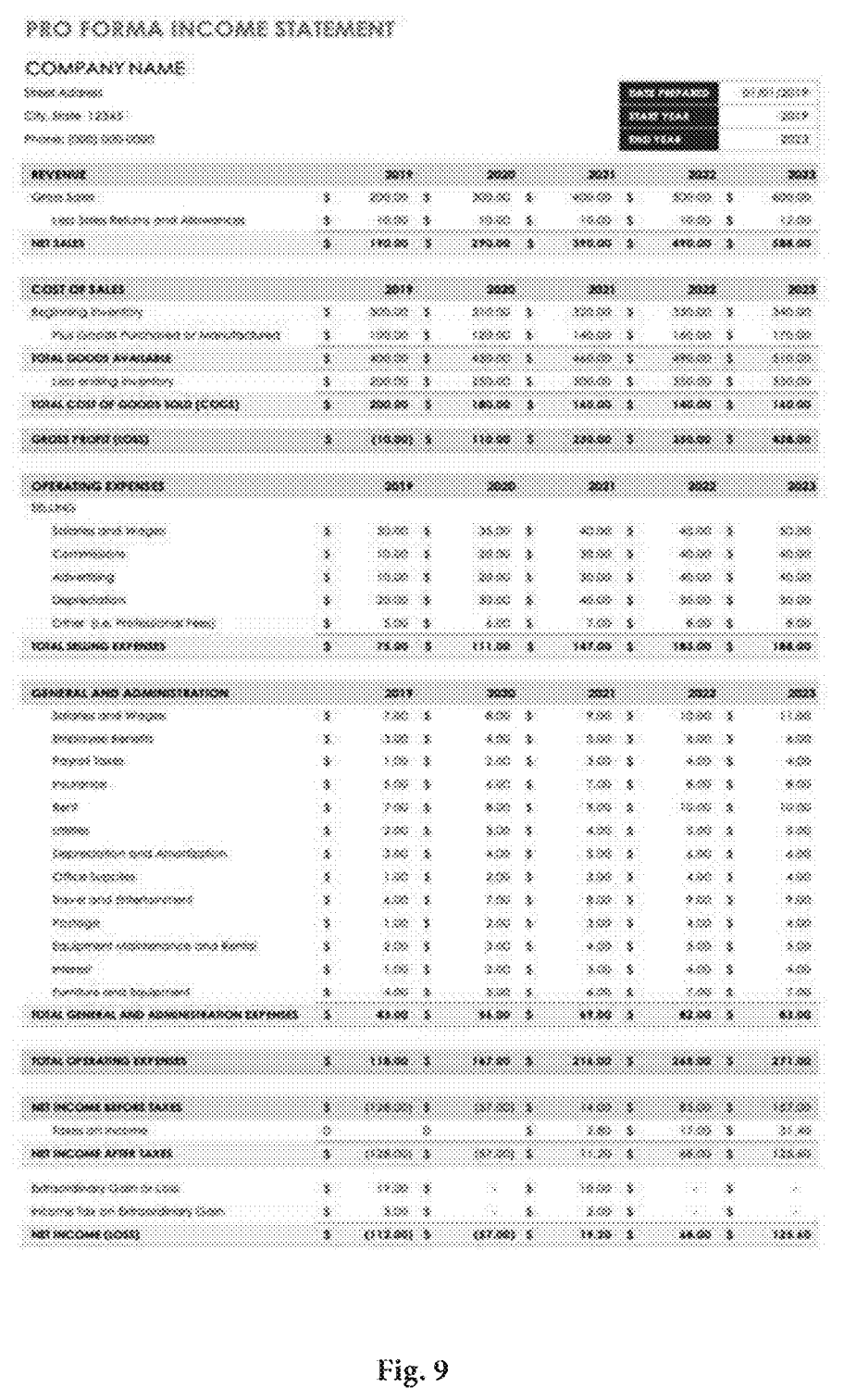

Pro forma financial statements, like the example Pro Forma Income Statement shown in FIG. 9, present the complete future economic projection of a company or person, for a lending or investment proposal, that includes balance sheets, income statements, and statements of cash flow, to help forecast the future based on the present, using hypothetical budgeting. Pro forma data estimates are built in to show the company's profits if certain, one-time items such as a one-time only expense or does not represent the company's value, are taken out. Instead of tracking the past exactly, such as would be reported in historical income statements, pro forma statements are used to guide big financial decisions, such as:

- Debt Refinancing;
- One-Time Large Purchases such as land or services, and how they affect the budget;
- Company Mergers or Acquisitions, as a part of due diligence to assess future business operating prospects and valuation. In startups, this is often a way to find venture capital.
- Leases, how big leases, such as buildings or vehicles, will affect the budget with new accounting standards.

Pro forma statements help do the following:

- Develop various sales and budget projections.
- Assemble results in profit/loss projections.
- Translate data into cash flow projections.

They are not projections, but rather historical reports.

In the present disclosure, an ASI Pro Forma App has configurable ASI_ID information elements, and the Pro Forma statement can be presented as an Excel spreadsheet or with other front-end tools. The ASI_ID information elements include at least the following and are configured into Firmware peer-to-peer Agents, in the ASIB:

1) Company Name;
2) Company Address and Tel #;
3) Date prepared;
4) Period, start date, end date;
5) Revenue, Gross Sales, Less Returns and Allowances, Net Sales each year for 5 years;
6) Cost of Sales, Year, Beginning and ending inventory, Plus Goods purchased or manufactured;
7) Cost of Goods Sold; Year;
8) Gross Profit or Loss; Year;
9) Year; Operating Expenses—Salaries and wages; Commissions; Advertising;
10) Year; Total selling expenses;
11) Year; General and Administration Expenses: Salaries and wages; payroll taxes; employee benefits; insurance; rent; utilities; depreciation and amortization; Office Supplies; Shipping and Postage; Travel and Entertainment; Equipment maintenance and rental; Furniture and computers;
12) Total General and Administration Expenses;

13) Year; Total Operating Expenses;

14) Year; Total Income before taxes; Taxes on Income; Net Income after taxes;

15) Year; Net Income or Loss.

AI Superintelligence Longevity App

FIGS. 8A, 8B, 8C are flow diagrams illustrating one embodiment of the present disclosure for an ASI Longevity App for use in hospitals, corporations, fitness centers, gyms, spas, physical therapy offices, sports equipment stores, for stress reduction and wellness needs in Cardiology, Neurology, Sleep Clinics, Vestibular clinics, ENT Departments, Geriatrics, doctor's offices and by patients for disease prevention. The ASI Longevity App workflow process automation in this invention involves configuring the ASI_ID for the ASI Longevity App with grouping of information elements into the end-to-end connected ASI Longevity App starting from the AI Prompt or other user interface or ASI Browser, which is one embodiment of the present disclosure, displaying an ASI Longevity App connecting to an ASI Stub and on to an ASI server or ASI Agent or interconnected ASI Agents, to safely, securely access enterprise data and fetch the results back in response to the Prompt or ASI Browser or other user interface query at the front end, while the LLM system is M/L trained in the enterprise's real, accurate, dedicated absolute data and historical data retrieved and populated in ASI Database 50, access to which may be charged for per access in addition to a monthly subscription fee, using the ASI Billing Management App 604.

For an ASI Longevity App, the ASI_ID information elements are configured, and include at least the following, form filled out by a patient daily:

1) Patient's Account,

2) Patient ID,

3) Hospital Outpatient Rehabilitation or Department ID such as Cardiology or Vestibular Physical Therapy, 4) Meditation, Frequency-twice a day, Duration: 15 minutes. Alternate nostril breathing, Pranayama, Gratitude Meditation, observing silence also called Mauna Vratha because silence achieves the universe as in Maunam Sarvartha Saadagam and provides healing, Positive Healing, Self-Acceptance of body and mind, Body Scan—self-compassion, self-value;

5) Walk, Cardio—Extra Credit, Frequency: long walk once daily or short walks twice a day. Write down how many minutes of walk or cardio, highest heart rate, uphill walk, fast walk, to increase respiratory rate.

6) Get Vitamin D from the Sun: Morning Sunshine: Relax in the morning sunshine, or walk in the morning sun. Frequency: one or twice a day. Write down how many minutes.

7) Enhance joy and calmness with grounding techniques with five senses. 5 things you can see: sunrise, trees, floor, people, mountains; 4 things you can hear: birds, trees, breeze, street; 3 things you can smell: Clear air, flowers, trees; 2 things you can feel in skin: breath in face, feet on ground; 1 thing you can taste: your drink.

8) Take frequent breaks from prolonged Screen Time every 30 mins with computer screen, cell phone and book.

9) Eight hours of Sleep: Write time what time you went to bed; System sends Alerts and Notifications if patient not going to bed at 10 pm;

10) Protein intake at each meal, 30-30-30 g: Write down Gms of protein taken at each meal.

11) Single leg stance, eyes open: Frequency: twice or thrice/day; Duration: 15 sec or 10 sec.

12) Lunge: Repetitions: 5 or 2; Frequency: 2 or 3/day; Duration:

13) Standing or Sitting: Touch your shins (bend over): Repetitions: 2× or 1×; Frequency: twice or four times/day.

14) Walking backward, eyes open: Repetitions: 30 sec, Frequency: twice/day; Duration: 10 or 20 steps both directions;

15) Zombie walk, fists and hands up, eyes closed: Frequency: twice or thrice/day; Duration: 10 ft or 20 ft back and forth in hallway.

ASI Sleep App in Health Tech

FIGS. 8A, 8B, 8C and FIG. 3 illustrate one embodiment of the present disclosure for an ASI Sleep App for use in hospitals, spas, in sleep clinics, for diagnosing and treating sleep apnea.

For an ASI Sleep App, the ASI_ID data structure information elements are configured, and include at least the following, App provides a form filled out by a patient daily:

1. Patient's Account,
2. Patient ID,
3. Hospital Department ID such as Sleep Clinic, Cardiology or ENT,
4. Meditation, Frequency—before sleep, Duration: 15 minutes. Alternate nostril breathing, Pranayama, observing silence also called Mauna Vratha because silence achieves the universe as in Sanskrit, Maunam Sarvartha Saadagam and provides healing;
5. Get Vitamin D from the Sun: Morning Sunshine: Relax in the morning sunshine, or walk in the morning sun. Frequency: one or twice a day. Write down how many minutes.
6. Enhance joy and calmness with grounding techniques with five senses. 5 things you can see: sunrise, trees, floor, people, mountains; 4 things you can hear: birds, trees, breeze, street; 3 things you can smell: Clear air, flowers, trees; 2 things you can feel in skin: breath in face, feet on ground; 1 thing you can taste: your drink.
7. Take break from prolonged Screen Time with computer screen, cell phone and book an hour before sleep and log this daily.
8. Eight hours of Sleep: Write time what time you went to bed; System sends Alerts and Notifications if patient not going to bed at 10 pm.
9. Log daily how many hours on CPAP machine.
10. Protein intake at each meal, 30-30-30 g: Write down Gms of protein taken at each meal.
11. Supplements: Log daily supplement intake for better sleep;
12. Listen to soothing music before bed: Log daily what duration.
13. Log daily intake of milk before bed for better sleep.

ASI Dental App

FIG. 3 illustrates one embodiment of the present disclosure, and in this written example, for an ASI Dental App for use in dentists' offices to pre-authorize payment from insurance to avoid patient not paying for root canal.

For an ASI Dental App, the ASI_ID data structure information elements are configured, and include at least the following:

Patient's Account,
Patient ID,
Dental Insurance details,
Dentist Office details,
Dental Procedure performed,
Billing details,
Payment pre-authorization by Insurance Provider.

ASI Defense Tech Apps

FIG. 3 also illustrates the framework for another embodiment for ASI App in Defense technologies for use in C4I, Command and Control, Communications and Computer Intelligence using AI Superintelligence, for the U.S. Government in military operations for autonomous sense making, to integrate various defense hardware like drones and surveillance towers. It enables AI-powered surveillance, target identification, and automated decision-making, enhancing operational capabilities for military and border security, to identify and track potential threats in real-time, aiding in timely and effective responses.

For an ASI Defense tech App, the ASI_ID data structure information elements are configured, and include at least the following:

1) Identity of targets in an ASI data structure, with attributes and information entries;

2) Identity of drones in an ASI data structure, listing attributes and information entries;

3) Identity of potential threats in an ASI data structure, listing information entries and attributes;

4) Identity of Surveillance towers in an ASI data structure with information entries and attributes;

5) Data structure identity for border security in an ASI data structure with information entries and attributes;

6) Data structure identity for data from various sensors and platforms to create an integrated understanding of the operational environment in military operations in an ASI data structure with information entries and attributes;

7) Data structure identity for warfare systems, with information entries and attributes;

8) Data structure identity for casualty care and evacuation, with information entries and attributes, for access to large medical database that is able to access data containing medical trauma cases, which include diagnoses, vital sign sets, medications given, treatments, and outcomes, to provide indications, warnings, and suggestions for treatment.

9) Data structure identity for logistics and transportation of ammunition, goods, armaments, and troops for the success of military operations. ASI Defense tech Apps to lower transportation costs and reduce the need for human input by plotting the most efficient route to travel under current conditions and to pre-identify problems for military fleets in order to increase efficiency of their performance.

ASI Food and Beverage Applications

ASI can significantly enhance food safety monitoring in various ways, utilizing the present disclosure:

Hazard Identification: ASI systems can analyze data from sensors, cameras, and other sources to identify potential hazards (such as contaminants or spoilage) in real-time. Early detection allows for swift corrective actions.

Predictive Analytics: By analyzing historical data, ASI models can predict food safety risks. For instance, they can forecast when certain ingredients might spoil or when equipment maintenance is needed.

Automated Record Keeping: ASI streamlines record-keeping processes. It ensures accurate and consistent documentation of temperature logs, sanitation practices, and compliance with safety protocols.

Traceability and Recall Management: ASI helps track the entire supply chain, from farm to table. In case of a food recall, it can quickly identify affected batches, minimizing health risks.

Customization to Specific Environments: ASI algorithms can adapt to different food production environments, whether it is a large scale kitchen, a processing plant, or a restaurant. Customization ensures effective monitoring.

Staff Training and Alerts: ASI powered training modules can educate staff on food safety practices. ASI can send alerts when deviations occur. (temperature fluctuations.)

Compliance with Regulations: ASI ensures adherence to food safety regulations by continuously monitoring critical control points (CCPs) and providing real-time feedback.

Menu Optimization and Personalization: Configure the ASI_ID data structure information entries and attributes and methods for an ASI App that analyzes customer preferences, dietary restrictions, and seasonal availability to optimize menu offerings. Personalized recommendations can enhance customer satisfaction and reduce food waste.

Supply Chain Management: Configure the ASI_ID data structure information entries and attributes and methods for an ASI-driven system to predict ingredient demand, optimize inventory levels, and manage vendor relationships. This ensures timely procurement, minimizes waste, and maintains consistent quality.

Employee Scheduling and Shift Management: Configure the ASI_ID data structure information entries and attributes and methods for an ASI App that uses ASI algorithms to create efficient employee schedules, considering factors like availability, skills, and labor laws. Real-time adjustments can handle unexpected changes.

Food Safety Monitoring: Configure the ASI_ID data structure information entries and attributes and methods for an application that uses image recognition and IoT sensors to monitor food safety compliance. It can detect contaminants, track expiration dates, and ensure adherence to health regulations.

Automated Meal Planning for Large Events: Configure the ASI_ID data structure information entries and attributes and methods for an ASI App that generates customized meal plans for large parties based on dietary preferences, allergies, and portion sizes. It can also estimate ingredient quantities and costs.

Predictive Maintenance for Kitchen Equipment: Configure the ASI_ID data structure information entries and attributes and methods for an ASI system that predicts equipment failures and maintenance needs. By monitoring usage patterns and performance data, it can schedule preventive maintenance, reducing downtime.

Traceability and Food Origin Tracking: Configure the ASI_ID data structure information entries and attributes and methods for an ASI App that traces the entire supply chain—from farm to table. Customers can scan QR codes to learn about the origin of their food.

Automated Nutritional Analysis: Configure the ASI_ID data structure information entries and attributes and methods for an ASI App that analyzes recipes and menus to provide detailed nutritional information. It can help chefs balance meals, meet dietary requirements, and label allergens.

Dynamic Pricing and Cost Optimization: Configure the ASI_ID data structure information entries and attributes and methods for an ASI-powered pricing model that adjusts menu prices based on real-time factors like ingredient costs, demand, and seasonality. It ensures profitability while remaining competitive.

Customer Feedback Analysis: Configure the ASI_ID data structure information entries and attributes and methods for an ASI App that processes customer reviews, social media posts, and surveys using natural language processing (NLP). Insights can guide menu improvements and enhance overall service.

ASI technologies play a crucial role in enhancing traceability within supply chains. To achieve this, they could employ the following, applying the present disclosure:

Automated Data Collection and Verification: Configure the ASI_ID data structure information entries and attributes and methods for an ASI App to automate data collection and verification. Real-time visibility is achieved by tracking products from source to destination.

Optimized Transportation Routes: Configure the ASI_ID data structure information entries and attributes and methods for an ASI App to optimize transportation routes, reducing fuel consumption and greenhouse gas emissions in order to help achieve sustainability goals.

Supplier Compliance Monitoring: Configure the ASI_ID data structure information entries and attributes and methods for an ASI App for supply chain traceability solutions to enable companies to monitor and enforce supplier compliance with sustainability standards.

Consumer Trust and Transparency: Configure the ASI_ID data structure information entries and attributes and methods for an ASI App for end-to-end supply chain traceability to provide consumers with detailed information about the products'journey, including sourcing, manufacturing processes, and handling. This transparency can generate consumer trust.

Data Accessibility and Integration: The ASI Database and other embodiments of the present disclosure lend themselves for data accuracy in supply chains. Data inaccessibility is a major challenge for AI in supply chains. Data acts as the essential fuel for ASI where it drives decision-making and operational improvements. If AI cannot access the necessary data, its learning and decision-making capabilities get severely limited. This leads to less accurate predictions and inefficiencies in the supply chain. Ensuring easy access to relevant data is crucial for effective AI integration and performance in supply chain management.

The ASI Database of the present disclosure lends itself to create a centralized data repository accessible to all relevant teams. Other aspects of the present disclosure enable the use of APIs and integration tools to connect disparate data sources.

The present disclosure corrects the current problems with generative AI that leads to Insufficient Data: ASI thrives on accurate data. The present disclosure ensures access to large amounts of relevant data for optimal performance. Quality assurance is critical to the ASI implementation process—specifically, as it pertains to data. Inadequate data quality and quantity can pose significant barriers, as it can undermine algorithms and lead to flawed insights and poor subsequent decision-making. Neglecting the importance of data quality not only hampers AI's effectiveness but can also perpetuate existing inefficiencies or even introduce new errors into the system.

ASI Switching Service 603: is an OSI application layer switch. Switching service 603 thus represents the core of the ASI Switch. It performs a number of tasks including the routing of user connections to remote ASI Switches, described in the paragraphs above, multiplexing and prioritization of requests, and flow control. Switching service 603 also facilitates open systems'connectivity with both the Internet (a public switched network) and private networks including back office networks, such as banking networks. Interconnected application layer switches form the application network backbone. The components that comprise the Switching Service 603 are described in detail under FIG. 2B above and include interconnected ASI Agents, as the ASI Stub and ASI Agent have the same code. These switches are one significant aspect of the present disclosure.

ASI Management service 604: provides applications for end users to manage network resources, and to perform billing and other service management functions such as Operations, Administration, Maintenance & Provisioning (OAM&P) functions for security management, fault management, configuration management, performance management and billing management 604, like a Telco. Providing OAM&P functions and billing for ASI Applications in this manner is another significant aspect of the present disclosure.

Figure 7:
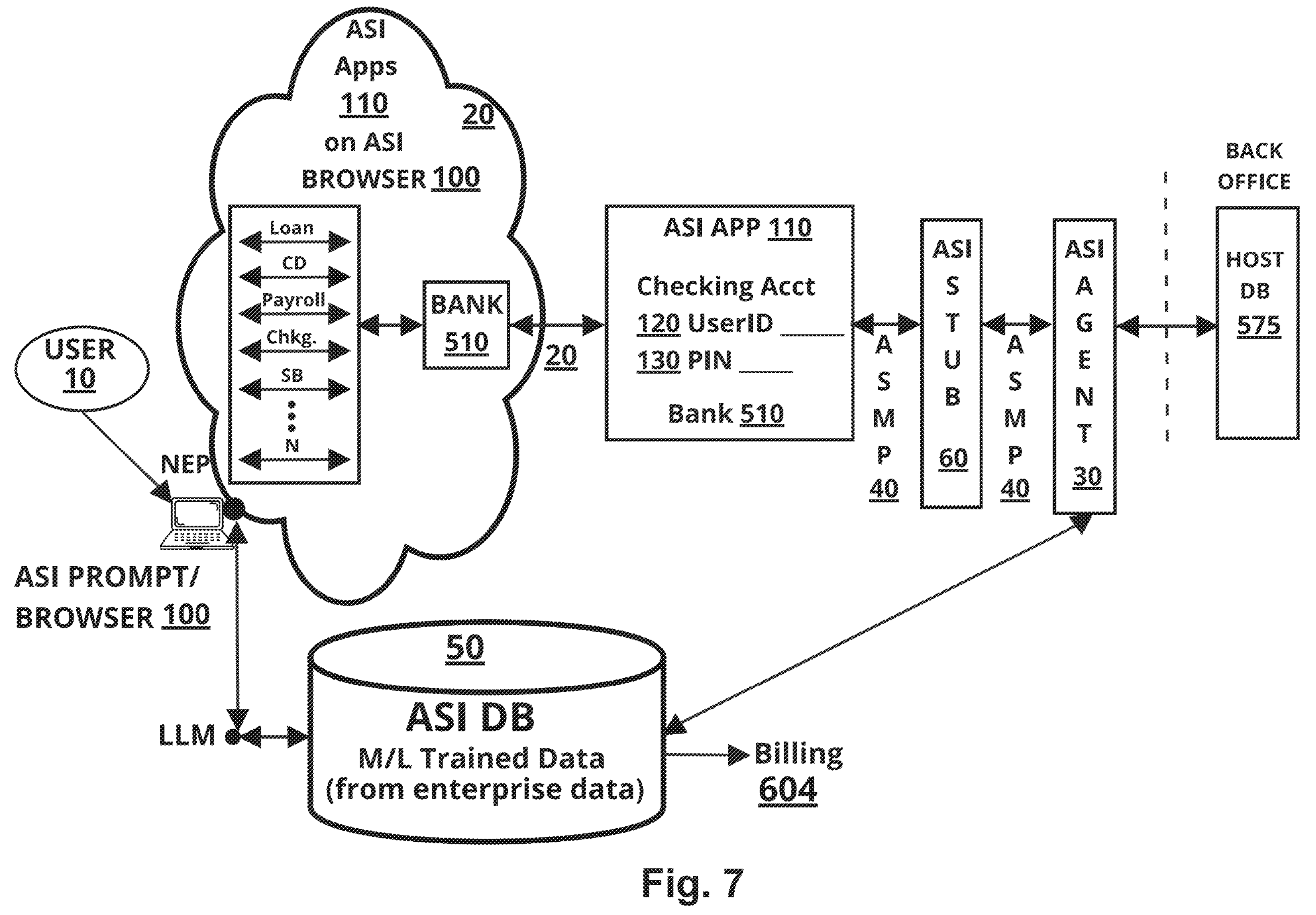
FIG. 7 illustrates a user selecting a bank Point-of-Service Application from the Point-of-Service Application List displayed on an ASI Browser, connecting to an ASI Stub, ASI Agent and to a back office Host Database to create the ASI Database for Machine Learning training of LLM parameters from real, accurate, dedicated absolute data in the ASI Database created from enterprise data so as to have an ASI enterprise and ASI LLMs or ASI AI-Models, in the ASI Application layer network.

FIG. 7 illustrates that each ASI Enterprise may choose the types of services that it would like to offer its clients. In this example, if Bank 80 decides to include in their ASI Point-of-Service application access to checking and savings accounts, user 10 will be able to perform real-time transactions against his checking and savings accounts. Thus, if user 10 moves $5000 from his checking account into his savings account, the transaction will be performed in real-time, in the same manner the transaction would have been performed by a live teller at the bank or an ATM machine. Therefore, unlike his prior LLM hallucination experience, user 10 now has the capability to perform real-time bi-directional transactions on his bank account with ASI Apps. The ability to perform these types of robust, real-time, bi-directional transactions from an ASI App 110 displayed in an ASI browser 100 by eliminating hallucination and bias of AI 1.0, by safe secure access to real, accurate, dedicated absolute data transmitted to an ASI Database 50, ensuring data quality and connection, providing a connected LLM or AI-Model in an ASI enterprise is a significant aspect of the present disclosure. FIG. 7 shows user 10 accessing and selecting an ASI App 110 from the list of ASI Apps, such as Loan, CD, Payroll, Small Business, checking account or other ASI Application N displayed on an ASI Browser 100 or other user interface. User connects to Bank 510 from ASI Browser 100 and accesses his or her checking account by providing input parameters for attributes User Id 120 and PIN 130, which are the attributes of the grouped context-specific Application workflow information elements in Bank 510. The ASI request is transmitted to the ASI Stub 60 and instantiated at ASI Agent or server 30 via the ASI App State Machine Protocol ASMP 40 described supra over the Internet Cloud 20, connecting to host database 575 in a Back Office, and thereafter, sending the response back to the user 10 via the ASI Agent 30 to ASI Stub 60 to ASI Browser 100 and the data also sent to the ASI Database 50 forming Machine Learning Data Set for LLMs to access and be trained in so as to provide an accurate response to the user's AI Prompt request or from other user interface such as the present disclosure, such as an ASI Browser 100. This end-to-end ASI Switch 200 on the ASI Application layer network, may reside on GPUs like Nvidia's GPU or other GPUs, as ASI Application Network Nodes, enabling the ASI Enterprise 80 to provide billing 604 or other service management functions and services such as operations, administration, maintenance and provisioning apps like a Telco and includes a C4I system.

As shown in FIG. 7, embedded in client process ASI Prompt or ASI Browser 100 is an ASI Application 110, such as a FinTech App, such as Savings Account, CD, MF, Checking Account, Small Business, Payroll, Loan . . . ASI Agent 30 connects to ASI Comm Port in Bank Host or other enterprise Host 575, utilizing Fin Tech App(s) 110, such as Savings Acct, CD, MF, Checking, SB, Payroll, Loan . . . . AI Superintelligence Application data structure consisting of ASI_ID which comprises context-specific grouped information elements—attributes and information entries, is serialized, transmitted over the Cloud and marshaled into the ASI server, Application State Machine Protocol 40 unpacks the payload and invokes the ASI Application methods with the marshaled parameters and returns any output parameters as absolute values to the Machine Learning Data Set, 50, to train and tune the LLM parameters with real, accurate, dedicated absolute data, 50, in ASI Database 50, connecting to a billing or other service management App, 604.

FIG. 7 illustrates an AI Superintelligence Application Layer Switch 200 switching the user between ASI Apps 110, shown as 1, 2, 3, 4 . . . , namely, Pizza App, BMW App, Small business App, Loan App . . . with ASI Agents, 30 . . . , namely, Pizza Agent, BMW Agent, Small business Agent, Loan Agent . . . .

FIG. 7 illustrates an AI Superintelligence Application Layer Switch 200 starting from an AI Prompt 100 and connecting end to end in an ASI application network; ASI Apps 110, shown as 1, 2, . . . N for Pizza App, BMW App, SB App, Loan App, Payroll App, . . . App N; ASI Agents 400, shown as 1, 2, . . . N for each of the respective Apps such as Pizza Parlor ASI Agent, BMW Dealer ASI Agent, Small Business ASI Agent, Loan ASI Agent, Payroll ASI Agent; connecting to the Bank or other enterprise, allowing the ASI Network to function like a Telco-Network to do billing and other service management functions such as operations, administration, maintenance and provisioning.

Bank can also decide to provide other types of services in Point-of-Service ASI Apps. For example, Bank may agree with Car dealership to allow Bank customers to purchase a car from that dealer, request a car loan from Bank, and have the entire transaction performed using ASI Apps 110, as illustrated in FIG. 7. In this instance, the transactions are not merely two-way, between the user and Bank, but three-way, amongst the consumer, Bank and Car dealership. According to one aspect of the present disclosure, this three-way transaction can be expanded to n-way transactions, where n represents a predetermined number of merchants or other service providers or ASI Enterprises who have agreed to cooperate to provide services to users. The present disclosure therefore allows for "any-to-any" communication and transactions utilizing ASI, thus facilitating a large, flexible variety of robust, real-time, bi-directional transactions using AI Superintelligence.

Bank may also decide to provide ASI intra-merchant or intra-bank services, together with the inter-merchant services described above. For example, if Bank creates an ASI Point-of-Service application for use by the Bank Payroll department, Bank may provide its own employees with a means for submitting timecards for payroll processing by the Bank's Human Resources (HR) Department. An employee selects the Bank ASI HR Point-of-Service application and submits his timecard. The employee's timecard is processed by accessing the employee's payroll information, stored in the Bank's Back Office. The transaction is thus processed in real-time, and the employee receives his paycheck immediately.

FIG. 8A, FIG. 8B and FIG. 8C show flow diagrams illustrating one embodiment of the present disclosure(s). In FIG. 8A, a user starts a client process in step 810. In step 812, the user connects to an ASI browser displaying ASI Apps interfacing to ASI Switch. In step 814, the user issues a request from ASI browser or AI Prompt or other user interface to use a transactional application. ASI Switch connects the user to the selected ASI App in step 816. In step 818, ASI App State Machine Protocol, ASMP executes the user's ASI request by sending to and from the ASI Stub and ASI Agent the context-specific application workflow grouped, serialized, and marshaled data structure of information entries and attributes with methods applied to the data structure over the Internet Cloud.

In FIG. 8B, the ASI Agent safely and securely retrieves data from the data repository in step 820. In step 822, the absolute values of real, accurate, dedicated absolute data become input parameters for M/L Data Set in ASI Database. Step 824 returns results to ASI Stub. Step 826 sends results to the client process.

In FIG. 8C, step 828 creates ASI Database as M/L Data Set of absolute values of real, accurate, dedicated absolute data from enterprise data. Step 830 tunes LLM parameters with the M/L Data Set of absolute values from ASI Database. Step 832 generates tokens for sequence. Step 834 returns response to ASI Request with accuracy, without hallucination or bias. Step 36 lets user continue transaction or end transaction.

FIGS. 8A, 8B, 8C show a Flow diagram illustrating one embodiment of the present disclosure. A two-pronged approach is shown, where a user issues a Prompt or ASI request from an ASI Browser or other user interface to use a transactional application. An Application data structure identity ASI_ID is created. The ASI Application State Machine Protocol executes the user request. The ASI_ID has a Method Name and has input arguments of information entries and attributes and generates output arguments that are absolute values that now become input parameters for M/L Data Set. So, now the M/L Data Set contains absolute values of real, accurate, dedicated absolute data, rather than from emails and off the web and social media, constituting junk data from which predictive data is currently generated in AI 1.0. Now, in AI Superintelligence aka AI 2.0, LLM Parameters are tuned utilizing this new M/L Data Set of absolute values, of real, accurate, dedicated absolute data or historical data in an Enterprise. This now generates tokens for sequence. A Prompt response of predictive values is generated. This two-pronged approach ensures accuracy, eliminates bias and gives security by accessing and invoking context-specific application workflow process automation data structures located on remote hosts.

Data is of Three Types (1) Absolute data, for example, one's account balance at any instant in time, fetched from the back-office of an enterprise;

(2) Historical Data in an enterprise;

(3) Predictive data, where the Machine Learning Data Set comes from emails, social media and the web, in other words, this data is not reliable, as it is not accurate, introduces bias and lacks security.

The present disclosure utilizes real, accurate, dedicated absolute data, historical data and feeds them into the M/L Data Set for predictive analysis, so that it eliminates bias, enhances security and ensures data accuracy.

ASI Application State Machine Protocol (ASMP)

ASI Application State Machine Protocol of the present disclosure enables a user to invoke requests in an AI Prompt or an ASI browser, which is one embodiment of the present disclosure or other user interface by an ASI Application data structure identity with information entries and attributes and methods, with input/output parameters, serializes them into an application-specific type, customized for an enterprise and marshals it to the ASI server or ASI Agent or interconnected ASI Agents and then returns any output parameters as absolute values to the caller/client using the ASI Application State Machine Protocol and to the Machine Learning Data Set to train and tune the LLM parameters with real, accurate, dedicated absolute data, as opposed to predictive data of AI 1.0, which lacks accuracy and security and introduces bias as the data is taken from emails, social media and the web. This ensures accuracy and security and eliminates hallucination and bias. The ASI_ID instance uniquely identifies an instantiation of the ASI_ID type.

This includes a library providing support for the application programming interfaces (APIs) to remotely access an ASI_ID ASI Application data structure, its data and its functions in an ASI_ID Application data structure network. This interface provides two types of a class, a skeleton, which is the functionality of the ASI_ID and its stub, which allows remote access of the same ASI_ID.

Detailed Description of ASI_ID—AI Superintelligence Application Data Structure Identity Glossary of terms used is provided here below.

Item is its definition.

Abstract Class is a C++ class which does not have all virtual functions defined.

Class is a C++/Java data structure definition which defines both the data and functions.

Interface is a Java term similar to the C++ Abstract Class.

Meta is a "meta" compiler that translates a higher level "meta" language (ASIB) from the "meta" file into a lower-level language (C++) output file for and before giving to a traditional compiler.

ASI_ID is a C++/Java data structure instance, which is defined by a class.

ASMP of the present disclosure allows the user to specify functions which can be executed remotely. The basic operation uses ASI_IDs and class information, instead of simple, unrelated functions and data. The arguments to the function is specified in the meta file and whether the type of argument passing is by value or reference can also be specified.

ASMP allows for transparent remote or local operation. The programmer does not need to know whether the ASI_ID is "local" or "remote". The interface—automatically determines this and will allow for the correct operation based on the type of ASI_ID.

There are several requirements for ASMP to provide a clean and transparent operation of local and remote ASI_ID. FIG. 4B illustrates these basic requirements and operations layers of the ASI_ID ASI Application data structure layer.

ASI_ID—AI Superintelligence Application Data Structure Identity: is needed for ASMP to determine if the ASI_ID is local (skeleton) or remote (stub). This is also needed to determine arguments and ASI_ID serialization. This feature is provided in the preferred embodiment by the ASIAppASI_ID in the asiapp.lib library. Each new class "XYZ" must add a XYZ_ClassID, XYZStub_ClassID and XYZSkel_ClassID to the ASI App/ClassID.h file.

Network Line Protocol/TCP: is needed to communicate with the remote computer. For ASMP, ASIAppRemotePDU provides this protocol data unit (PDU) and transmits the data using data serialization.

Data Serialization: To transfer data between computers or devices, the arguments, herein the name-value pairs and the ASI_IDs themselves need to be sent over the network. This is the serialization of the data onto a network stream. The persistence nature of the framework used ensures this. The code is generated by the meta compiler in the skeleton.

Data Marshaling

To ensure that all data is passed as arguments to a method requires the user to check all arguments, herein, the name-value pairs and throw an exception, if there is something missing or wrong. This is provided by the meta compiler in the stub and skeleton.

Thread Rendezvous

To block a thread during network transmission and reception, the ASI_ID must use a different thread to perform the actual network activity and control the calling thread status. This allows calling a remote ASI_ID to behave similar to a local ASI_ID. This is performed by the framework class in the ASIAppRemotePDU class.

String Execution

This allows for a method to be called from an ASCII string representation. This is useful since it provides a simple, but unique means of calling a class method. This can also be used by the programmer directly. This data marshaling is created by the meta compiler in the base class.

Reference Counting

By maintaining reference counts in both the local and remote ASI_IDs, time consuming malloc's and free's are avoided as well as confusing details of which function is responsible for deleting which ASI_ID. This is provided by ASMP in dealing with ASIAppRemoteASI_ID types. The user cannot delete an ASIAppRemoteASI_ID child, causing an exception to be thrown, but must use the member function ASI_IDl_unreference( ). A user stores a copy of an ASIAppRemoteASI_ID child by calling the method ASI_IDl_reference( ). Otherwise, the ASI_ID may be destroyed by someone else. This interface is provided by ASIAppRemoteASI_IDInt.

Abstract Base Class: To operate on an ASI_ID without knowing its location (local or remote) requires an abstract class which forms as the base class. This is the base class, which is the parent of both the stub and skeleton. This is an abstract ASI_ID (cannot be instantiated alone) and is created by the meta compiler.

Stub/Skeleton Multiple Inheritance

The client and server classes are inherited from the abstract base class and from their respective ASI_ID layer classes. This allows them to inherit the functionality of the base class as well as the ASI_ID layer routines. This is created by the meta compiler.

Meta Compiler

The Meta compiler takes a definition file and creates using encoding the above requirements: ASI_ID Identity, Data Serialization, Data Marshaling, String Execution, Abstract Base Class, and the Stub/Skeleton Multiple Inheritance. If one were to code all of this by hand for even the simplest class, there would be too many errors to even manage. The meta compiler eliminates these errors.

User-Defined Data Model

This is the user created set of classes built around and on top of ASMP APIs. This is the basis of the ASI_ID layer to the next level up the software layers. This foundation appears local to the programmers using the ASI_ID layer even though it may be remote.

Components

The programmer needs to be aware of the base class ASIAppRemoteASI_ID. There is an interface specification ASIAppRemoteASI_IDInt which is inherited by both the ASI_ID layer ASI_IDs and the data model ASI_IDs. For purposes of example, ASIAppName is a new data model ASI_ID, which contains one data member "name" which is a String. The meta compiler automatically creates two access components for this data member: get_name and set_name. In addition, the meta compiler also creates the local and remote versions of this data ASI_ID: ASIAppNameSkel and ASIAppNameStub, respectively.

ASIAppRemoteASI_IDInt

The abstract base class not only contains all of the member methods and data access components, but it contains support functions which provide a uniform interface to behave as an ASIAppRemoteASI_ID. This includes:

1. ASIAppStringExecution to execute any method using a simple ASCII string, and ASI_ID type data.
2. ASI_ID Lock, which provides a thread synchronization mechanism.
3. ASI_ID Flags, which provides a simple and consistent Boolean flag variables.
4. reference counts, which allow ASIAppRemoteASI_IDs to be shared without ownership concerns.
5. conversions between ASI_ID, ASIAppRemoteReference, ASIAppRemoteStub and ASIAppRemoteSkel types.

ASIAppRemoteSkel (Server)

The skeleton represents the server side of ASMP. This is a class, which is derived off the abstract base class ASIAppName and ASIAppRemoteSkel. All of the methods (except data access components) must be defined by the programmer for the skeleton since this is the actual ASI_ID. Whenever a real instance of the class is created, it will have the suffix "Skel".

ASIAppRemoteStub (Client)

This is the client (or remote) side of an ASI_ID. This is similar to the skeleton because it is derived off the abstract base class ASIAppName and an ASI_ID layer class ASIAppRemoteStub. However, there is nothing for the programmer to define for this class. All methods are generated by the meta compiler.

Meta Compiler

This is a program in the preferred embodiment, which creates the three classes: abstract base, stub and skeleton. For each class, an interface file (header file .h) and a C++ definition file (source code .cpp) is created. It will be apparent to those of ordinary skill in the art that the implementation defined here represents an implementation of the preferred embodiment. Other embodiments will be apparent such as non-TCL, non-C++ and non-Java implementations and implementations such as within a DSP chipset.

Usage

The classname is the base class (such as Account). The meta compiler created Account file must be in the same directory as other parent definitions.

ASMP files are found under ASIApp/Util. These files parse the description file and produce the six C++ output files.

Syntax

In the preferred embodiment, the syntax must be adhered to closely.

The six files are cbase, hbase, cstub, hstub, cskel or hskel.

The compiler will wait for the header section to complete. Then, begins the class name and parent, followed by the data section; and next followed by the method section, with method and arguments.

Operational Overview

The operation of this ASI_ID layer is introduced through an example.

Scenario: Referring to FIG. 3, consider a sample financial institution in which there is a main bank ASI Application data structure ASI_ID "Fidelity" and several bank Accounts "Bob" and "Di". On the remote client side, the programmer first must establish contact with the remote server and then receive the Bank ASI_ID on the client side as a stub. Once the stub is received, the client can then look up accounts just as if the programmer was local to the skeleton on the server side. The programming code is the same on either the client or server side. The programmer does not need to know where the actual ASI_ID resides: local or remote.

ASMP Data

The programmer must first create a definition file describing the ASIAppBank and ASIAppBankAcount ASI_IDs. This is written in a simple language, which is parsed by the meta compiler of the present disclosure.

ASIAppBankAccount

This class contains both methods and data. The data is simply an integer describing the amount of money the account holds. The two methods: deposit and withdraw, simply increment and decrement this amount, respectively. The ASIAppBankAccountSkel.cc defines the skeleton methods. The stub methods are defined by the meta compiler.

ASIAppBank

For the Bank ASI_ID, the meta compiler will create six files: ASIAppBank.h, ASIAppBank.cpp, ASIAppBankStub.h, ASIAppBankStub.cpp, ASIAppBankSkel.h and ASI_BankSkel.cpp. These six files describe the operation and remote execution of the ASIAppBank ASI_ID. Since there is no data, there will be no data access components generated. The returned ASI_ID ASIAppBankAccount is followed by the method name, getAccount, and the arguments (name-value pairs). In this case there are two integer arguments with name id and pin. The programmer, however, must still describe any additional functionality for the operation of this ASI_ID and the definitions of the skeleton methods contained in the ASIAppBankSkel.cc file.

In this simple example, getAccount will always return Bob's account.

Example Client/Server

The client and server are simple. The server side creates the skeletons and registers them in the name server: The client program is just as simple. The major benefit demonstrated above is that the programmer does not have to know whether the ASI_ID "Bob" is local or remote.

Architecture Details

Design Considerations

Trade-offs and considerations taken into account during the creation of the ASI Application data structure ASI_ID layer are described below:

Class Overview

This section describes in more detail the function and purpose of each class in ACMP of the preferred embodiment of the present disclosure.

ASIAppRemoteASI_IDInt

This is the interface that all remote ASI_IDs must have. It contains several abstract class definitions, including ASI_StringExecutionInt, ASI_Lock and ASI_Flags. Plus, it defines several methods used for all remote ASI_IDs.

unsigned get_ASI_IDl_referenceCnt( ) const

This returns the number of pointers outstanding for this ASI_ID. If garbage collection is enabled, this ASI_ID will automatically be destroyed when the referenceCnt reaches zero.

ASIAppReferenceId get_ASI_IDl_referenceID( ) const

This is the remote referenceId for this ASI_ID. This ASIAppReferenceId uniquely tags an ASI_ID instance on the server for the established connection. This is not a well-known name in the sense that it is not guaranteed to be the same with a different connection.

unsigned ASI_IDl_reference( ) const

This increments the number of references outstanding. This needs to be performed whenever a new copy of the pointer is stored.

void ASI_IDl_unreference( ) const

This decrements the reference count and should be called instead of delete.

ASI_ID*ASI_IDl_ASI_ID( ) const

ASIAppRemoteStub*ASI_IDl_stub( ) const

This will return a stub for this ASI_ID. If this ASI_ID is local, it will create a stub. If this is already a stub, it will increment the reference count.

ASIAppRemoteSkel*ASI_IDl_skel( ) const

This will return a skeleton for this ASI_ID. If this is a skeleton, it simply increments the reference count. If this is a stub, it will create a new skeleton, copy the data and return it.

ASIAppRemoteReference*ASI_IDl_remoteReference( ) const

This will create an ASIAppRemoteReference ASI_ID which is only used for serialization.

ASIAppRemoteASI_ID

This is the actual first level implementation of the above interface and adds String Execution to the above functions. From this ASI_ID, all of ASMP ASI_IDs are derived.

ASIAppRemoteReference

This is a type of network "pointer" which indicates where the actual skeleton ASI_ID resides. ASIAppReferenceId referenceId Port and host are used to uniquely specify the socket for the ASIAppRemoteConnectionServer. The referenceId is used to uniquely specify which ASI_ID on the ASIAppRemoteConnectionServer this points to. The classID is simply used to construct a local stub ASI_ID.

ASIAppRemoteStub

All stubs are derived from this ASI_ID and the abstract base ASI_ID for the class. This ASI_ID provides some interfaces to ASMP library, which is used by the meta compiler.

ASIAppRemotePDU*_ASI_IDl_execute (ASIAppRemotePDU*pdu) const

This will block until ASI_IDl execution is finished. It will take the pre-formatted PDU.

ASIAppMarshalId_ASI_IDl_send (ASIAppRemotePDU*pdu) const

This is a non-blocking remote execution, which returns an ASIAppMarshalId, which can be used to receive the result.

ASIAppRemotePDU*_ASI_IDl_peek(ASIAppMarshalId id) const

This checks if the PDU id is returned from execution.

ASIAppRemotePDU*_ASI_IDl_receive(ASIAppMarshalId id) const

This blocks until the PDU is returned.

ASIAppRemoteClient*_ASI_IDl_connect( ) const

This ensures the connection to other side is established.

ASIAppRemoteSkel

All skeletons are derived off this ASI_ID and the abstract base for the class. This ASI_ID provides the interface ASI_IDl_methodPDU( ) for the meta compiler to ASMP.

ASIAppRemotePDU

This is the actual data packet sent across the network. The data in this are:

ASIAppMarshalId id

This is the PDU packet number. This is a monotonically increasing integer to uniquely identify the packet.

This is one of several known protocol operations:

Disconnect—close the connection between ASIAppRemoteClient and ASIAppRemoteServer Error—an error occurred in processing the request Result—a packet containing the result of a request Lookup—a request to find an ASIAppRemoteReference based on a well-known name in the ASIAppRemoteNameServer Ping—a request for the server to send a Pong back.

Pong—a response from the server to the client to a Ping

Method—a request to execute the command on the server

Unreference—a request to decrement a reference count.

Reference—a request to increment a reference count.

An ASCII string command to execute on the remote server. This is the "name" in a Name-Value pair.

ASIAppReferenceId referenceId

This is the ASI_ID ASIAppReferenceId on the server to uniquely identify the ASI_ID of this PDU.

Vector*data

This is the data for a method execution. This is the "value" in a Name-Value pair.

ASI_RemoteConnectionServer

This is the main class on the server side of ASMP. This is the entry point into the system for an ASIAppRemoteClient requesting access to an ASIAppRemoteServer.

ASIAppRemoteConnectionMonitor

This is the main class on the client side of ASMP. This is the entry point into the system for a connection and to create an ASIAppRemoteClient for a particular destination to the ASIAppRemoteConnectionServer.

ASIAppRemoteServer

This is server side of the client-server communication channel that processes each inbound request. The ASIAppRemoteServer will spawn a new thread for each ASIAppRemotePDU method packet. There is always one ASIAppRemoteServer for an ASIAppRemoteClient.

ASIAppRemoteClient

This is the client side of the client-server communication channel that sends each outbound request and receives the inbound response. There is always one ASIAppRemoteClient for an ASIAppRemoteServer.

ASIAppRemoteError

This is the class, which is thrown by both the client and server side whenever an error is detected. All of these are fatal and are non-recoverable.

ASIAppRemoteException

This is the class, which is thrown by both the client and server side whenever an exception is detected. None of these are fatal and the user should provide recovery code.

Timing

A timing diagram may be drawn that shows the timing between all of the ASI_IDs and the threads operating on them in the preferred embodiment. Such a timing diagram represents the startup of the ASI_ID layer on both the client and server sides. It also demonstrates a lookup("root") call from the client and a later getname( ) method call on the root ASI_ID.

Vertical lines in such a timing diagram represent the ASI_IDs (data and functions) used in the client and server sides. Horizontal lines represent the threads in the operating system—different threads have different line patterns. There are two threads on the client side (left) and there are three on the server side (right). Also, the dotted "write" line represents TCP traffic between the two machines (client and server).

System Requirements

It will be apparent to those of ordinary skill in the art that the system items defined above represent an implementation of the preferred embodiment. Other equivalent embodiments will be apparent to those of ordinary skill in the art.

AI Superintelligence Application Service Information Base ASIB Architecture Introduction The present disclosure also includes a dynamic ASIB, the AI Superintelligence Application Service Information Base of ASMP.

The following sections cover an overview of the architecture for the ASIB, as the enterprise needs to be customized for each Merchant or organization. To accomplish this, a uniform interface is provided which will allow the Merchant or organization, to provide a customized interface for the business or management ASI_IDs. A library provides the core parser and interpreter for the ASIB. It also is the base class for business and management ASI_IDs, which will interface with the enterprise interface.

Architectural Overview: The architecture of an ASI Application data structure ASI_ID in the preferred embodiment requires four parts:

1. The Extended Finite State Machine (EFSM) ASIB in the CoreBusinessASI_ID or Management ASI_ID (C++).
   State is the set of values describing the current position of the machine if it has memory.
   Transition is the action and state change performed by the machine after it receives an event.
   Event is the inbound trigger which causes the machine to perform a transition.
   Action is the output of the machine as a result of a transition.
   Diagram is a complete finite state machine description containing states and transitions.
2. ASMP interface for the business or management ASI_ID to the ASIB. (C++);
3. The enterprise interface protocol (specification);
4. The ASIB instructions for the business or management ASI_ID (EISM, which stands for Enterprise Interface State Machine).

The first item (ASIB and CoreBusinessASI_ID or management ASI_ID) is built once. This is part of the ASMP library. The second item is built as a common business or other ASI_ID and should be generic enough to be configurable for different merchants or organizations. The third item is a specification that must be written by the merchant or other organization for its own enterprise interface. The fourth is configurable during runtime for different business or other organization or management ASI_IDs.

The following sections discuss the ASIB and CoreBusinessASI_ID or management ASI_ID, as well as show an example BankAccount ASI_ID which has two different merchant enterprise interfaces.

FSM and ASIB (Extended FSM)

A simple Finite State Machine (FSM) consists of two items: a set of states S and their possible transitions T. A transition t consists of an initial state ts, and event e which triggers an action a, and a final state tf. An example consists of two states S={A, B} and two transitions T={t1, t2}. The transitions can be described as t1=(A, X, Y, B) and t2=(B, U, V, A). The transition t1 from state A to state B is triggered by an event X and causes an action Y. Likewise, the transition t2 from state B to state A is triggered by an event U and causes an action V. If the finite state machine is in state A and receives any event besides X, it will remain in state A. Only when a valid event occurs (by having a defined transition) does the FSM change its state.

In a formal FSM, the set of states is indeed finite. However, often an extended FSM, called the dynamic ASIB, is needed. Here the states are not finite, per se; there exists a number of finite state "blocks" on the diagram, but there are also global variables which may store values which may take on an infinite number of possibilities. This adds another dimension to the FSM and makes the whole system have an infinite number of "states".

As an example, consider a simple counter that receives an input trigger and outputs an integer one greater than the previous output. The input event is anything. The output action is the integer "count". In the formal FSM, there would need to be a state for each possible integer value. If the counter had a limit of 10, then there would be eleven states: an initial state and one for each output value. However, if an infinite counter were needed, an infinite number of states would be needed.

However, if an extended FSM or ASIB is used, there would only need to be one state. This is the idle (or initial) state. The counter would simply output the count value and increment this value.

Interpreter

The state machine is interpreted allowing for bytecode compilation into a stack machine opcode.

Stack-based machine: The stack machine allows for a simple implementation and compilation of the parsed state machines.

Machine: The state machine described in the preferred embodiment uses the scheme to create an intermediate bytecode, which is interpreted by the stack machine. The ASCII input file is passed off to the parser which converts this to the byte code. The byte code can then be used to run the stack machine (as a state machine) or to the dump program which creates an ASI_ID file dump of the instructions and the symbol table.

Parser: The parser will take the input ASCII, parse it for syntax and syntactical errors, and then create a stack machine instruction set for the resulting state machine. The conversion of the state machine diagram into a stack machine saves time for the run time interpreter and does the preprocessing of the symbol table.

Interpreter: The interpreter is now just a simple stack machine, which does receive input events and sends out actions. The stack machine contains a very limited set of instructions, which simply perform the basic arithmetic and conditional chores at run time.

Core Business ASI_ID or Management ASI_ID: All business or management ASI_IDs must interface with the back-end channel to communicate with the enterprise computer. Hence, the core business or management ASI_ID, from which all of the business or management ASI_IDs derive, must have embedded in it the FSM to be able to parse the EISM ASIB configured with diagrams.

The core business or management ASI_ID must be remotely accessible and therefore must be integrated within the ASI_ID payload. It has the interfaces for the enterprise interface and the FSM. The following example illustrates the description of an example of a CoreBusinessASI_ID or Management ASI_ID.

Example Application (BankAccount)

The back-end communication channel must be customized for each customer for their given application. Since this back end channel will be different for each customer, a program capable of handling the different capabilities and customizable features per customer is needed. As illustrated below, consider a simple bank account class, which has a balance query and withdraw and deposit methods to change the account balance:

```
class BankAccount {
int balance( ) const;
void withdraw(int amount);
void deposit(int amount);
}
```

Talking to the back-end may vary from merchant to merchant. Therefore, an intermediate machine needs to connect with the back-end to communicate using a name-value pair protocol, which is modifiable. Consider two banks, BofA and Fidelity. BofA may query the back-end for a balance of an account by sending the account number and then the word "balance: query". This can be summarized as follows:

```
send("account_number")
send(<eid>)
send("balance:query")
expect("amount")
Expect(amount)
Return Amount
```

The other bank Fidelity may require the account number being set, receiving this confirmation and then send the "balance" query. This can be summarized as follows:

```
send("account-number")
send(<account number>)
expect(status)
send("balance")
expect(amount)
return amount
```

The second bank Fidelity contains more steps and can have more error conditions. Both of these cases can also be described using an FSM and ASIB EISM to configure the BankAccount class.

For a single expected string, the use is straightforward. However, to use the expect state for more than one string (more than one expected response), one must make use of the "extended" nature of the ASIB EFSM. Namely, one must use global variables to store the other dimension of state. These two bank examples show how different merchant back-ends can make use of the same business or management ASI_ID.

The bank ASI_ID class structure was shown above. However, since this will be derived off of the CoreBusinessASI_ID or Management ASI_ID it follows that this BankAccount ASI_ID needs an ASMP definition, assuming these three methods: balance, withdraw and deposit:

After compiling this ASMP ASI_ID, one can then add the hooks to provide the method connections to the FSM for this particular business ASI_ID.

Thus, a method and apparatus for a thinking system using an ASI distributed Application State Machine and ASI Command, Control, Communications and Computer Intelligence (C4I) system for independent, intelligent AI Prompting and ASI Browsing, using a configurable AI Superintelligence Application Layer Switch are disclosed. These specific arrangements and methods described herein are merely illustrative of the principles of the present disclosure. Numerous modifications in form and detail may be made by those of ordinary skill in the art without departing from the scope of the present disclosure. Although this invention has been shown in relation to a particular preferred embodiment, it should not be considered so limited. Rather, the present disclosure is only limited by the scope of the appended claims.

Figure 10:
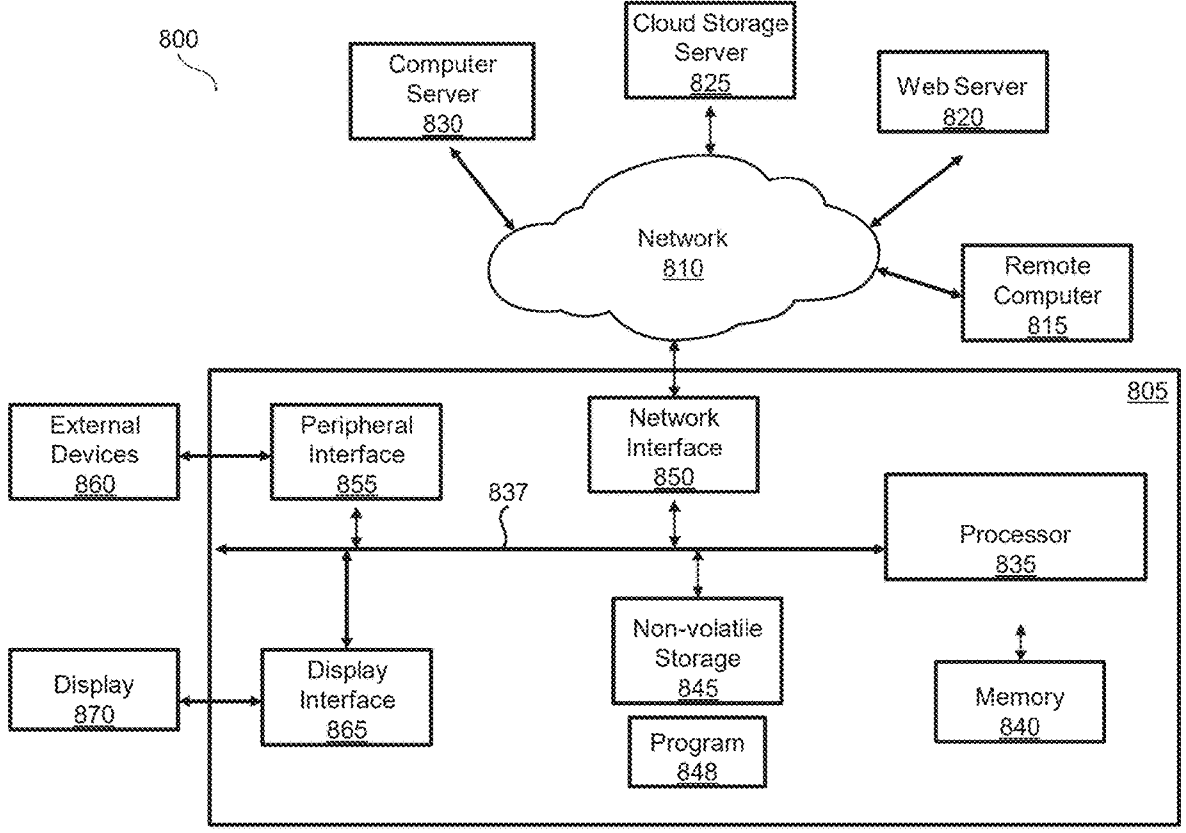
FIG. 10 is a diagram of a computer-based device and network that hosts aspects of the present disclosure.

FIG. 10 illustrates a block diagram of a computer that may implement the various embodiments described herein.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

FIG. 10 is a functional block diagram illustrating a networked system 800 of one or more networked computers and servers. In an embodiment, the hardware and software environment illustrated in FIG. 10 may provide an exemplary platform for implementation of the software and/or methods according to the present disclosure.

Referring to FIG. 10, a networked system 800 may include, but is not limited to, computer 805, network 810, remote computer 815, web server 820, cloud storage server 825 and computer server 830. In some embodiments, multiple instances of one or more of the functional blocks illustrated in FIG. 10 may be employed.

Additional detail of computer 805 is shown in FIG. 9. The functional blocks illustrated within computer 805 are provided only to establish exemplary functionality and are not intended to be exhaustive. And while details are not provided for remote computer 815, web server 820, cloud storage server 825 and computer server 830, these other computers and devices may include similar functionality to that shown for computer 805.

Computer 805 may be a personal computer (PC), a desktop computer, laptop computer, tablet computer, netbook computer, a smart phone, or any other programmable electronic device capable of communicating with other devices on network 810.

Computer 805 may include processor 835, bus 837, memory 840, non-volatile storage 845, network interface 850, peripheral interface 855 and display interface 865. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 835 may comprise one or more single or multi-chip microprocessors, including but not limited to those designed and/or manufactured by Intel Corporation, Advanced Micro Devices, Inc. (AMD), Arm Holdings (Arm), NVIDIA Corporation, Apple Inc., and Google LLC. Examples of such processing units include: Central Processing Units (CPUs) such as Celeron, Pentium, Core i3, i5, i7, i9, and Xeon from Intel; Opteron, Phenom, Athlon, Turion, Ryzen, EPYC (e.g., Genoa or Venice), and Threadripper from AMD; Cortex-A, Cortex-R, and Cortex-M from Arm; and M-series or A-series chips from Apple. Furthermore, processor 835 may include highly parallelized Graphics Processing Units (GPUs) and General-Purpose Graphics Processing Units (GPGPUs), such as NVIDIA's H100, A100, RTX-series, T4, Blackwell (e.g., B100, B200), and Rubin (e.g., R100) architectures, or AMD's Radeon and Instinct MI-series (e.g., MI300, MI325, and MI400-series family including MI430X, MI450, and MI455X). Processor 835 may also incorporate specialized hardware accelerators such as Neural Processing Units (NPUs), Tensor Processing Units (TPUs), Vision Processing Units (VPUs), or other deep learning inference engines. Additionally, the processor may encompass programmable logic devices such as Field Programmable Gate Arrays (FPGAs) from Xilinx (AMD) or Altera (Intel), Application-Specific Integrated Circuits (ASICs), or System-on-Chip (SoC) architectures (e.g., NVIDIA Grace-Blackwell or Vera-Rubin Superchips) integrating one or more of the aforementioned processing cores into a single physical package. To facilitate high-speed data exchange between these processing units, the system may utilize high-bandwidth interconnects and fabrics, including but not limited to Peripheral Component Interconnect Express (PCIe) (e.g., Gen 5 or Gen 6), NVLink (e.g., NVLink 5.0 or NVLink 6.0), NVSwitch, Infinity Fabric, or Compute Express Link (CXL 3.1). Processor 835 may further be communicatively coupled to high-performance memory architectures, such as High Bandwidth Memory (HBM, HBM2, HBM3, HBM3e, HBM4), enabling the rapid throughput required for large-scale artificial intelligence model execution. The functional execution of processor 835 is managed by a multi-layered software stack and runtime environment, including but not limited to NVIDIA CUDA and associated CUDA-X AI libraries (e.g., cuDNN, TensorRT, NCCL), AMD ROCm and HIP, Intel oneAPI, or OpenCL. These environments may further interface with high-level AI frameworks such as PyTorch, TensorFlow, JAX, or ONNX to orchestrate the deployment, training, and inference of embedded AI models across the heterogeneous processing hardware.

Bus 837 may comprise a proprietary or industry-standard high-speed parallel or serial interconnect fabric, including but not limited to Peripheral Component Interconnect Express (PCIe) (e.g., Gen 5, Gen 6, or Gen 7), NVLink (e.g., versions 4.0, 5.0, or 6.0), NVSwitch, AMD Infinity Fabric, or Compute Express Link (CXL) (e.g., versions 2.0, 3.0, or 3.1). Bus 837 may further encompass cache-coherent interconnects and scale-out networking fabrics such as InfiniBand (e.g., NDR or XDR), RoCE (RDMA over Converged Ethernet), or proprietary Optical Interconnects. These interconnects facilitate ultra-low latency, high-bandwidth communication between heterogeneous processing units, memory pools, and expanded I/O subsystems, enabling the unified memory addressing required for large-scale artificial intelligence model execution and distributed supercomputing.

Memory 840 and non-volatile storage 845 may comprise one or more computer-readable storage media. Memory 840 may include any suitable volatile storage devices or high-bandwidth memory architectures, such as Dynamic Random Access Memory (DRAM) (e.g., DDR5, LPDDR5x, or DDR6), Static Random Access Memory (SRAM), and High Bandwidth Memory (HBM) (e.g., HBM3, HBM3e, or HBM4). Memory 840 may further include CXL-attached memory expansion modules for near-compute data processing. Non-volatile storage 845 may include one or more of the following: Solid-State Drives (SSDs) utilizing NVMe (Non-Volatile Memory Express) over PCIe interfaces, NAND Flash, NOR Flash, Magnetoresistive Random Access Memory (MRAM), Phase-Change Memory (PCM), or enterprise-grade storage arrays. Additionally, non-volatile storage 845 may encompass high-capacity optical storage, persistent memory modules (PMMs), or removable memory cards and high-density semiconductor-based storage devices.

Program 848 may be a collection of machine readable instructions and/or data that is stored in non-volatile storage 845 and is used to create, manage and control certain software functions that are discussed in detail elsewhere in the present disclosure and illustrated in the drawings. In some embodiments, memory 840 may be considerably faster than non-volatile storage 845. In such embodiments, program 848 may be transferred from non-volatile storage 845 to memory 840 prior to execution by processor 835.

Computer 805 may be capable of communicating and interacting with other computers via network 810 through network interface 850. Network 810 may be, for example, a local area network (LAN), a wide area network (WAN) such as the Internet, or a combination of the two, and may include wired, wireless, or fiber optic connections. In general, network 810 can be any combination of connections and protocols that support communications between two or more computers and related devices.

Peripheral interface 855 may allow for input and output of data with other devices that may be connected locally with computer 805. For example, peripheral interface 855 may provide a connection to external devices 860. External devices 860 may include devices such as a keyboard, a mouse, a keypad, a touch screen, and/or other suitable input devices. External devices 860 may also include portable computer-readable storage media such as, for example, thumb drives, portable optical or magnetic disks, and memory cards. Software and data used to practice embodiments of the present disclosure, for example, program 848, may be stored on such portable computer-readable storage media. In such embodiments, software may be loaded onto non-volatile storage 845 or, alternatively, directly into memory 840 via peripheral interface 855. Peripheral interface 855 may use an industry standard connection, such as RS-232 or Universal Serial Bus (USB), to connect with external devices 860.

Display interface 865 may connect computer 805 to display 870. Display 870 may be used, in some embodiments, to present a command line or graphical user interface to a user of computer 805. Display interface 865 may connect to display 870 using one or more proprietary or industry standard connections, such as VGA, DVI, DisplayPort and HDMI.

As described above, network interface 850, provides for communications with other computing and storage systems or devices external to computer 805. Software programs and data discussed herein may be downloaded from, for example, remote computer 815, web server 820, cloud storage server 825 and computer server 830 to non-volatile storage 845 through network interface 850 and network 810. Furthermore, the systems and methods described in this disclosure may be executed by one or more computers connected to computer 805 through network interface 850 and network 810. For example, in some embodiments the systems and methods described in this disclosure may be executed by remote computer 815, computer server 830, or a combination of the interconnected computers on network 810.

Data, datasets and/or databases employed in embodiments of the systems and methods described in this disclosure may be stored and or downloaded from remote computer 815, web server 820, cloud storage server 825 and computer server 830.

Circuitry as used in the present application can be defined as one or more of the following: an electronic component (such as a semiconductor device), multiple electronic components that are directly connected to one another or interconnected via electronic communications, a computer, a network of computer devices, a remote computer, a web server, a cloud storage server, a computer server. For example, each of the one or more of the computer, the remote computer, the web server, the cloud storage server, and the computer server can be encompassed by or may include the circuitry as a component(s) thereof. In some embodiments, multiple instances of one or more of these components may be employed, wherein each of the multiple instances of the one or more of these components are also encompassed by or include circuitry. In some embodiments, the circuitry represented by the networked system may include a serverless computing system corresponding to a virtualized set of hardware resources. The circuitry represented by the computer may be a personal computer (PC), a desktop computer, a laptop computer, a tablet computer, a netbook computer, a personal digital assistant (PDA), a smart phone, or any other programmable electronic device capable of communicating with other devices on the network. The circuitry may be a general purpose computer, special purpose computer, or other programmable apparatus as described herein that includes one or more processors. Each processor may be one or more single or multi-chip microprocessors. Processors are considered processing circuitry or circuitry as they include transistors and other circuitry therein. The circuitry may implement the systems and methods described in this disclosure based on computer-readable program instructions provided to the one or more processors (and/or one or more cores within a processor) of one or more of the general purpose computer, special purpose computer, or other programmable apparatus described herein to produce a machine, such that the instructions, which execute via the one or more processors of the programmable apparatus that is encompassed by or includes the circuitry, create a system for implementing the functions specified in the flow diagrams and block diagrams in the present disclosure. Alternatively, the circuitry may be a preprogrammed structure, such as a programmable logic device, application specific integrated circuit, or the like, and is/are considered circuitry regardless if used in isolation or in combination with other circuitry that is programmable, or preprogrammed.

Figure 11:
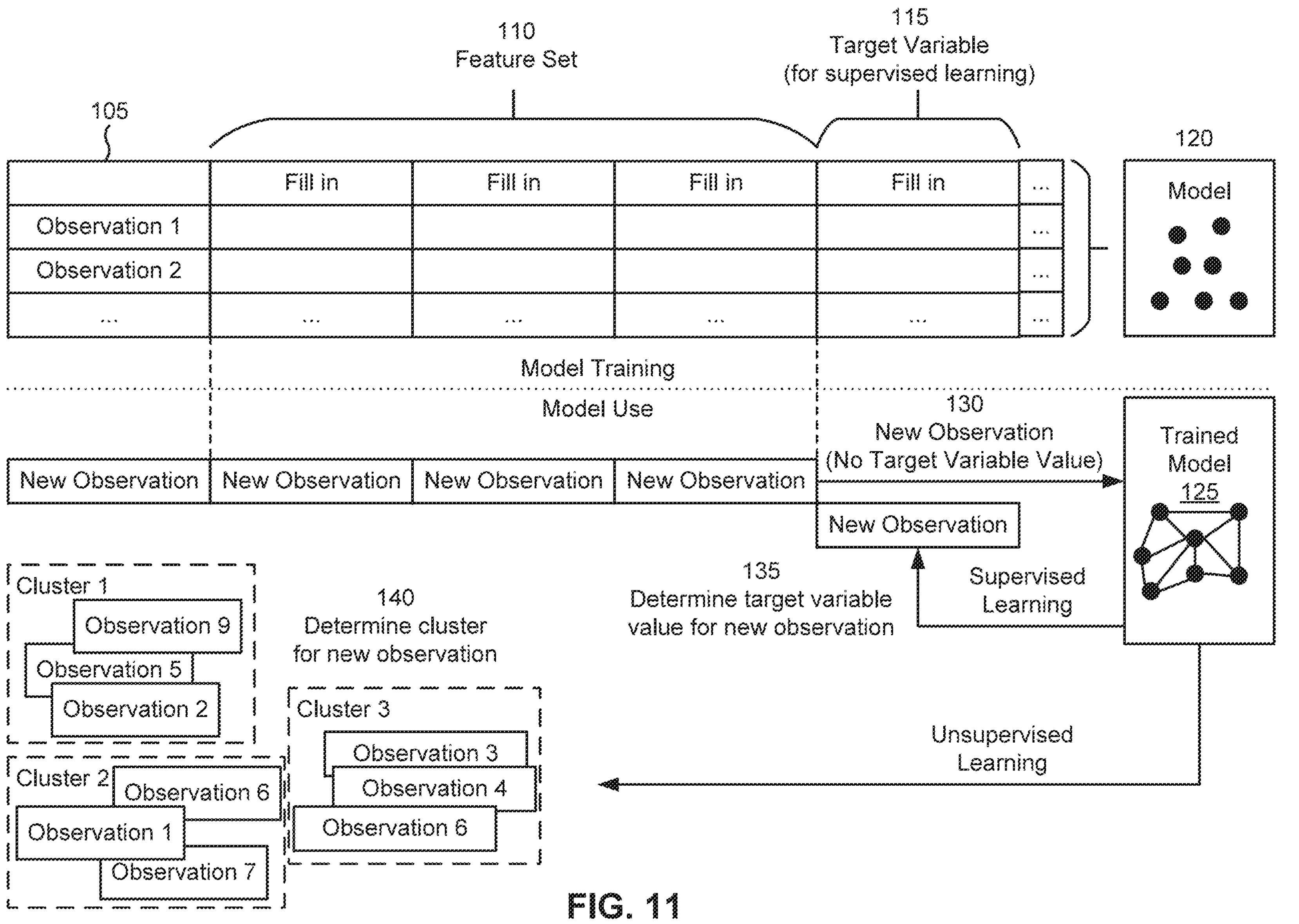
FIG. 11 is a diagram illustrating an example of training and using a machine learning model in connection with embodiments of the present disclosure.

FIG. 11 is a diagram illustrating an example of training and using a machine learning model in connection with use examples discussed herein as part of the embedded AI system, method, computer program product and firmware implementations. The machine learning model training and usage described herein may be performed using a machine learning system. The machine learning system may include, or may be included in, circuitry that is configured by execution of software instructions to perform the disclosed operations and/or previously configured to perform the disclosed operations (e.g., ASIC(s): Application Specific Integrated Circuit(s) and/or PAL(s): Programmable Array Logic(s)). Moreover, the circuitry may be embodied in various forms such as one or more of a processor, GPU(s), a controller, an ASIC or PAL, a computer, a server, and/or a cloud computing environment, among other examples, such as the ASI Application Network Node device described in more detail elsewhere herein. The circuitry (programmable, fixed hardwired, and/or hybrid) may be integrated with a sensor in a composite structure such that the circuitry performs operations on data provided by the sensor, or the circuitry is physically separated from the sensor. Moreover, the circuitry may be distributed as multiple circuits that exchange data via a wired bus, or wirelessly, and the circuitry may be able to receive sensor data, RADAD, and other information via the AI application layer of a communication network.

A portion of the training data set includes a set of observations 105. The set of observations 105 are included as portions of data structures that are also populated with training data, such as feature set 110, and target variables 115, as will be discussed. Data in the data structures may be labelled or unlabeled. The set of observations 105 may be obtained from training data (e.g., historical data), such as data gathered during one or more processes described herein. In some implementations, the machine learning system may receive the set of observations 105 (e.g., as input) from an ASI App service provider system (e.g., a financial institution or the like, depending on application and use-case), the transaction backend system, and/or the user device, as described elsewhere herein.

Associated with the set of observations 105 may include a feature set 110. The feature set 110 may include a set of variables, where each variable may be referred to as a feature. A specific observation may include a set of variable values (or feature values) corresponding to the set of variables. In some implementations, the machine learning system may determine variables for a particular set of observations and/or variable values for a specific observation based on input received as input to the ASI Application Network Node. For example, the machine learning system may identify a feature set 110 (e.g., one or more features and/or feature values) by extracting the feature set from structured data, by performing natural language processing to extract the feature set from unstructured data, and/or by receiving input from an operator, and/or ASI App service provider device.

As an example, a particular feature set for particular a set of observations may include a first feature of Company Name—Address and Telephone number, a second feature of Period—start date, end date, a third feature of Revenue—Gross Sales, Less Returns and Allowances, Net Sales each year for 5 years, and so on. As shown, for a first observation, the first feature may have a value of Company XYZ—123 Street, New York, NY, Telephone number 650 690 0995, the second feature may have a value Jan. 1, 2021 to Jan. 31, 2025, the third feature may have a value of Gross Sales of $200M, $300M, $400M, $500M, $600M for the years 2021, 2022, 2023, 2024, and 2025, Less Returns and Allowances of $10M, $10M, $10M, $10M, $12M for the years 2021, 2022, 2023, 2024, and 2025, Net Sales of $190M, $290M, $390M, $490M, $586M for the years 2021, 2022, 2023, 2024, and 2025, the fourth feature may have a value of Date prepared; the fifth feature may have a value of Cost of Sales, Year, Beginning and ending inventory, Plus Goods purchased or manufactured; the sixth feature may have a value of Cost of Goods Sold; Year; the seventh feature may have a value of Gross Profit or Loss; Year, and so on. These features and feature values are provided as examples and may differ in other examples. For example, the feature set may include one or more of the following features: Year; Operating Expenses—Salaries and wages; Commissions; Advertising; Year; Total selling expenses; Year; General and Administration Expenses: Salaries and wages; payroll taxes; employee benefits; insurance; rent; utilities; depreciation and amortization; Office Supplies; Shipping and Postage; Travel and Entertainment; Equipment maintenance and rental; Furniture and computers; Total General and Administration Expenses; Year; Total Operating Expenses; Year; Total Income before taxes; Taxes on Income; Net Income after taxes; Year; Net Income or Loss.

The set of observations 105 may each be associated with a target variable 115. The target variable 115 may represent a variable having a numeric value, may represent a variable having a numeric value that falls within a range of values or has some discrete possible values, may represent a variable that is selectable from one of multiple options (e.g., one of multiples classes, classifications, and/or labels, among other examples) and/or may represent a variable having a Boolean value. A target variable may be associated with a target variable value, and a target variable value may be specific to an observation. In the illustrated example, the target variable is Net Income (or Loss) in that Year, which has a value of $112M Loss in Year 2021 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

The machine learning system may train a machine learning model 120 using the set of observations 105 and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 125 to be used to analyze new observations. The trained machine learning model 125 may be embodied as a trained CNN (Convolutional Neural Network) or multiple CNNs, which is an example of an AI (Artificial Intelligence) engine.

As an example, the machine learning system may obtain training data for the set of observations based on Net Income (or Loss) for the Year in the Pro Forma ASI App, as described in more detail elsewhere herein.

The machine learning system may apply the trained machine learning model 125 to a new observation 130, such as by receiving the new observation 130 and inputting the new observation 130 to the trained machine learning model 125. As shown, the new observation 130 may include a first feature of a Company Name, a second feature of Period—start date, end date, a third feature of Revenue—Gross Sales, Less Returns and Allowances, Net Sales each year for 5 years, and so on, as an example. The machine learning system may apply the trained machine learning model 125 to the new observation 130 to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 125 may predict a value of $68M for the target variable 135 of Net Income after Taxes for the Year 2024 for the new observation 130. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, calculate the Net Income (or Loss) for the Year. The first automated action may include, for example, generate the Net Income (or Loss) Pro Forma Statement as a Spreadsheet. As another example, generate the Net Income (or Loss) Pro Forma Statement as a database, if desired.

In some implementations, the trained machine learning model 125 may classify (e.g., cluster) the new observation in a cluster 140. The observations within a cluster may have a threshold degree of similarity. For example, if the historical records indicate that advertising expense increases by $10M each year, then increment advertising expense by $10M each year. As an example, if the machine learning system classifies the new observation in a first cluster (e.g., generate Pro Forma Net Income Statement with incremental ad expense each year, then the machine learning system may provide a first recommendation, such as the first recommendation described above.

As another example, if the machine learning system were to classify the new observation 130 in a second cluster (e.g., generate Pro Forma Net Income Statement with incremental Equipment Maintenance and Repair), then the machine learning system may provide a second (e.g., different) recommendation (e.g., increment Equipment Maintenance and Repair Expense by $1M each Year, if desired).

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In some implementations, the trained machine learning model 125 may be re-trained using feedback information. For example, feedback may be provided to the machine learning model. The feedback may be associated with actions performed based on the recommendations provided by the trained machine learning model 125 and/or automated actions performed, or caused, by the trained machine learning model 125. In other words, the recommendations and/or actions output by the trained machine learning model 125 may be used as inputs to re-train the machine learning model (e.g., a feedback loop may be used to train and/or update the machine learning model). For example, the feedback information may include Net Income (or Loss) for the Year that is an output from the model.

Incremental Re-Training: In some implementations, the trained machine learning model 125 may be re-trained incrementally, as opposed to re-training the whole at each incremental step. As a consequence, incremental training reduces the number of parameters needed for implementing an ASI App-specific AI-model, that can be configured to be ASI App user-specific, or ASI App enterprise-specific, reducing the footprint needed and resource, energy and power usage in data centers.

In this way, the machine learning system may apply a rigorous and automated process to generate a Pro Forma Income Statement, as described in more detail elsewhere herein. The machine learning system may enable recognition and/or identification of tens, hundreds, thousands, or millions of features and/or feature values for tens, hundreds, thousands, or millions of observations, thereby increasing accuracy and consistency and reducing delay associated with generating an output of a Pro Forma Income Statement as a spreadsheet relative to requiring computing resources to be allocated for tens, hundreds, or thousands of operators to manually input and generate a Pro Forma Income Statement using the features or feature values.

As indicated above, FIG. 11 is provided as an example. Other examples may differ from what is described in connection with FIG. 11.

The following are 38 non-limiting aspects of the present disclosure.

1st Aspect: An AI Superintelligence—ASI thinking system using an ASI distributed Application State Machine that connects to real, accurate, dedicated absolute data, providing privacy, security, and eliminating hallucinated AI, said ASI thinking system including:

an ASI Browser displaying ASI Applications;

one or more context-specific ASI Application data structures;

an ASI Finite State Machine embedded in each ASI Application data structure;

an ASI Application data structure network;

an ASI Application Service Information Base providing a uniform interface for ASI Application data structure identities;

an ASI Enterprise Interface State Machine, said data structures interfacing with a back-end channel to a data repository containing real, accurate, dedicated absolute data;

interconnected ASI Agents, wherein said ASI Agents transmit said real, accurate, dedicated absolute data from a transactional application; and an ASI database of real, accurate, dedicated absolute data transferred between devices on the ASI application data structure network, forming the Machine Learning—M/L data set, connected to billing for training AI Models, for performing real-time, bi-directional transactions, from said ASI Applications.

$2^{nd}$ Aspect: An AI Superintelligence—ASI database of real, accurate, dedicated absolute data transferred between devices on an ASI application layer network on the Internet Cloud forming the Machine Learning—M/L data set, connected to billing for training AI Models, said ASI database including:

means for associating a context-specific ASI application data structure identity with information entries and attributes, wherein the ASI application data structure identity represents a networked data structure;

means for storing said information entries and said attributes and the data structure in a payload data structure;

means for specifying functions for remote execution;

means for transmitting real, accurate, dedicated absolute data from a transactional application to a database as Machine Learning—M/L data set, wherein said real, accurate, dedicated absolute data trains AI Models;

means for billing and service management per access to said real, accurate, dedicated absolute data in said database.

$3^{rd}$ Aspect: The ASI database in aspect 2 wherein said means for associating said ASI application data structure identity with said information entries and said attributes in said payload data structure further includes means for associating a name, a syntax and an encoding for said ASI application data structure identity.

$4^{th}$ Aspect: The ASI database in aspect 3 wherein said name of said ASI application data structure identity specifies an ASI application data structure type.

$5^{th}$ Aspect: The ASI database in aspect 4 wherein said ASI application data structure type and an ASI application data structure instance uniquely identify an instantiation of said ASI application data structure type.

$6^{th}$ Aspect: The ASI database in aspect 5 wherein said syntax defines a data structure for said ASI application data structure type.

$7^{th}$ Aspect: The ASI database in aspect 2 further comprising means for utilizing said transactional application to identify and transmit said ASI application data structure identity on an ASI application layer network on the Internet Cloud.

$8^{th}$ Aspect: The ASI database in aspect 2 further comprising means for serializing said parameters and ASI application data structures in said payload.

$9^{th}$ Aspect: An AI Superintelligence—ASI Application State Machine that connects to real, accurate, dedicated absolute data, providing privacy, security, and eliminating hallucinated AI, for performing real-time bi-directional transactions on an ASI application layer network, said ASI Application State Machine including:

an ASI Application data structure network, starting from the network entry point;

an ASI Application Service Information Base providing a uniform interface for ASI Application data structure identities;

an ASI Enterprise Interface State Machine, said data structures interfacing with a back-end channel, a Finite State Machine embedded in each ASI Application data structure;

interconnected ASI Agents, wherein said ASI Agents transmit said real, accurate, dedicated absolute data from a transactional application; and an ASI database of real, accurate, dedicated absolute data transferred between devices on the ASI application data structure network, forming the Machine Learning—M/L data set, connected to billing for training AI Models, for performing real-time, bi-directional transactions, from said ASI Applications.

$10^{th}$ Aspect: A machine-readable medium having stored thereon an AI Superintelligence—ASI Operating System, the ASI Operating System including:

(a) a user interface comprising:
  (1) a display of an ASI Browser;
  (2) a display of workspace to configure a Point-of-Service ASI Application for display on said ASI Browser;
  (3) a display of workspace to define an item;
  (4) a display of workspace to define an ASI Application data structure with both data and functions, wherein the functions are executed remotely;
  (5) a display of workspace to create said ASI Application data structure instance, wherein said instance defined by said data and functions;
  (6) a display of said ASI Application data structure with its identity and attributes and functions, with a space for input, output parameters to be filled in;

(b) an ASI Application data structure identity to determine its arguments and data structure serialization and if it is local or remote;

(c) network line protocol and protocol data unit (PDU) to communicate with the remote device;

(d) a library providing support for ASI application programming interfaces (APIs) to remotely access an ASI Application data structure identity, its data and functions in an ASI Application data structure network;

(e) an application programming interface, wherein the interface provides a skeleton data structure definition, wherein the skeleton is the functionality of said ASI Application data structure identity;

(f) an application programming interface, wherein the interface provides the stub for said skeleton, wherein the stub allows remote access of the same ASI Application data structure identity;

(g) a meta file, wherein the meta file specifies the arguments to the function and the type of argument passing, by value or reference;

(h) a meta-compiler, wherein the meta-compiler translates a higher level meta-language from the meta-file into a lower-level language output file for and before giving to a traditional compiler;

(i) payload data structure for serialization of the data onto a network stream to transfer data between devices, wherein the arguments, herein the name-value pairs of the attributes of the ASI Application data structure and the ASI Application data structures themselves are sent over the network, wherein the code is generated by the meta compiler in the skeleton;

(j) data marshaling, wherein said data marshaling is provided by the meta compiler in the stub and skeleton to ensure that all data is passed as arguments to a method requires the user to check all arguments, herein, the name-value pairs and throw an exception, if there is something missing or wrong;

(k) Abstract Base Class, wherein the Abstract Base Class is the parent of both the stub and skeleton, wherein the Abstract Base Class is created by the meta compiler in order to operate on an ASI Application data structure without knowing its location, local or remote, and, wherein the Abstract Base Class cannot be instantiated alone;

(l) Thread rendezvous routine, wherein the thread rendezvous routine blocks a thread during network transmission and reception, wherein the ASI Application data structure must use a different thread to perform the actual network activity and control the calling thread status;

(m) String Execution routine, wherein said String Execution routine allows for a method to be called from an ASCII string representation, created by the meta compiler in the base class;

(n) Reference counting in both the local and remote ASI Application data structures, wherein said Reference counting avoids time consuming malloc's and free's, and wherein Reference counting clarifies which function is responsible for deleting which ASI Application data structure;

(o) Stub and Skeleton classes, wherein said Stub and Skeleton classes are inherited from the Abstract Base Class and from their respective ASI Application data structure layer classes, created by the meta compiler;

(p) The Meta compiler that takes a definition file and creates using encoding the Application data structure identity, Data Serialization, Data Marshaling, String Execution, Abstract Base Class, and the Stub/Skeleton Multiple Inheritance, wherein the meta compiler eliminates errors;

(q) User-defined Data Model, wherein the user created set of classes built around and top of the APIs as basis of the ASI Application data structure layer to the next level up the software layers, appears local to the programmers using said data structure layer even though remote;

(r) an interface specification for the Abstract Base Class, inherited by both the ASI Application data structure layer ASI Application data structures and the data model ASI Application data structures, wherein the interface allows it to execute any method using a simple ASCII string and ASI Application data structure type data, and provides thread synchronization, flag variables and reference counts;

(s) a new data model ASI Application data structure, wherein it contains one data member "name" which is a String, wherein the meta compiler automatically creates two access components for this data member: get_name and set_name and creates the local and remote versions of this data model ASI Application data structure as Name skeleton and stub;

(t) The skeleton, wherein it represents the server side of the ASI Application State Machine Protocol—ASMP, wherein the skeleton is a class, derived off the Abstract Base Class and wherein all methods must be defined by the programmer for the skeleton since this is the actual ASI Application data structure identity;

(u) The stub, wherein it is the client (or remote) side of an ASI Application data structure, similar to the skeleton derived off the same Abstract Base Class, wherein the programmer has nothing to define and all methods are generated by the meta compiler, which creates an interface file and a definition file for each of the three classes, abstract base class, stub and skeleton;

(v) Parser, wherein the parser parses the description file and produces the six output files, cbase, hbase, cstub, hstub, cskel or hskel;

(w) The compiler, wherein said compiler waits for the header section to complete, then, begins the class name and parent, followed by the data section; and next followed by the method section, with method and arguments;

(x) Connection Server, wherein said Connection Server is the main class on the server side of ASMP, and is the entry point into the system for a Remote Client requesting access to an ASI Application Remote Server;

(y) Connection Monitor, wherein said Connection Monitor is the main class on the client side of ASMP and is the entry point into the system for a connection and to create a Remote Client for a particular destination to the Remote Connection Server;

(z) Remote Server, wherein the Remote Server is the server side of the client-server communication channel that processes each inbound request, and wherein it spawns a new thread for each Remote PDU method packet, and wherein there is always one Remote Server for a Remote Client;

(aa) an ASI Application data structure network;

(bb) an ASI Application Service Information Base providing a uniform interface for ASI Application data structure identities;

(cc) an ASI Enterprise Interface State Machine, said data structures interfacing with a back-end channel to a data repository containing real, accurate, dedicated absolute data, a Finite State Machine embedded in each ASI Application data structure;

(dd) interconnected ASI Agents, wherein said ASI Agents transmit said real, accurate, dedicated absolute data from a transactional application; and (ee) an ASI database of real, accurate, dedicated absolute data transferred between devices on the ASI application data structure network, forming the Machine Learning—M/L data set, connected to billing for training AI Models, for performing real-time, bi-directional transactions, from said ASI Applications.

11$^{th}$ Aspect: An AI Superintelligence—ASI financial application for performing real-time bi-directional transactions on an ASI application layer network on the Internet Cloud, by securely accessing real, accurate, dedicated absolute data transferred between devices, to an ASI database, forming the Machine Learning—M/L data set, connected to billing for training AI Models, said ASI financial application including:

(a) user interface comprising:

1) an ASI Browser displaying a list of one or more Point-of-Service ASI applications for performing real-time bi-directional transactions with a financial institution; and 2) an AI Prompt for issuing a request to a financial institution's AI LLM whose parameters are trained in real, accurate, dedicated absolute data in an ASI database, forming Machine Learning M/L Data Set, said real, accurate, dedicated absolute data transmitted from said financial institution's back-office data repository to an ASI Agent to said ASI database;

(b) a definition file describing the financial institution and user account as ASI application data structure identities with information entries and attributes, wherein one attribute is a name, further wherein the application data structure identity represents a networked data structure, and further wherein said definition file is parsed by a meta compiler;

(c) an ASI application data structure layer network in an application layer network over the Internet Cloud;

(d) a main financial institution ASI application data structure identity with the name of the financial institution and several user accounts, wherein on the remote client side, the programmer first establishes contact with a remote server and then receives the financial institution ASI Application data structure on the client side as an ASI stub; and wherein once the stub is received, the client can then look up user accounts just as if the programmer was local to the skeleton on the server side;

(e) programming code, wherein the programming code is the same on either the client or server side, and further wherein on the remote client side, the programmer does not need to know where the actual ASI application data structure resides: local or remote;

(f) ASI application user account data structure class, wherein said class contains both methods and data, wherein the data is an integer describing the amount of money the account holds, and wherein two methods, deposit and withdraw, increment and decrement this amount, and wherein the ASI application data structure user account skeleton defines the skeleton methods and wherein the stub methods are defined by the meta compiler;

(g) the financial institution ASI application data structure, wherein the meta compiler creates six files for the base class, stub and skeleton, wherein these six files describe the operation and remote execution of the financial institution ASI application data structure;

(h) no data, wherein no data access components are generated;

(i) the returned financial institution ASI user account data structure, wherein the user account data structure is followed by the method name, getAccount, and the arguments in name-value pairs, wherein there are two integer arguments with name id and pin;

(j) description of any additional functionality for the operation of said ASI application data structure and the definitions of the skeleton methods contained in the skeleton file;

(k) instantiation of the data structures, wherein the method getAccount will always return user's account;

(l) a client and server programs, wherein the server creates the skeletons and registers them in the name server, wherein the programmer does not have to know whether the user account data structure with a name is local or remote;

(m) a payload data structure for transmitting the data structure identities themselves along with the information entries and said attributes;

(n) methods, wherein the methods are specified for remote execution;

(o) ASI Agent;

(p) Asi Stub;

(q) ASI Application Service Information Base—ASIB, wherein a uniform interface allows any financial institution or organization to provide a customized interface for business or management ASI application data structure identities, wherein said business and management ASI Application data structure identities are built once, wherein they are configurable for different financial institutions or organizations;

(r) the base class for business and management ASI application data structure identities;

(s) an interface from the base class with the enterprise interface;

(t) an Extended Finite State Machine—EFSM—for the business and management ASI application data structure identities;

(u) interface with ASI Application State Machine Protocol for the business and management ASI application data structure identities;

(v) enterprise interface protocol specification, wherein the specification is written by the organization for its own enterprise interface;

(w) ASI Enterprise Interface State Machine—EISM—instructions for the business and management ASI application data structure identities, configurable during runtime for different business and management ASI application data structure identities, wherein said data structures interface with a back-end channel to communicate with the financial institution's enterprise computer or device—the enterprise interface, and wherein each of said data structures has embedded in it a Finite State Machine—FSM to be able to parse the EISM instructions configured with diagrams, and wherein each such data structure is remotely accessible, and integrated with the payload sent on the ASI application network;

(x) the interface from said ASI Agent to a Back Office of the financial institution's data repository;

(y) performing the real-time, bi-directional transaction from said Point-of-Service ASI financial application; and (z) real dedicated absolute data transmitted from a transactional application to an ASI database, as Machine Learning M/L Data Set for training LLM parameters in response to a query from an AI Prompt and connected to billing per access to said dedicated absolute data.

$12^{th}$ Aspect: An AI Superintelligence—ASI Application for performing real-time bi-directional transactions on an ASI application layer network on the Internet Cloud, by securely accessing real dedicated absolute data transferred between devices, to an ASI database, forming the Machine Learning—M/L data set, connected to billing for training AI Models, said ASI Application including:

(a) user interface comprising:

1) an ASI Browser displaying a list of one or more Point-of-Service ASI applications for performing real-time bi-directional transactions with any organization; and 2) an AI Prompt for issuing a request to the organization's AI LLM whose parameters are trained in real, accurate, dedicated absolute data in an ASI database, forming Machine Learning M/L Data Set, said real dedicated absolute data transmitted from said organization's back-office data repository to an ASI Agent to said ASI database;

(b) a definition file describing the organization and user account as ASI application data structure identities with information entries and attributes, wherein one attribute is a name, further wherein the application data structure identity represents a networked data structure, and further wherein said definition file is parsed by a meta compiler;

(c) an ASI application workflow data structure layer network in an application layer network over the Internet Cloud;

(d) a main organization's ASI application data structure identity with the name of the organization and several user accounts, wherein on the remote client side, the programmer first establishes contact with a remote server and then receives the organization's ASI Application data structure on the client side as an ASI stub; and wherein once the stub is received, the client can then look up user accounts just as if the programmer was local to the skeleton on the server side;

(e) programming code is the same on either the client or server side, and further wherein on the remote client side, the programmer does not need to know where the actual ASI application data structure resides: local or remote;

(f) ASI application user account data structure class, wherein said class contains both methods and data, wherein the data is an integer or string describing the context-specific application data, and wherein two methods, get and set, retrieve or set the data and ASI application data structure user account skeleton defines the skeleton methods and wherein the stub methods are defined by the meta compiler;

(g) the organization's context-specific ASI application data structure, wherein the meta compiler creates six files for the base class, stub and skeleton, wherein these six files describe the operation and remote execution of the organization's context-specific ASI application data structure;

(h) no data, wherein no data access components are generated;

(i) the returned organization ASI user account data structure, wherein the user account data structure is followed by the method name, getAccount, and the arguments (name-value pairs), wherein there are two integer arguments with name id and pin;

(j) description of any additional functionality for the operation of this ASI application data structure and the definitions of the skeleton methods contained in the skeleton file;

(k) instantiation of the data structures wherein the method getAccount will always return user's account;

(l) a client and server programs, wherein the server creates the skeletons and registers them in the name server, wherein the programmer does not have to know whether the user account data structure with a name is local or remote;

(m) a payload data structure for transmitting the data structure identities themselves along with the information entries and said attributes;

(n) methods, wherein the methods are specified for remote execution;

(o) ASI Agent;

(p) Asi Stub;

(q) ASI Application Service Information Base—ASIB, wherein a uniform interface allows any organization to provide a customized interface for business or management ASI application data structure identities built once and configurable for different organizations;

(r) the base class for business and management ASI application data structure identities;

(s) an interface from the base class with the enterprise interface;

(t) an Extended Finite State Machine—EFSM—for the business and management ASI application data structure identities;

(u) interface with ASI Application State Machine Protocol for the business and management ASI application data structure identities;

(v) enterprise interface protocol specification, wherein the specification is written by the organization for its own enterprise interface;

(w) ASI Enterprise Interface State Machine—EISM—instructions for the business and management ASI application data structure identities, configurable during runtime for different business and management ASI application data structure identities, wherein said data structures interface with a back-end channel to communicate with the organization's enterprise computer or device—the enterprise interface and wherein each of said data structures has embedded in it a Finite State Machine—FSM to parse the EISM instructions configured with diagrams, and wherein each such data structure is remotely accessible, and integrated with the payload sent on the ASI application network;

(x) the interface from said ASI Agent to a Back Office of the organization's data repository;

(y) performing the real-time, bi-directional transaction from said Point-of-Service ASI Application; and (z) real, accurate, dedicated absolute data transmitted from a transactional application to an ASI database, as Machine Learning M/L Data Set for training LLM parameters in response to a query from an AI Prompt and connected to billing per access to said dedicated absolute data.

13$^{th}$ Aspect: The ASI Application in aspect 12, wherein the ASI Application is an AI Superintelligence—ASI Longevity Healthcare Application accessed by a patient and healthcare provider, wherein the configurable ASI Longevity application data structure identities definition file comprises:

(a) Patient Account as application data structure identity;

(b) Patient ID as application data structure identity;

(c) Hospital Outpatient Rehabilitation or Department ID as application data structure identity with attribute and information entries as Cardiology, Vestibular Physical Therapy;

(d) Meditation as application data structure identity, with attribute, frequency and information entry, twice a day, and attribute duration with information entry of 15 minutes;

(e) Type of meditation as attribute;

(f) Information entries as Alternate nostril breathing, Pranayama, Gratitude Meditation, observing silence also called Mauna Vratha because silence achieves the universe as in Maunam Sarvartha Saadagam and provides healing, Positive Healing, Self-Acceptance of body and mind, Body Scan—self-compassion, self-value;

(g) Walk, Cardio, as application data structure identity with attributes, Extra Credit, Frequency with long walk, with information entry as once daily; attribute as short walks, information entry as twice a day; attributes as how many minutes of walk, minutes of cardio, how many minutes of uphill walk, how many minutes of fast walk to increase respiratory rate, highest heart rate;

(h) Vitamin D from Morning Sunshine as application data structure identity, wherein the attributes are relax in the morning sunshine, walk in the morning sun, and frequency and wherein the information entries are one or twice a day and how many minutes;

(i) Enhance joy and calmness with grounding techniques with five senses as application data structure identity, wherein the attributes are five things you can see and wherein the information entries are sunrise, trees, floor, people, mountains; and wherein four things you can hear and wherein the information entries are birds, trees, breeze, street; and wherein the attributes are three things you can smell and wherein the information entries are clear air, flowers, trees; and further wherein two things you can feel in skin and wherein the information entries are breath in face, feet on ground; and further wherein one thing you can taste and wherein the information entry is your drink;

(j) Take frequent breaks from prolonged screen time with computer screen, cell phone and book as application data structure identity, wherein attribute is duration and wherein the information entry is every 30 mins;

(k) Eight hours of Sleep as application data structure identity, wherein attribute is the time you went to bed; and the ASI Longevity Application sends alerts and notifications if patient is not going to bed at 10 pm;

(l) Protein intake at each meal as application data structure identity, wherein attribute is grams of protein taken at each meal, and further wherein the information entries are 30-30-30;

(m) Single leg stance, eyes open as application data structure identity, wherein attributes are frequency and duration and wherein the information entries are twice or thrice a day and 15 seconds or 10 seconds;

(n) Lunge as application data structure identity, wherein attributes are repetitions, frequency and duration and further wherein information entries are 5 or 2, 2 or 3 per day and 10 minutes;

(o) Standing or Sitting, Touch your shins, bend over as application data structure identity, wherein attributes are repetitions and frequency and further wherein 2× or 1×; and twice or four times per day;

(p) Walking backward, eyes open as application data structure identity, wherein attributes are repetitions, frequency and duration and further wherein information entries are 30 seconds, twice a day and 10 or 20 steps both directions; and (q) Zombie walk, fists and hands up, eyes closed, as application data structure identity, wherein attributes are frequency and duration and further wherein information entries are twice or thrice a day and 10 ft or 20 ft back and forth in hallway.

14$^{th}$ Aspect: The ASI Application in aspect 12, wherein the ASI Application is an AI Superintelligence—ASI Sleep Healthcare Application accessed by a patient and healthcare provider.

15$^{th}$ Aspect: The ASI Application in aspect 12, wherein the ASI Application is an AI Superintelligence—ASI Ear Nose and Throat Healthcare Application accessed by a patient and healthcare provider.

16$^{th}$ Aspect: The ASI Application in aspect 12, wherein the ASI Application is an AI Superintelligence—ASI Dental Insurance Application accessed by a dentist to minimize non-payment by patient for dental procedures, wherein the ASI Dental Insurance Application comprises at least Patient's Account, Patient ID, Dental Insurance details, Dentist Office details, Dental Procedure performed, Billing details, Payment pre-authorization by Insurance Provider as configurable ASI application data structure identities, with attributes and information entries.

17$^{th}$ Aspect: The ASI Application in aspect 12, wherein the ASI Application is an AI Superintelligence—ASI Defense Tech Application for Command and Control, Communications and Computer Intelligence for the U.S. Government in military operations, wherein the ASI Defense Tech Application comprises at least one of:

identity of targets as an ASI application data structure identity, with attributes and information entries;

identity of drones as an ASI application data structure identity, listing attributes and information entries;

identity of potential threats as an ASI application data structure identity, listing information entries and attributes;

identity of surveillance towers as an ASI application data structure identity with information entries and attributes;

identity of border security as an ASI application data structure identity with information entries and attributes;

data from various sensors and platforms to create an integrated understanding of the operational environment in military operations as an ASI application data structure identity with information entries and attributes;

warfare systems as an ASI application data structure identity, with information entries and attributes;

casualty care and evacuation as an ASI application data structure identity, with information entries and attributes, for access to large medical database that is able to access data containing medical trauma cases, wherein the attributes are: diagnoses, vital sign sets, medications given, treatments, and outcomes, to provide indications, warnings, and suggestions for treatment;

logistics and transportation as an ASI application data structure identity, wherein the attributes are ammunition, goods, armaments, and troops, for the success of military operations;

transportation costs as an ASI application data structure identity with information entries and attributes in ASI Defense tech Apps to lower transportation costs and reduce the need for human input by plotting the most efficient route as an ASI application data structure identity with information entries and attributes, to travel under current conditions as an ASI application data structure identity and to pre-identify problems for military fleets, as an ASI application data structure identity in order to increase efficiency of their performance;

autonomous sense making as an ASI application data structure identity, to integrate various defense hardware, wherein the attributes are drones and surveillance towers;

AI-powered surveillance as an ASI application data structure identity;

target identification as an ASI application data structure identity;

automated decision-making as an ASI application data structure identity;

enhancing operational capabilities for military and border security as an ASI application data structure identity; and identify and track potential threats in real-time as an ASI application data structure identity, aiding in timely and effective responses.

18$^{th}$ Aspect: The ASI Application in aspect 12, wherein the ASI Application is an AI Superintelligence—ASI Food and Beverage Application, wherein said ASI Food and Beverage Application comprises at least one or more of ASI application data structure identities:

a. Food Safety risks as ASI application data structure identities, wherein the attributes are food ingredients, spoilage;

b. Hazard Identification as ASI application data structure identities, wherein the attributes are data from sensors, cameras, and other sources; potential hazards, contaminants, spoilage to enable early detection to allow for swift corrective actions;

c. Predictive Analytics as ASI application data structure identities, wherein the attributes are historical data, timing of equipment maintenance, and spoilage;

d. Automated Record Keeping processes as ASI application data structure identities, wherein the attributes are accurate and consistent documentation of temperature logs, sanitation practices, and compliance with safety protocols;

e. Traceability and Recall Management as ASI application data structure identities, wherein the attributes are the entire supply chain tracking, from farm to table, food recalls, timely identified affected batches, and health risks;

f. Customization to Specific Environments as ASI application data structure identities, wherein the attributes are ASI algorithms, food production environments, large scale kitchen, processing plant, and a restaurant, for effective monitoring;

g. Staff Training and Alerts as ASI application data structure identities, wherein the attributes are ASI powered training modules, food safety practices and staff education, deviations, temperature fluctuations, wherein ASI sends alerts when deviations occur;

h. Compliance with Regulations as ASI application data structure identities, wherein the attributes are food safety regulations, adherence measures, continuous monitoring, critical control points (CCPs), and real-time feedback;

i. Menu Optimization and Personalization as ASI application data structure identities, wherein the attributes are customer preferences, dietary restrictions, and seasonal availability to optimize menu offerings, personalized recommendations, customer satisfaction and food waste;

j. Supply Chain Management as ASI application data structure identity, wherein the attributes are ingredient demand, inventory levels, and vendor relationships, consistent quality, timely procurement and waste;

k. Employee Scheduling and Shift Management as ASI application data structure identities, wherein the attributes are ASI algorithms, employee schedules, availability, skills, and labor laws, unexpected changes and real-time adjustments;

l. Food Safety Monitoring as ASI application data structure identities, wherein the attributes are image recognition, IoT sensors, food safety compliance, contaminants, expiration dates, and adherence to health regulations;

m. Automated Meal Planning for Large Events as ASI application data structure identities, wherein the attributes are customized meal plans, size of parties, dietary preferences, allergies, portion sizes, ingredient quantities and costs;

n. Predictive Maintenance for Kitchen Equipment as ASI application data structure identities wherein the attributes are equipment failures, maintenance needs, usage patterns, performance data, preventive maintenance, and downtime;

o. Traceability and Food Origin Tracking as ASI application data structure identities, wherein the attributes are traces of the entire supply chain—from farm to table; QR codes and the origin of user's food;

p. Automated Nutritional Analysis as ASI application data structure identities, wherein the attributes are recipes, menus, nutritional information, balance meals, dietary requirements, and label allergens;

q. Dynamic Pricing and Cost Optimization as ASI application data structure identities, wherein the attributes are pricing model, menu prices, real-time factors, ingredient costs, demand, and seasonality, and profitability;

r. Customer Feedback Analysis as ASI application data structure identities, wherein the attributes are processes customer reviews, social media posts, surveys using natural language processing (NLP), and menu improvements;

s. Automated Data Collection and Verification as ASI application data structure identities, wherein the attributes are real-time visibility, and tracking products from source to destination;

t. Optimized Transportation Routes as ASI application data structure identities, wherein the attributes are fuel consumption and greenhouse gas emissions;

u. Supplier Compliance Monitoring as ASI application data structure identities, wherein the attributes are supply chain traceability solutions, companies, supplier compliance and sustainability standards;

v. Consumer Trust and Transparency as ASI application data structure identities, wherein the attributes are end-to-end supply chain traceability, information about the products' journey sourcing, manufacturing processes, and handling;

w. Data Accessibility and Integration, as ASI application data structure identities, wherein the attributes are data accuracy in supply chains, data accessibility, easy access to relevant data and performance in supply chain management; and x. a centralized data repository as ASI application data structure identity, wherein the attributes are relevant teams, data repository access, and data sources.

19$^{th}$ Aspect: An AI Superintelligence—ASI Stub for performing real-time bi-directional transactions on an ASI application layer network on the Internet Cloud, by securely accessing real, accurate, dedicated absolute data transferred between devices, forming the Machine Learning—M/L data set, connected to billing for training AI Models, said ASI Stub including:

(a) User-defined data model definition of ASI Application, wherein the data model defines each of the ASI Application data structure identities as a class, with attributes and methods to change the state by a query from a Point-of-Service ASI Application displayed on an ASI browser to perform real-time, bi-directional transactions with an enterprise, wherein the data model definition translates to an ASI Application State Machine Protocol—ASMP definition, wherein this is the user created set of classes built around and on top of ASMP application programming interfaces—APIs, wherein this is the basis of the ASI Application data structure layer to the next level up the software layers;

(b) Stub and Skeleton classes, wherein said classes are inherited from the Abstract Base Class and from their respective ASI Application data structure layer classes, created by the meta compiler;

(c) an application programming interface provides the stub for said skeleton, wherein the stub allows remote access of the same ASI Application data structure identity, wherein the programming code is the same on either the client or server side, so that the programmer does not need to know where the actual ASI Application data structure identity resides: local or remote;

(d) a remote client in the ASI Browser in the ASI Application, wherein the programmer first establishes contact with the remote server, wherein the remote server is the ASI Agent and skeleton, and wherein the programmer then receives the ASI Application data structure identity on the client side as a stub, wherein the stub is the ASI Stub and client, wherein once the stub is received, the client can then look up the ASI Application data structure identity instance just as if the programmer was local to the skeleton on the server side; and (e) an intermediate machine that connects with the back-end to communicate using a name-value pair protocol which is modifiable—ASI Application State Machine Protocol—ASMP, wherein talking to the back-end varies from enterprise to enterprise and wherein an application programming interface provides a skeleton data structure definition, wherein the skeleton is the functionality of said ASI Application workflow data structure identity; and (f) an ASI Database connecting to the ASI Agent, wherein the ASI Agent retrieves real, accurate, dedicated absolute data from the enterprise data repository and wherein the ASI Database comprising real dedicated absolute data forming the Machine-Learning M/L training data set for AI LLMs to train their parameters in response to a query from an AI Prompt for predictive analysis.

20$^{th}$ Aspect: An AI Superintelligence—ASI Application Service Information Base—ASIB for enabling real-time bi-directional transactions on an ASI application layer network on the Internet Cloud, by securely accessing real, accurate, dedicated absolute data transferred between devices into an ASI database, forming the Machine Learning—M/L data set, connected to billing for training AI Models, said ASI Application Service Information Base ASIB including:

i. uniform interface for any organization to provide a customized interface for business or management ASI Application data structure identities;

ii. a library comprising:

(1) a core parser;

(2) an interpreter;

(3) business ASI Application data structure identities, wherein said business ASI Application data structure identities are built once as a common business ASI Application data structure identities, wherein they are configurable for different merchants or organizations;

(4) management ASI Application data structure identities, wherein said management ASI Application data structure identities are built once as a common management ASI Application data structure identities, wherein they are configurable for different merchants or organizations;

(5) the base class for business and management ASI Application data structure identities, (6) an interface from the base class with the enterprise interface;

iii. an Extended Finite State Machine—EFSM—for the business and management ASI Application data structure identities;

iv. interface with ASI Application State Machine Protocol for the business and management ASI Application data structure identities;

v. enterprise interface protocol specification, wherein the specification is written by the organization for its own enterprise interface;

vi. ASI Enterprise Interface State Machine—EISM—instructions for the business and management ASI Application data structure identities, wherein they are configurable during runtime for different business and management ASI Application data structure identities;

vii. A simple Finite State Machine—EISM—comprising:

(1) two items, comprising:

(i) a set of states S, wherein two states S={A, B}; and (ii) their possible transitions T, wherein a transition t consists of an initial state ts, and event e which triggers an action a, and a final state tf, wherein two transitions T={t1, t2}, wherein the transitions are described as t1=(A, X, Y, B) and t2=(B, U, V, A), wherein the transition t1 from state A to state B is triggered by an event X and causes an action Y, and transition t2 from state B to state A is triggered by an event U and causes an action V, wherein an event e causes a state change, wherein if state A receives any event besides X, it will remain in state A and wherein a valid event by a defined transition alone causes a state to change, and wherein action a is triggered by event e;

(2) an extended FSM, called the dynamic ASIB, wherein the states are not finite, and wherein are global variables that store infinite values and wherein the whole system has an infinite number of states, yet a counter that receives an input trigger and the output action is the integer "count", would simply output the count value and increment the count, an extended FSM would only need one state, the idle initial state;

(3) Interpreter, wherein the state machine is interpreted allowing for bytecode compilation into a stack machine opcode;

(4) Stack-based machine, wherein the stack machine allows for a simple implementation and compilation of the parsed state machines;

(5) Machine, wherein the state machine creates an intermediate bytecode, which is interpreted by the stack machine and wherein the ASCII input file is passed off to the parser which converts this to the byte code used to run the stack machine as a state machine or to a dump program which creates an ASI Application data structure identity file dump of instructions and symbol table;

(6) Parser, wherein a parser takes the input ASCII, parses it for syntax and syntactical errors, and then creates a stack machine instruction set for the resulting state machine, wherein the conversion of the state machine diagram into a stack machine saves time for the run time interpreter and does the preprocessing of the symbol table;

(7) Interpreter, wherein the interpreter is now just a simple stack machine, which receives input events and sends out actions, wherein the stack machine contains limited instructions to perform basic arithmetic and conditional chores at run time; and (8) Core Business and Management ASI Application data structure identities, wherein all of said data structures interface with a back-end channel to communicate with an enterprise computer—the enterprise interface and wherein each of said data structures has embedded in it the FSM to be able to parse the EISM instructions configured with diagrams, and wherein each such data structure is remotely accessible, and integrated with a payload sent on the ASI Application network.

21st Aspect: An AI Superintelligence—ASI Extended Finite State Machine—ASI EFSM for configuring ASI Applications for performing real-time bi-directional transactions on an ASI application layer network on the Internet Cloud, by securely accessing real, accurate, dedicated absolute data transferred between devices into an ASI database, forming the Machine Learning—M/L data set, connected to billing for training AI Models, said ASI Extended Finite State Machine—ASI EFSM including:

(a) two items, comprising:

(i) a set of states S, wherein two states S={A, B}, and (ii) their possible transitions T, wherein a transition t consists of an initial state ts, and event e which triggers an action a, and a final state tf, wherein two transitions T={t1, t2}, wherein the transitions are described as t1=(A, X, Y, B) and t2=(B, U, V, A), wherein the transition t1 from state A to state B is triggered by an event X and causes an action Y, and transition t2 from state B to state A is triggered by an event U and causes an action V, wherein an event e causes a state change, wherein if state A receives any event besides X, it will remain in state A and wherein a valid event by a defined transition alone causes a state to change, and wherein action a is triggered by event e;

(iii) a counter that only counts one state, wherein the one state is the idle initial state, and whereas the EFSM comprises global variables that store infinite values and wherein the whole system has an infinite number of states;

(iv) Interpreter, wherein the state machine is interpreted allowing for bytecode compilation into a stack machine opcode;

(v) Stack-based machine, wherein the stack machine allows for a simple implementation and compilation of the parsed state machines;

(vi) Machine, wherein the state machine creates an intermediate bytecode, which is interpreted by the stack machine and wherein the ASCII input file is passed off to the parser which converts this to the byte code used to run the stack machine as a state machine or to a dump program which creates an ASI Application data structure identity file dump of instructions and symbol table;

(vii) Parser, wherein a parser takes the input ASCII, parses it for syntax and syntactical errors, and then creates a stack machine instruction set for the resulting state machine, wherein the conversion of the state machine diagram into a stack machine saves time for the run time interpreter and does the pre-processing of the symbol table; and (viii) Interpreter, wherein the interpreter is now just a simple stack machine, which receives input events and sends out actions, wherein the stack machine contains limited instructions to perform basic arithmetic and conditional chores at run time.

22nd Aspect: An AI Superintelligence—ASI Enterprise Interface State Machine—ASI EISM for an enterprise interface to ASI Applications for performing real-time bi-directional transactions on an ASI application layer network on the Internet Cloud, by securely accessing real, accurate, dedicated absolute data transferred between devices into an ASI database, forming the Machine Learning—M/L data set, connected to billing for training AI Models, said ASI Enterprise Interface State Machine—ASI EISM including:

(a) instructions for the business and management ASI Application data structure identities, wherein they are configurable during runtime for different business and management ASI Application data structure identities;

(b) Core business and management ASI Application data structure identities, wherein all of said data structures interface with a back-end channel to communicate with an enterprise computer—the enterprise interface and wherein each of said data structures has embedded in it a FSM to be able to parse the said instructions configured with diagrams, and wherein each such data structure is remotely accessible, and integrated with a Payload sent on an ASI Application layer network.

(c) the interfaces for the enterprise interface and the FSM from each core business and management ASI Application data structure identities.

(d) uniform interface for any organization to provide a customized interface for business or management ASI Application data structure identities; (e) a simple Finite State Machine—EISM—comprising:

(1) two items, comprising:

(i) a set of states S, wherein two states S={A, B}, and (ii) their possible transitions T, wherein a transition t consists of an initial state ts, and event e which triggers an action a, and a final state tf, wherein two transitions T={t1, t2}, wherein the transitions are described as t1=(A, X, Y, B) and t2=(B, U, V, A), wherein the transition t1 from state A to state B is triggered by an event X and causes an action Y, and transition t2 from state B to state A is triggered by an event U and causes an action V, wherein an event e causes a state change, wherein if state A receives any event besides X, it will remain in state A and wherein a valid event by a defined transition alone causes a state to change, and wherein action a is triggered by event e;

(iii) a counter that receives an input trigger and the output action is the integer "count", would simply output the count value and increment the count;

(f) a library comprising:

(1) a core parser, (2) an Interpreter, (3) business ASI Application data structure identities, wherein said business ASI Application data structure identities are built once as a common business ASI Application data structure identities, wherein they are configurable for different merchants or organizations;

(4) management ASI Application data structure identities, wherein said management ASI Application data structure identities are built once as a common management ASI Application data structure identities, wherein they are configurable for different merchants or organizations;

(5) the base class for business and management ASI Application data structure identities;

(6) an interface from the base class with the enterprise interface;

(g) enterprise interface protocol specification, wherein the specification is written by the organization for its own enterprise interface;

(h) state machine diagrams;

(i) Interpreter, wherein the state machine is interpreted allowing for bytecode compilation into a stack machine opcode.

(j) Stack-based machine, wherein the stack machine allows for a simple implementation and compilation of the parsed state machines.

(k) Machine, wherein the state machine creates an intermediate bytecode, which is interpreted by the stack machine and wherein the ASCII input file is passed off to the parser which converts this to the byte code used to run the stack machine as a state machine or to a dump program which creates an ASI Application data structure identity file dump of instructions and symbol table;

(l) Parser, wherein a parser takes the input ASCII, parses it for syntax and syntactical errors, and then creates a stack machine instruction set for the resulting state machine, wherein the conversion of the state machine diagram into a stack machine saves time for the run time interpreter and does the preprocessing of the symbol table; and (m) Interpreter, wherein the interpreter is a simple stack machine, which receives input events and sends out actions, wherein the stack machine contains limited instructions to perform basic arithmetic and conditional chores at run time; and (n) the back-end communication channel, wherein it is customized for each organization for their given application, wherein this back end channel is different for each organization, and wherein a program is provided, capable of handling the different capabilities and customizable features per organization.

23$^{rd}$ Aspect: An AI Superintelligence—ASI Enterprise transferring real, accurate, dedicated absolute data between devices on an ASI application layer network on the Internet Cloud to an ASI database, forming the Machine Learning—M/L data set, connected to billing for training AI Models, said ASI Enterprise including:

(a) The back-end communication channel, wherein it is customized for each enterprise for its given ASI Application, wherein this back end channel is different for each enterprise, and wherein a program is provided, capable of handling the different capabilities and customizable features per enterprise;

(b) data model definition of ASI Application, wherein the data model defines each of the ASI Application data structure identities as a class, with attributes and methods to change the state by a query from a Point-of-Service ASI Application displayed on an ASI browser to perform real-time, bi-directional transactions with an enterprise, wherein the data model definition translates to an ASI Application State Machine Protocol—ASMP definition, wherein this is the user created set of classes built around and on top of ASMP APIs, wherein this is the basis of the ASI_ID layer to the next level up the software layers;

(c) ASI Application data structure identities, wherein each of the ASI Application data structure identities is configured as a class, with attributes and methods from the data model definition and ASMP definition, and wherein each of the ASI Application data structure identities is described using an FSM and ASIB EISM to configure each of the ASI Application data structure identities as a class, wherein a simple Finite State Machine, also called Enterprise Interface State Machine—EISM—configures said data structure by defining a set of states, and events that trigger a change of state and actions that result, wherein ASI Application Service Information Base—ASIB—provides a uniform interface for any enterprise to provide a customized interface for ASI Application data structure identities, configurable for each enterprise;

(d) the base class for each of the ASI Application data structure identities, wherein after compiling which hooks are added to provide the method connections to the FSM for this specific ASI Application data structure identity;

(e) an interface from the base class with the enterprise interface;

(f) Core Business and Management ASI Application data structure identities, wherein all of said data structures interface with a back-end channel to communicate with an enterprise computer—the enterprise interface and wherein each of said data structures has embedded in it the FSM to be able to parse the EISM instructions configured with diagrams, and wherein each such data structure is remotely accessible, and integrated with a payload sent on the ASI Application layer network;

(g) ASI Agent, wherein the ASI Agent is an intermediate machine that connects with the back-end to communicate using a name-value pair protocol which is modifiable—ASI Application State Machine Protocol—ASMP, wherein talking to the back-end varies from enterprise to enterprise and wherein an application programming interface provides a skeleton data structure definition, wherein the skeleton is the functionality of said ASI Application workflow data structure identity, in the ASI Agent;

(h) ASIB Extended Finite State Machine—EFSM, wherein to use the expect state for more than one string, more than one expected response, global variables are used to store the other dimension of state;

(i) ASI Stub, wherein an application programming interface provides the stub for said skeleton, wherein the stub allows remote access of the same ASI Application workflow data structure identity, wherein the programming code is the same on either the client or server side, so that the programmer does not need to know where the actual ASI Application data structure identity resides: local or remote;

(j) Stub and Skeleton classes inherited from the Abstract Base Class and from their respective ASI Application data structure layer classes, created by the meta compiler;

(k) The Meta compiler that takes a definition file and creates using encoding the Application data structure identity, Data Serialization, Data Marshaling, String Execution, Abstract Base Class, and the Stub/Skeleton Multiple Inheritance, wherein the meta compiler eliminates errors;

(l) A remote client in the ASI Browser in the ASI Application, wherein the programmer first establishes contact with the remote server, wherein the remote server is the ASI Agent and the skeleton, and wherein the programmer then receives the ASI Application data structure identity on the client side as a stub, wherein the stub is the ASI Stub and client, wherein once the stub is received, the client can then look up the ASI Application data structure identity instance just as if the programmer was local to the skeleton on the server side; and (m) An ASI Database connecting to the ASI Agent, wherein the ASI Agent retrieves real dedicated absolute data from the enterprise data repository and wherein the ASI Database comprising real, accurate, dedicated absolute data forming the Machine-Learning M/L training data set for AI LLMs to train their parameters in response to a query from an AI Prompt for predictive analysis.

24$^{th}$ Aspect: An AI Superintelligence—ASI Agent transferring real, accurate, dedicated absolute data between devices on an ASI application layer network on the Internet Cloud to an ASI database, forming the Machine Learning—M/L data set, connected to billing for training AI Models, said ASI Agent including:

(a) an intermediate machine that connects with the back-end to communicate using a name-value pair protocol which is modifiable—ASI Application State Machine Protocol—ASMP, wherein talking to the back-end varies from enterprise to enterprise and wherein an application programming interface provides a skeleton data structure definition, wherein the skeleton is the functionality of said ASI Application data structure identity;

(b) Stub and Skeleton classes inherited from the Abstract Base Class and from their respective ASI Application data structure layer classes, created by the meta compiler;

(c) User-defined data model definition of ASI Application, wherein the data model defines each of the ASI Application data structure identities as a class, with attributes and methods to change the state by a query from a Point-of-Service ASI Application displayed on an ASI browser to perform real-time, bi-directional transactions with an enterprise, wherein the data model definition translates to an ASI Application State Machine Protocol-ASMP definition, wherein this is the user created set of classes built around and on top of ASMP APIs, wherein this is the basis of the ASI Application data structure layer to the next level up the software layers.

(d) A remote client in the ASI Browser in the ASI Application, wherein the programmer first establishes contact with the remote server, wherein the remote server is the ASI Agent and the skeleton, and wherein the programmer then receives the ASI Application data structure identity on the client side as a stub, wherein the stub is the ASI Stub and client, wherein once the stub is received, the client can then look up the ASI Application data structure identity instance just as if the programmer was local to the skeleton on the server side; and (e) An ASI Database connecting to the ASI Agent, wherein the ASI Agent retrieves real dedicated absolute data from the enterprise data repository and wherein the ASI Database comprising real dedicated absolute data forming the Machine-Learning M/L training data set for AI LLMs to train their parameters in response to a query from an AI Prompt for predictive analysis.

25$^{th}$ Aspect: An AI Superintelligence—ASI Browser for transferring real, accurate, dedicated absolute data between devices on an ASI application layer network on the Internet Cloud to an ASI database, forming the Machine Learning—M/L data set, connected to billing for training AI Models, for performing real-time, bi-directional transactions, said ASI Browser including:

(a) An AI prompt, wherein the AI Prompt is the input given to a large language model via a generative AI platform to guide its response or action;

(b) an AI Superintelligence—ASI web browser, wherein said ASI browser integrates artificial intelligence capabilities directly into the browsing experience, beyond simple navigation, enhancing information retrieval and displaying Point-of-Service AI Superintelligence—ASI Applications;

(c) one or more ASI Applications displayed on the ASI web browser;

(d) one or more ASI Application data structure identities displayed on the ASI web browser;

(e) ASI Finite State Machine—ASI FSM embedded in each of said ASI Application data structure identities;

(f) data and functions of the ASI Application data structure identity displayed on the ASI browser, wherein the data includes information entries and attributes and output parameters and the functions include the methods are displayed on said ASI browser;

(g) ASI Application State Machine interface to the ASI browser, wherein the ASI Application State Machine starts at the display of the ASI browser;

(h) an AI assistant, wherein said AI assistant acts on context in real-time;

(i) an Interface, wherein the ASI browser executes tasks locally on the device, wherein the ASI browser executing locally reduces reliance on cloud servers, offers faster speeds, privacy, security and offline functionality;

(j) ASI Application data structure network; and (k) said ASI browser interfacing to the ASI Application data structure network to fetch real, accurate, dedicated absolute data transferred between devices from a transactional application interfacing to a data repository at the back-end channel and transmitted to an ASI database for training AI Models with the real, accurate, dedicated absolute data, forming the machine learning data set and connected to billing, and performing real-time, bi-directional transactions from said ASI Applications displayed on said ASI browser.

26$^{th}$ Aspect: An AI Superintelligence—ASI Application Network for enabling real-time bi-directional transactions from a transactional application, transferring real, accurate, dedicated absolute data between devices on said ASI application layer network on the Internet Cloud forming the Machine Learning—M/L data set in an ASI database, connected to billing for training AI Models, said ASI Application Network including:

(a) a user interface, wherein the user interface is an ASI browser displaying point-of-service ASI applications;

(b) one or more point-of-service ASI applications;

(c) ASI application data structure identity with information entries and attributes, wherein said ASI application data structure identity represents a networked data structure;

(d) ASI methods with argument parameters for remote execution upon said ASI application data structure;

(e) ASI application data structure instance, defined by said data and methods;

(f) ASI payload data structure comprising ASI application data structure identity with said information entries and attributes and methods to be acted upon said data structure with argument parameters, serialized, marshaled to check for errors and throw an exception and transmitted over the network;

(g) ASI application data structure network to remotely access ASI application data structure, its data and methods;

(h) an ASI skeleton, which is the functionality of the AI Superintelligence application data structure, and its ASI stub, which allows remote access of the same AI Superintelligence application data structure;

(i) user request transmitted from a point-of-service application displayed on an ASI browser to a transactional application at a server via said ASI skeleton and said ASI stub;

(j) Extended Finite State Machine;

(k) Enterprise Interface State Machine;

(l) ASI Application Service Information Base;

(m) ASI Enterprise;

(n) ASI Application State Machine protocol for performing real-time bi-directional transactions from a transactional application by transferring real, accurate, dedicated absolute data between devices on said ASI application layer network;

(o) Back-end interface from the ASI Agent to an ASI Enterprise data repository;

(p) ASI Database, wherein the ASI Database forms M/L Data set for training AI Models in response to user request from AI Prompt;

(q) ASI Billing and Service Management modules, wherein they connect to the ASI database for charging per access to the ASI Database like a Telco;

(r) ASI Switch consisting of user interface, client process, ASI Browser, ASI Apps, ASI Application data structure identity, ASI Application State Machine protocol, ASI Stub, ASI Agent, Enterprise interface to back office data repository, EFSM, EISM, ASIB, ASI Database and Billing and service management modules, all residing on ASI application network nodes on the Internet Cloud, connecting to end user devices; and (s) the Internet Cloud.

27$^{th}$ Aspect: A machine-readable medium having stored thereon data representing sequences of instructions, for performing real-time, bi-directional transactions on an AI Superintelligence—ASI application network, which when executed cause a machine to:

(a) invoke an AI Superintelligence—ASI browser as a client process at the network entry point—NEP—on the Internet Cloud;

(b) activate an ASI application layer switch as the ASI command and control, communications and computer intelligence application layer switch distributed across ASI application network nodes across the Internet Cloud, for enabling real-time, bi-directional transactions from ASI applications—ASI App(s)—at the network entry point—NEP;

(c) display a list of one or more Point-of-Service ASI applications on the ASI browser for a user to select, wherein each of the ASI applications is an ASI transactional application in an ASI application network;

(d) receive a request to use the ASI transactional application to perform an interactive real-time, bi-directional transaction on the ASI application network;

(e) access remotely data and functions of dynamically changing, context-specific ASI application data structures, uniquely identified to determine argument parameters and data structure serialization, retrieved and routed as ASI payload in an ASI application data structure network between the ASI application and an ASI Agent skeleton which is the functionality of the data structure and its stub which allows remote access of the same data structure;

(f) provide data marshaling to ensure all data is passed as arguments to the method to check all parameters and throw an exception;

(g) connect to the server transactional application in response to receiving the request, by handing over the request to the transactional application; and (h) request transaction data from one or more other computer systems connected to the ASI application network with the ASI transactional application, wherein the transaction data allows the user to perform the interactive real-time, bi-directional transaction on the ASI application network.

28$^{th}$ Aspect: A method for performing real-time, bi-directional transactions on an ASI application network, including:

(a) invoking an AI Superintelligence—ASI browser as a client process at the network entry point—NEP—on the Cloud;

(b) activating an ASI application layer switch as an ASI command and control, communications and computer intelligence application layer switch distributed across ASI application network nodes across the Internet Cloud, for enabling real-time, bi-directional transactions from ASI applications—ASI App(s)—at the network entry point—NEP;

(c) displaying a list of one or more Point-of-Service ASI applications on the ASI browser for a user to select;

(d) defining the data and functions for remote execution in an ASI application data structure definition class;

(e) creating an ASI application data structure instance, wherein the instance is defined by the class;

(f) creating a plurality of ASI application skeleton data structures on a computer system remote to the user, the ASI server;

(g) connecting the ASI application skeleton data structures to one or more ASI application stub data structures on a computer system local to the user, wherein the one or more ASI application stub data structures are derived from the plurality of ASI application skeleton data structures;

(h) serializing an ASI application payload data structure with the data and ASI application data structure instance;

(i) marshaling the ASI application payload to the ASI server to check all parameters and throw an exception;

(j) specifying the arguments to the functions in a meta file;

(k) creating data access components "get" and "set" for each data member, wherein the data access components are created automatically for the data;

(l) receiving a request to use a ASI transactional application to perform an interactive real-time, bi-directional transaction on the ASI application network;

(m) processing the ASI transaction request from the ASI application displayed on the ASI browser;

(n) parsing the ASI transaction request;

(o) connecting to the server transactional application in response to receiving the request, by handing over the request to the transactional application;

(p) requesting transaction data from one or more other computer systems connected with the ASI application network with the ASI transactional application, wherein the transaction data allows the user to perform the interactive real-time, bi-directional transaction on the ASI application network;

(q) returning any output parameters as real, accurate, dedicated absolute data to the client;

(r) returning any output parameters as real, accurate, dedicated absolute data to an ASI database which forms the Machine Learning Data Set to train and tune LLM parameters with said real dedicated absolute data in the ASI database, thereby ensuring accuracy and security and eliminating bias and hallucination of generative AI; and (s) connecting to ASI billing from the ASI database per access of said real dedicated absolute data.

29$^{th}$ Aspect: A machine-readable storage device including instructions executable by a processor for performing real-time, bi-directional transactions on an ASI application network, the machine-readable storage device including one or more instructions for:

(a) invoking an AI Superintelligence ASI browser as a client process at the Network Entry Point on the Cloud;

(b) displaying a list of one or more Point-of-Service ASI applications on the ASI browser for a user to select;

(c) configuring context-specific ASI application data structures;

(d) associating each of the ASI application data structures with a name and information entries and attributes;

(e) connecting the ASI application data structures in an ASI application layer network on the Cloud, wherein the ASI application data structures are ASI application networked data structures;

(f) creating a plurality of ASI application skeleton data structures on a computer system remote to the user, the ASI server;

(g) connecting the ASI application skeleton data structures to one or more ASI application stub data structures on a computer system local to the user, wherein the one or more ASI application stub data structures are derived from the plurality of ASI application skeleton data structures;

(h) creating an ASI application payload data structure comprising: the name of the context-specific ASI application data structure to be instantiated on the server computer, the name of the ASI method to invoke upon the ASI application data structure, and ASI input/output parameters for the ASI method to act upon the ASI application data structure, in a system of actions for automating configurable real-time, bi-directional, transactional ASI applications;

(i) serializing the ASI application payload into an application-specific type, customized for an enterprise;

(j) marshaling the ASI application payload to the ASI server;

(k) transmitting the ASI application payload over the ASI application layer network over the Cloud;

(l) processing the ASI transaction request from the ASI application displayed on the ASI browser;

(m) parsing the ASI transaction request;

(n) creating the ASI application layer network;

(o) invoking the ASI application method with the marshaled parameters;

(p) returning any output parameters as real, accurate, dedicated absolute data to the client; and (q) returning said output parameters as real, accurate, dedicated absolute data to an ASI database forming the Machine Learning Data Set to train and tune LLM parameters with real, accurate, dedicated absolute data in the ASI Database, to return results to an AI Prompt request, wherein the real, accurate, dedicated absolute data ensures data accuracy and eliminates hallucination of generative AI.

30$^{th}$ Aspect: An AI Superintelligence—ASI application methods for performing real-time bi-directional transactions from a transactional application, transferring real, accurate, dedicated absolute data between devices on said ASI application layer network on the Internet Cloud forming the Machine Learning—M/L data set, connected to billing for training AI Models, said ASI application methods comprising:

(a) defining a context-specific AI Superintelligence application data structure with functions and data, in a user-defined data model, corresponding to a user request from a user interface displaying a point-of-service ASI application, wherein the functions act upon said data structure with argument parameters, wherein said argument parameters constitute data;

(b) instantiating said AI Superintelligence application data structure with said functions and data;

(c) serializing information entries and attributes of said ASI application data structure and functions to act upon said data structure with argument parameters;

(d) remotely accessing said AI Superintelligence application data structure, its data and its functions in an AI Superintelligence application data structure network;

(e) creating an AI Superintelligence skeleton, wherein the skeleton is the functionality of the AI Superintelligence application data structure, and its AI Superintelligence stub, which allows remote access of the same AI Superintelligence application data structure;

(f) transmitting from a point-of-service application displayed on an AI Superintelligence browser to a transactional application at a server via said AI Superintelligence skeleton and said AI Superintelligence stub;

(g) data marshaling of said information entries and attributes of said ASI application data structure and all data passed as said argument parameters to said functions to act upon said data structure to check all parameters and throw an exception; and (h) safely accessing real, accurate, dedicated absolute data on said ASI application layer network on the Internet Cloud forming the Machine Learning—M/L data set in an ASI database, connected to billing for training AI Models.

31$^{st}$ Aspect: An AI Superintelligence—ASI application payload data structure for transmitting real, accurate, dedicated absolute data between devices on an ASI application layer network on the Internet Cloud forming the Machine Learning—M/L data set, connected to billing for training AI Models, said ASI application payload data structure including:

means for defining a context-specific AI Superintelligence—ASI application data structure with both data and functions;

means for creating said ASI application data structure instance, defined by said data and functions;

means for serializing information entries and attributes of said ASI application data structure and methods to be acted upon said data structure with argument parameters;

means for remotely accessing said ASI application data structure, its data and its functions on an ASI application data structure network;

means for creating an ASI skeleton, which is the functionality of the ASI application data structure, and its ASI stub, which allows remote access of the same ASI application data structure;

means for transmitting from a point-of-service application displayed on an ASI Browser to a transactional application at a server via said ASI skeleton and said ASI stub;

means for data marshaling of said information entries and attributes of said ASI application data structure and all data passed as said argument parameters to said methods to be acted upon said data structure to check all parameters and throw an exception.

32nd Aspect: An AI Superintelligence—ASI Switch for transferring real, accurate, dedicated absolute data between devices on an ASI application layer network on the Internet Cloud into an ASI Database, forming the Machine Learning—M/L data set, connected to billing for training AI Models, said ASI Switch including:

(a) end-to-end connected ASI Application network providing four quadrants of services, wherein the first ASI Boundary quadrant connects the ASI Switch to a user with an ASI Browser, displaying Point-of-Service applications, wherein the Point-of-Service applications are ASI Applications in the second quadrant, ASI Applications quadrant, with an ASI Stub and ASI Agent in the third quadrant, ASI Switching quadrant via ASI Application State Machine Protocol ASMP over the Internet Cloud, and interfacing, at the other end of the Boundary quadrant, to an ASI Enterprise to its data repository to securely access real, accurate, dedicated absolute data in response to a user request from one of the said ASI Applications displayed on the ASI Browser, wherein instantiating a context-specific ASI Application data structure allows the user to perform real-time, bi-directional transactions in said ASI Application network, wherein the real, accurate, dedicated absolute data forms the Machine Learning Data Set to train AI Models in response to a query from an AI Prompt, wherein the ASI Database connects to the fourth quadrant of the ASI Switch to ASI Service Management quadrant to billing per access to said ASI Database and operations, administration, maintenance and provisioning service management functions like a Telco; and further wherein the ASI Switch comprises:

(b) a client process, wherein the client process includes an AI Prompt and an AI Superintelligence—ASI Browser;

(c) at least one AI Superintelligence—ASI Application—ASI App displayed on the ASI Browser for a user to perform real-time bi-directional transactions on an ASI application layer network on the Internet Cloud, returning real dedicated absolute data into an ASI Database;

(d) AI Model trained in said real, accurate, dedicated absolute data forming the Machine Learning—M/L data set, in response to a query from the AI Prompt;

(e) ASI Application data structure definition class, wherein the class defines the data and functions;

(f) an ASI Application data structure instance, wherein the instance is defined by the class;

(g) a payload data structure, wherein both the data and the ASI Application data structure itself are sent over the network;

(h) an ASI Application data structure network;

(i) ASI Application State Machine Protocol—ASMP, wherein ASMP includes an application programming interface to remotely access the ASI Application data structure, its data and its functions in said ASI Application data structure network, wherein the interface provides two types of a class, wherein the two types of the class are a skeleton, wherein the skeleton is the functionality of the ASI Application data structure, and its stub, wherein the stub allows remote access of the same ASI Application data structure;

(j) an ASI Server comprising a plurality of ASI Application skeleton data structures on a computer system remote to the user, wherein the ASI Server is the ASI Agent that interfaces with the back office data repository of the ASI Enterprise;

(k) an ASI Stub, comprising one or more ASI Application stub data structures on a computer system local to the user, wherein the one or more ASI Application stub data structures are derived from the plurality of ASI Application skeleton data structures;

(l) ASI Enterprise interface to ASI Applications, wherein said enterprise interface is an ASI Enterprise Interface State Machine—ASI EISM, wherein said data structures interface with a back-end channel to communicate with an enterprise computer—the enterprise interface and wherein each of said data structures has embedded in it a Finite State Machine—FSM—to parse instructions configured with diagrams;

(m) ASI Application Service Information Base—ASIB, wherein the ASIB provides a uniform interface for any ASI Enterprise to provide a customized interface for ASI Application data structure identities;

(n) ASI Database of real, accurate, dedicated absolute data;

(o) an ASI Command, Control, Communications and Computer Intelligence (C4I) system for independent, intelligent AI Prompting and ASI Browsing, wherein the Command is in said ASI Boundary quadrant of the ASI Switch at the Network Entry Point on said AI Prompt and at ASI Browser; and further wherein the Communications is in said ASI Switching quadrant of the ASI Switch in the ASI Application data structure layer and interconnected Agents, FSM, ASI ASIB, ASI EFSM and ASI EISM; wherein the Control is in the ASI Applications quadrant of said ASI Switch in the ASI Applications, ASI Application data structure identity, ASI FSM, ASI ASIB, ASI EFSM and ASI EISM; and the Computer Intelligence is in the ASI Service Management quadrant of said ASI Switch, connected to billing for training AI Models accessing the Machine Learning Data Set consisting of real, accurate, dedicated absolute data transferred between devices from a transactional application into the ASI database, wherein all of the C4I constitutes the ASI Application Network Nodes; and (p) ASI Application Network Nodes.

33rd Aspect: A machine-readable medium, having stored thereon an AI Superintelligence—ASI Application State Machine, the ASI Application State Machine including:

(a) a library providing support for the application programming interfaces—APIs—to remotely access an ASI Application data structure, its data and its functions in an ASI Application data structure network;

(b) an ASI interface that provides two types of a class, a skeleton, wherein the skeleton is the functionality of the ASI Application data structure, and its stub, wherein the stub allows remote access of the same ASI Application data structure, and further wherein said ASI interface automatically determines if the ASI Application data structure is remote or local;

(c) an ASI class, wherein the class is an ASI Application data structure definition which defines both the data and functions;

(d) ASI Application data structure instance, wherein said ASI Application data structure instance, is defined by an ASI class;

(e) configurable ASI Application data structure identity, wherein said data structure allows a user to specify functions that are executed remotely, and further wherein said ASI Application data structure identity is needed to determine argument parameters of information entries and attributes and data serialization;

(f) a meta file, wherein the arguments to the function are specified, and further wherein the type of argument passing by value or reference is specified;

(g) payload data structure, wherein the parameters and the ASI Application data structures are sent over network, to transfer data between devices;

(h) meta compiler in the stub and skeleton, wherein the meta compiler provides data marshaling to ensure that all data is passed as arguments to a method requiring a user to check all parameters and throw an exception if something is missing or wrong;

(i) Abstract Base Class, wherein the Abstract Base Class is the parent of both the stub and skeleton, wherein the Abstract Base Class is created by the meta compiler in order to operate on an ASI Application data structure without knowing its location, local or remote and cannot be instantiated alone.

(j) thread rendezvous, wherein thread rendezvous blocks a thread during network transmission and reception, wherein the ASI Application data structure must use a different thread to perform the actual network activity and control the calling thread status and further wherein to enable calling a remote ASI Application data structure to behave similar to a local ASI Application data structure;

(k) string execution, wherein the string execution allows calling a class method using an ASCII string, created by the meta compiler in the base class;

(l) reference counting, wherein said reference counting in both the local and remote ASI Application data structures are performed to avoid time consuming malloc's and free's, and further wherein to clarify which function is responsible for deleting which ASI Application data structure;

(m) Stub and Skeleton classes, wherein said classes are inherited from the abstract base class and from their respective ASI Application data structure layer classes, created by the meta compiler;

(n) Meta compiler, wherein the meta compiler takes a definition file and creates using encoding the ASI Application data structure identity, Data Serialization, Data Marshaling, String Execution, Abstract Base Class, and the Stub/Skeleton Multiple Inheritance, wherein the meta compiler eliminates errors.

(o) User-defined Data Model, wherein the user created set of classes built around and top of the APIs as basis of the ASI Application data structure layer to the next level up the software layers, appears local to the programmers using said data structure layer even though remote;

(p) an interface specification for the abstract base class inherited by both the ASI Application data structure layer ASI Application data structures and the data model ASI Application data structures, wherein the interface allows it to execute any method using a simple ASCII string and ASI Application data structure type data, and wherein it provides thread synchronization, flag variables and reference counts;

(q) a new data model ASI Application data structure, wherein it contains one data member "name" which is a String, wherein the meta compiler automatically creates two access components for this data member: get_name and set_name and creates the local and remote versions of this data model ASI Application data structure as Name skeleton and stub;

(r) ASI skeleton, wherein the ASI skeleton represents the server side of the ASI Application State Machine, wherein the skeleton is a class, derived off the abstract base class and wherein all methods must be defined by the programmer for the skeleton since this is the actual ASI Application data structure identity;

(s) ASI stub, wherein the ASI stub is the client or remote side of an ASI Application data structure, similar to the skeleton derived off the same abstract base class, wherein the programmer has nothing to define and all methods are generated by the meta compiler, which creates an interface file and a definition file for each of the three classes, abstract base class, stub and skeleton;

(t) parser, wherein the parser parses the description file and produces the six output files, for the base class, stub and skeleton;

(u) compiler, wherein said compiler waits for the header section to complete, then, begins the class name and parent, followed by the data section; and next followed by the method section, with method and arguments;

(v) Connection Server, wherein it is the main class on the server side of ASI Application State Machine, and is the entry point into the system for a Remote Client requesting access to an ASI Application Remote Server;

(w) Connection Monitor, wherein it is the main class on the client side of ASI Application State Machine and is the entry point into the system for a connection and to create a Remote Client for a particular destination to the Remote Connection Server;

(x) Remote Server, wherein it is the server side of the client-server communication channel that processes each inbound request, and wherein it spawns a new thread for each Remote PDU method packet, and wherein there is always one Remote Server for a Remote Client;

(y) an ASI Application Service Information Base providing a uniform interface for ASI Application data structure identities;

(z) an ASI Enterprise Interface State Machine, said data structures interfacing with a back-end channel, a Finite State Machine embedded in each ASI Application data structure;

(aa) interconnected ASI Agents, wherein said ASI Agents transmit said real, accurate, dedicated absolute data from a transactional application; and (bb) an ASI database of real, accurate, dedicated absolute data transferred between devices on the ASI application data structure network, forming the Machine Learning—M/L data set, connected to billing for training AI Models, for performing real-time, bi-directional transactions, from said ASI Applications.

34th Aspect The ASI Application State Machine in aspect 33, further comprising a data repository of real, accurate, dedicated absolute data, connecting to the back-end channel interfacing with said data structures from the ASI Enterprise Interface State Machine.

35th Aspect The data repository in aspect 34, wherein the data repository is a data repository to store banking data, transferred between devices on the ASI Application data structure network, to said ASI database of real, accurate, dedicated absolute data for performing said real-time, bi-directional transactions.

36th Aspect The data repository in aspect 34, wherein the data repository is a data repository to store healthcare data, transferred between devices on the ASI Application data structure network, to said ASI database of real, accurate, dedicated absolute data for performing said real-time, bi-directional transactions.

37th Aspect The data repository in aspect 34, wherein the data repository is a data repository to store defensetech data, transferred between devices on the ASI Application data structure network, to said ASI database of real, accurate, dedicated absolute data for performing said real-time, bi-directional transactions.

38th Aspect The data repository in aspect 34, wherein the data repository is a data repository to store supply chain management data, transferred between devices on the ASI Application data structure network, to said ASI database of real, accurate, dedicated absolute data for performing said real-time, bi-directional transactions.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. An apparatus, comprising:

a memory having code therein; and a processor configured to execute the code and implement an embedded Artificial Intelligence (AI) Superintelligence (ASI) Pro Forma Application (App) configured to:

open an interface to a Pro Forma fintech client process at one end;

specify a Pro Forma fintech use;

define data elements specific to the Pro Forma fintech use;

configure the client process and an AI-Model per the data definition file specific to the Pro Forma fintech use;

instantiate the data elements specific to the Pro Forma fintech use;

configure interconnected sending and receiving agents with the data elements stored therein;

send the data elements and instantiated values specific to the Pro Forma fintech use across an end-to-end connected AI application layer network via a stub and a skeleton embedded in the interconnected sending and receiving agents;

train the AI-Model with the instantiated values of the data elements comprising real, accurate, dedicated, absolute data (RADAD) as machine learning (M/L) training dataset specific to the Pro Forma fintech use; and complete an action by the client process that at least one of creates or fetches the RADAD from a transactional application at the other end.

2. The apparatus of claim 1, wherein the Pro Forma fintech use is for a Pro Forma income statement for a duration of time.

3. The apparatus of claim 1, where results of the action are displayed in a spreadsheet or in a database.

4. The apparatus of claim 1, wherein the Pro Forma fintech use is for an invoice, a balance sheet, a statement of cash flow, or a budgeting statement.

5. The apparatus of claim 1, wherein the Pro Forma fintech use is for an income tax return.

6. The apparatus of claim 1, wherein the Pro Forma fintech use is for a debt refinancing statement.

7. The apparatus of claim 1, wherein the Pro Forma fintech use is for a company mergers or acquisitions statement to assess future business operating prospects and valuation.

8. The apparatus of claim 1, wherein the Pro Forma fintech use is for a statement on one-time large purchase and how the one-time large purchase affects budget.

9. The apparatus of claim 1, wherein the Pro Forma fintech use is for a statement on leases, and how the leases are expected to affect budget with new accounting standards.

10. The apparatus of claim 1, wherein the Pro Forma fintech use is for a historical report.

11. The apparatus of claim 1, wherein the Pro Forma fintech use is for a sales and budget projection, that can be varied.

12. The apparatus of claim 1, wherein the Pro Forma fintech use is to assemble results in profit/loss projections.

13. The apparatus of claim 1, wherein the Pro Forma fintech use is to translate data into cash flow projections.

14. The apparatus of claim 1, wherein the interface is a user-interface.

15. The apparatus of claim 1, wherein the AI-Model is an enterprise-specific ASI Pro Forma App-specific AI-Model or an end-user device-specific ASI Pro Forma App-specific AI-Model.

16. The apparatus of claim 1, wherein the client process is hosted on at least one of a smart vehicle, a drone, a robot, a watch, or a mobility device.

17. The apparatus of claim 1, wherein the data elements include at least one of account name, address, telephone number, period with start and end dates, revenue with gross sales less returns and allowances, net sales each year for the period, cost of sales, beginning and ending inventory, goods purchased and manufactured, cost of goods sold, net profit or loss, operating expenses, wages, commissions, advertising costs, selling expenses, general and administration expenses, payroll taxes, employee benefits, insurance, rent, utilities, depreciation and amortization, office supplies, shipping and postage, travel and entertainment, equipment maintenance and rental, furniture and computers, total operating expenses, total income, income before taxes, income after taxes, department ID, engineering, robotics, AI, accounting, operations, sales, marketing, price of goods or services purchased, and total of an invoice.

18. The apparatus of claim 1, wherein the ASI Pro Forma App is implemented at least partially in a Graphical Processing Unit (GPU) in a data center or in an enterprise.

19. A method implemented by a computer-based embedded Artificial Intelligence (AI) Superintelligence (ASI) Pro Forma Application (App), the method comprising:

opening an interface to a Pro Forma fintech client process at one end;

specifying a Pro Forma fintech use;

defining data elements specific to the Pro Forma fintech use;

configuring the client process and an AI-Model per the data definition file specific to the Pro Forma fintech use;

instantiating the data elements specific to the Pro Forma fintech use;

configuring interconnected sending and receiving agents with the data elements stored therein;

sending the data elements and instantiated values specific to the Pro Forma fintech use across an end-to-end connected AI application layer network via a stub and a skeleton embedded in the interconnected sending and receiving agents;

training the AI-Model with the instantiated values of the data elements comprising real, accurate, dedicated absolute data (RADAD) as machine learning (M/L) training dataset specific to the Pro Forma fintech use; and completing an action by the client process that at least one of creates or fetches the RADAD from a transactional application at the other end.

20. A non-transitory computer-readable medium having code stored thereon that when executed by a processor causes the processor to execute a method implemented by a computer-based embedded Artificial Intelligence (AI) Superintelligence (ASI) Pro Forma Application (App), the method comprising:

opening an interface to a Pro Forma fintech client process at one end;

specifying a Pro Forma fintech use;

defining data elements specific to the Pro Forma fintech use;

configuring the client process and an AI-Model per the data definition file specific to the Pro Forma fintech use;

instantiating the data elements specific to the Pro Forma fintech use;

configuring interconnected sending and receiving agents with the data elements stored therein;

sending the data elements and instantiated values specific to the Pro Forma fintech use across an end-to-end connected AI application layer network via a stub and a skeleton embedded in the interconnected sending and receiving agents;

training the AI-Model with the instantiated values of the data elements comprising real, accurate, dedicated absolute data (RADAD) as machine learning (M/L) training dataset specific to the Pro Forma fintech use; and completing an action by the client process that at least one of creates or fetches the RADAD from a transactional application at the other end.

* * * * *